US010919046B2

(12) United States Patent
Kochhar et al.

(10) Patent No.: US 10,919,046 B2
(45) Date of Patent: Feb. 16, 2021

(54) PROCESS, APPARATUS, AND SYSTEM FOR RECOVERING MATERIALS FROM BATTERIES

(71) Applicant: Li-Cycle Corp., Mississauga (CA)

(72) Inventors: Ajay Kochhar, Oakville (CA); Timothy George Johnston, Toronto (CA)

(73) Assignee: Li-Cycle Corp., Mississauga (CA)

( * ) Notice: Subject to any disclaimer, the term of this patent is extended or adjusted under 35 U.S.C. 154(b) by 0 days.

(21) Appl. No.: 16/912,243

(22) Filed: Jun. 25, 2020

(65) Prior Publication Data

US 2020/0331003 A1 Oct. 22, 2020

Related U.S. Application Data

(63) Continuation of application No. 16/461,158, filed as application No. PCT/CA2018/050640 on May 30, 2018.

(Continued)

(51) Int. Cl.
*B03B 9/06* (2006.01)
*B02C 23/36* (2006.01)
(Continued)

(52) U.S. Cl.
CPC .............. *B03B 9/06* (2013.01); *B02C 23/36* (2013.01); *B03C 1/23* (2013.01); *C22B 1/005* (2013.01);
(Continued)

(58) Field of Classification Search
CPC ....... B03B 9/06; B03B 2009/066; B03C 1/23; B03C 2201/20; H01M 10/0525;
(Continued)

(56) References Cited

U.S. PATENT DOCUMENTS 7,192,564 B2 3/2007 Cardarelli
7,833,646 B2 11/2010 Zenger et al.
(Continued)

FOREIGN PATENT DOCUMENTS

CN 205429109 8/2016
CN 106129515 11/2016
(Continued)

*Primary Examiner* — Charles A Fox
*Assistant Examiner* — Kalyanavenkateshware Kumar
(74) *Attorney, Agent, or Firm* — Kevin Shipley; Fogler, Rubinoff LLP

(57) ABSTRACT

An apparatus for carrying out size reduction of battery materials under immersion conditions having a battery inlet and at least a first comminuting device disposed within a housing and configured to cause a size reduction of the battery materials to form reduced-size battery materials and to liberate electrolyte materials and a black mass material comprising anode and cathode powders from within the battery materials. An immersion liquid can be within the housing and can submerge the first comminuting device so the black mass material and the reduced-size battery material are entrained within the immersion liquid to form a sized-reduced feed stream. A feed outlet may be downstream from the first comminuting device.

24 Claims, 7 Drawing Sheets

Related U.S. Application Data

(60) Provisional application No. 62/512,460, filed on May 30, 2017, provisional application No. 62/669,205, filed on May 9, 2018.

(51) Int. Cl.

| | |
|---|---|
| *B03C 1/23* | (2006.01) |
| *C22B 1/00* | (2006.01) |
| *C22B 7/00* | (2006.01) |
| *C22B 21/00* | (2006.01) |
| *C22B 3/00* | (2006.01) |
| *C22B 26/12* | (2006.01) |
| *C22B 47/00* | (2006.01) |
| *H01M 10/0525* | (2010.01) |
| *H01M 10/54* | (2006.01) |

(52) U.S. Cl.
CPC .......... *C22B 7/007* (2013.01); *C22B 21/0015* (2013.01); *C22B 23/0415* (2013.01); *C22B 26/12* (2013.01); *C22B 47/00* (2013.01); *H01M 10/0525* (2013.01); *H01M 10/54* (2013.01); *B03B 2009/066* (2013.01); *B03C 2201/20* (2013.01)

(58) Field of Classification Search
CPC ........ H01M 10/54; C22B 1/005; C22B 7/007; C22B 21/0015; C22B 23/0415; C22B 26/12; C22B 47/00

See application file for complete search history.

(56) References Cited

U.S. PATENT DOCUMENTS

| | | |
|---|---|---|
| 8,858,677 B2 | 10/2014 | Kakuta |
| 9,312,581 B2 | 4/2016 | Laucournet |
| 9,327,291 B2 | 5/2016 | Brodt |
| 2008/0050295 A1* | 2/2008 | Uchida .................. C22B 7/007 423/179.5 |
| 2010/0023051 A1 | 9/2010 | Ewles et al. |
| 2013/0312254 A1 | 11/2013 | Kim et al. |

FOREIGN PATENT DOCUMENTS

| | | |
|---|---|---|
| CN | 205808106 | 12/2016 |
| CN | 206082718 | 4/2017 |
| DE | 102011082187 | 3/2013 |
| JP | 11-260426 | 9/1999 |
| JP | 2007-122885 | 5/2007 |
| WO | 2016052568 | 4/2016 |
| WO | 2017006209 | 1/2017 |

\* cited by examiner

US 10,919,046 B2

PROCESS, APPARATUS, AND SYSTEM FOR RECOVERING MATERIALS FROM BATTERIES

CROSS-REFERENCE TO RELATED APPLICATIONS

The present application is a continuation of Ser. No. 16/461,158 filed May 15, 2019, which is a national stage entry of international patent application no. PCT/CA2018/050640 filed May 30, 2018, which claimed priority to U.S. provisional applications 62/669,205 and 62/512,460 filed May 9, 2018 and May 30, 2017 respectively; the entirety of these applications being incorporated herein by reference.

FIELD OF THE APPLICATION

The present application pertains to the field of battery recycling. More particularly, the present application relates to a process, apparatus, and system for recovering materials from batteries, in particular rechargeable lithium-ion batteries.

INTRODUCTION

Lithium-ion rechargeable batteries are increasingly powering automotive, consumer electronic, and industrial energy storage applications. However, approximately less than 5% of produced spent lithium-ion batteries are recycled globally, equivalent to approximately 70,000 tonnes of spent lithium-ion batteries recycled/year. In contrast, an estimated 11+ million tonnes of spent lithium-ion battery packs are expected to be discarded between 2017 and 2030, driven by application of lithium-ion batteries in electro-mobility applications such as electric vehicles.

Such spent lithium-ion battery packs have a valuable content of cobalt, lithium, copper, graphite, nickel, aluminum, manganese, etc.; and thus, spent lithium-ion battery packs can be viewed as a high grade 'urban mining' source of lithium and many other valuable metals. However, current lithium-ion battery recycling processes consist of, for example, smelting or pyrometallurgy that primarily recovers metal alloys (typically cobalt, copper, and/or nickel). Via pyrometallurgy, lithium in the spent lithium-ion batteries is lost in the slag and/or off-gas streams from a smelter's furnace(s), for example. The slag is generally sold to the construction industry for use as road base, for example, and the lithium is unrecoverable economically.

As such, the quantities and valuable contents of spent lithium-ion batteries will require waste diversion industries to adapt; for example, to emulate lead acid battery recycling industries, where approximately more than 90% of spent lead acid batteries are recycled in many jurisdictions globally.

Advanced lithium-ion battery recycling processes could offer an economic and environmental opportunity. For example, the estimated 11+ million tonnes of spent battery packs contain approximately US$65 billion of residual value in metals and other components. Further, recycling lithium-ion batteries could reduce greenhouse gas emissions globally by approximately 1.2 billion equivalent tonnes of $CO_2$ between 2017 and 2040 by providing an offset against/reducing the amount of raw material derived from primary sources (i.e. mining, refining); and, potentially prevent metals (e.g., heavy metals) and materials from spent lithium-ion batteries being landfilled.

The above information is provided for the purpose of making known information believed by the applicant to be of possible relevance to the present application. No admission is necessarily intended, nor should be construed, that any of the preceding information constitutes prior art against the present application.

SUMMARY OF THE APPLICATION

As noted in further detail below, rechargeable lithium-ion batteries comprise a number of different materials. "Black mass" is known to be a component of rechargeable lithium-ion batteries, which comprises a combination of cathode and/or anode electrode powders comprising lithium metal oxides and lithium iron phosphate (cathode) and graphite (anode). Materials present in rechargeable lithium-ion batteries include organics such as alkyl carbonates (e.g. $C_1$-$C_6$ alkyl carbonates, such as ethylene carbonate (EC), ethyl methyl carbonate (EMC), dimethyl carbonate (DMC), diethyl carbonate (DEC), propylene carbonate (PC), and mixtures thereof), iron, aluminum, copper, plastics, graphite, cobalt, nickel, manganese, and of course lithium. Recovering such materials from rechargeable lithium-ion batteries is highly desirable.

Thus, in accordance with an aspect of the present application, there is provided a process for recovering materials from rechargeable lithium-ion batteries comprising:
  i) processing lithium-ion batteries to form a size-reduced feed stream;
  ii) separating the size-reduced feed stream into a magnetic product stream and a non-magnetic feed stream;
  iii) optionally isolating a ferrous product from the magnetic product stream;
  iv) stripping the non-magnetic feed stream with a stripping solvent to form a stripped slurry stream;
  v) separating the stripped slurry stream into an oversize solids portion and an undersize stripped slurry stream;
  vi) optionally separating the oversize solids portion of the stripped slurry stream into a preliminary aluminum product stream, a preliminary copper product stream, and a plastic product stream;
  vii) subjecting the undersize stripped slurry stream to a solid-liquid separation to form a black mass solid stream and recovered stripping solvent;
  viii) leaching the black mass solid stream with an acid to form a pregnant leach solution and residual solids;
  ix) separating the pregnant leach solution from the residual solids to form a first product stream comprising the residual solids and a second product stream comprising the pregnant leach solution;
  x) optionally isolating a graphite product from the first product stream;
  xi) isolating a copper product from the second product stream to form a third product stream;
  xii) isolating an aluminum (Al) and/or iron (Fe) product from the third product stream to form a fourth product stream;
  xiii) isolating a cobalt (Co), nickel (Ni), and/or manganese (Mn) product from the fourth product stream to form a fifth product stream;
  xiv) isolating a salt by-product from the fifth product stream to form a sixth product stream; and
  xv) isolating a lithium product from the sixth product stream.

In another aspect, there is provided an apparatus for carrying out size reduction of battery materials under immersion conditions, comprising:

a housing configured to hold an immersion liquid;

a first feed chute defining an opening therein for receiving battery materials of a first type into the housing;

a first submergible comminuting device disposed within the housing to receive the battery materials of the first type from the first feed chute, wherein said first submergible comminuting device is configured to cause a size reduction of the battery materials of the first type to form a first reduced-size battery material; and a second submergible comminuting device disposed within the housing to receive the first reduced-size battery material from the first submergible comminuting device, wherein the second submergible comminuting device is configured to cause a further size reduction in the first reduced-size battery material to form a second reduced-size battery material.

In yet another aspect, there is provided a system for carrying out size reduction of battery materials under immersion conditions, comprising:

(a) a first submergible comminuting device to receive battery materials of a first type, wherein the first submergible comminuting device causes a size reduction in the battery materials of the first type to form a first reduced-size battery material;

(b) a second submergible comminuting device to receive the first reduced-size battery material, wherein the second submergible comminuting device causes a further size reduction in the first reduced-size battery material to form a second reduced-size battery material; and (c) an immersion liquid in which each of the first submergible comminuting device, the second submergible comminuting device, the first reduced-size battery material, and the second reduced-size battery material are submerged.

BRIEF DESCRIPTION OF THE FIGURES

For a better understanding of the present application, as well as other aspects, embodiments, and further features thereof, reference is made to the following description which is to be used in conjunction with the accompanying figures and/or tables, where.

Figure 1A:
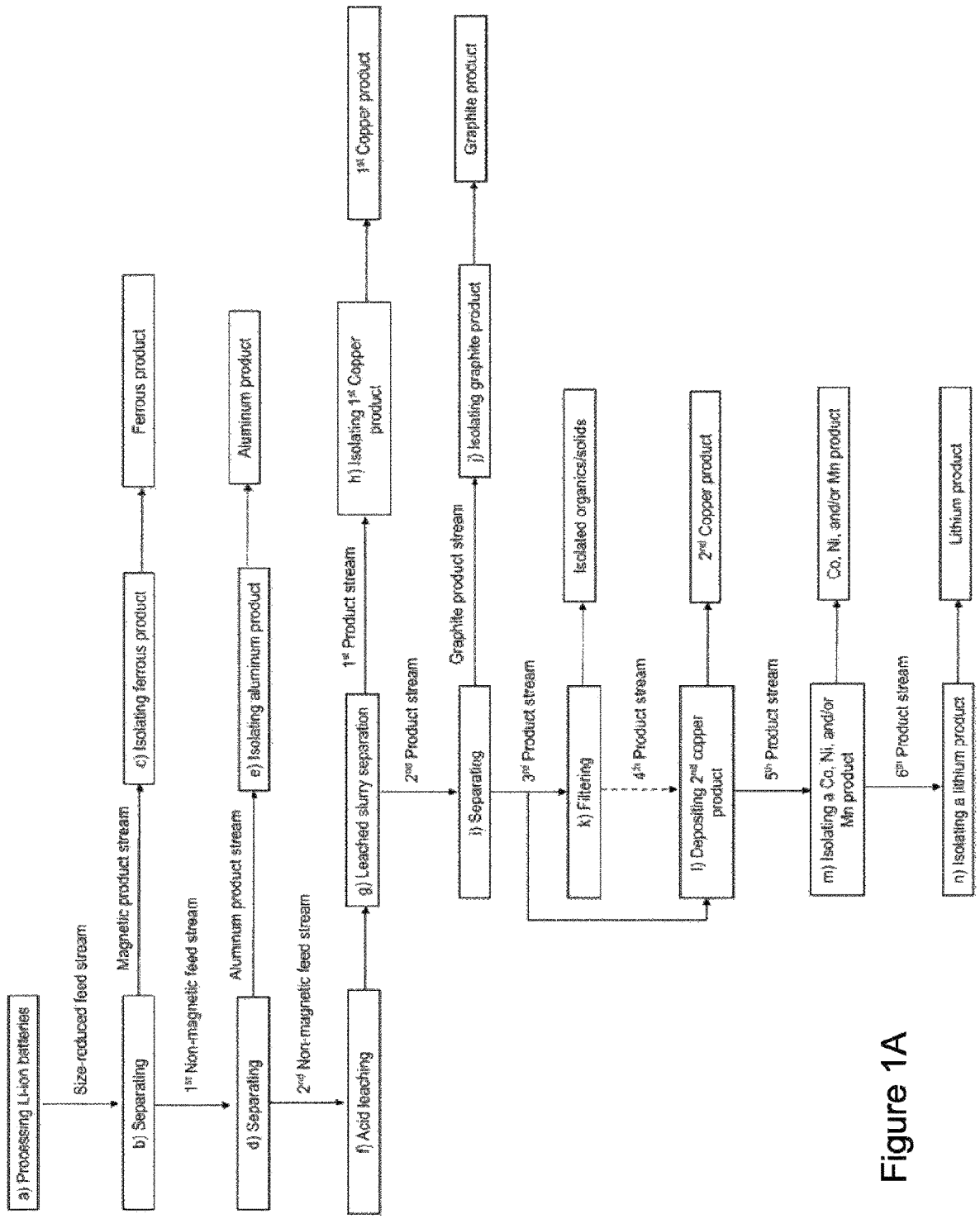
FIG. 1A depicts a block flow diagram of an embodiment of a first process as described herein ("Process 1").

Table 1 delineates a potential summary forecast of spent/discarded small and large format Li-ion battery components in 2025 and 2030;

Table 2 delineates example design and IDEAS process simulation parameters for Phase 1 feed size reduction steps of each of Processes 1 and 2;

Table 3 delineates example design and IDEAS process simulation parameters for Phase 2 magnetic separation and eddy current separation of Process 1;

Table 4 delineates example design and IDEAS process simulation parameters for Phase 2 leaching and countercurrent decantation (CCD) steps of Process 1;

Table 5 delineates key reaction chemistry for Phase 2 leaching step of Process 1 and Process 2 per the IDEAS process simulation parameters;

Table 6 delineates example design and IDEAS process simulation parameters for Phase 2 intermediate product preparation steps of Process 1;

Table 7 delineates example design and IDEAS process simulation parameters for Phase 3 final product preparation steps of Process 1; and Table 8 delineates key reaction chemistry for Phase 3 final product preparation steps, per the IDEAS process simulation parameters of Process 1.

Table 9 delineates example design and IDEAS process simulation parameters for Phase 2 magnetic separation, stripping, and optional densimetric separation of Process 2;

Table 10 delineates example design and IDEAS process simulation parameters for Phase 2 leaching of Process 2;

Table 11 delineates example design and IDEAS process simulation parameters for Phase 2 intermediate product preparation steps of Process 2;

Table 12 delineates example design and IDEAS process simulation parameters for Phase 3 final product preparation steps of Process 2; and Table 13 delineates key reaction chemistry for Phase 3 final product preparation steps of Process 2, per the IDEAS process simulation parameters.

Table 14 delineates the mechanical design criteria for an embodiment of an apparatus/system for carrying out size reduction of battery materials under immersion conditions.

DETAILED DESCRIPTION

Unless defined otherwise, all technical and scientific terms used herein have the same meaning as commonly understood by one of ordinary skill in the art to which this application belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

The term "battery" or "batteries" are used herein refer to rechargeable lithium-ion batteries, unless the context clearly dictates otherwise.

Lithium-Ion Batteries

Components

Lithium-ion batteries are a type of rechargeable battery in which lithium ions drive an electrochemical reaction. Lithium has a high electrochemical potential and provides a high energy density for weight. Typically, lithium-ion battery cells have four key components:

a. Positive electrode/cathode: comprises differing formulations of lithium metal oxides and lithium iron phosphate depending on battery application and manufacturer, intercalated on a cathode backing foil/current collector (e.g. aluminum)—for example: $LiNi_xMn_yCo_zO_2$ (NMC); $LiCoO_2$ (LCO); $LiFePO_4$ (LFP); $LiMn_2O_4$ (LMO); $LiNi_{0.8}Co_{0.15}Al_{0.05}O_2$ (NCA);

b. Negative electrode/anode: generally, comprises graphite intercalated on an anode backing foil/current collector (e.g. copper);

c. Electrolyte: for example, lithium hexafluorophosphate ($LiPF_6$), lithium tetrafluoroborate ($LiBF_4$), lithium perchlorate ($LiClO_4$), lithium hexafluoroarsenate monohydrate ($LiAsF_6$), lithium trifluoromethanesulfonate ($LiCF_3SO_3$), lithium bis(bistrifluoromethanesulphonyl) (LiTFSI), lithium organoborates, or lithium fluoroalkylphosphates dissolved in an organic solvent (e.g., mixtures of alkyl carbonates, e.g. $C_1$-$C_6$ alkyl carbonates such as ethylene carbonate (EC, generally required as part of the mixture for sufficient negative electrode/anode passivation), ethyl methyl carbonate (EMC), dimethyl carbonate (DMC), diethyl carbonate (DEC), propylene carbonate (PC)); and d. Separator between the cathode and anode: for example, polymer or ceramic based.

Thus, rechargeable lithium-ion batteries comprise a number of different materials. The term "black mass" refers to the combination of cathode and/or anode electrode powders comprising lithium metal oxides and lithium iron phosphate (cathode) and graphite (anode), as referenced above. Materials present in rechargeable lithium-ion batteries therefore include organics such as alkyl carbonates (e.g. $C_1$-$C_6$ alkyl carbonates, such as ethylene carbonate (EC), ethyl methyl carbonate (EMC), dimethyl carbonate (DMC), diethyl carbonate (DEC), propylene carbonate (PC), and mixtures thereof), iron, aluminum, copper, plastics, graphite, cobalt, nickel, manganese, and of course lithium. Recovering such materials from rechargeable lithium-ion batteries is highly desirable.

Lithium-ion battery cells are manufactured in a variety of shapes/form factors, such as:

a. cylindrical cells, b. prismatic cells; and c. pouch cells.

Small format lithium-ion batteries (e.g. in consumer electronic applications) generally consist of one to several cells, each cell having a cathode, anode, electrolyte, and a separator. Typically, each cell is housed in steel, aluminum, and/or plastic. If the small format lithium-ion battery includes multiple cells (e.g. as generally the case in laptop lithium-ion batteries), the overall battery pack is typically housed in plastic, or possibly other materials depending on the application, such as aluminum and/or steel.

Large format lithium-ion battery packs (e.g. in automotive and stationary energy storage system applications) are generally structured as follows:

a. Cells: cells contain the cathode, anode, electrolyte, separator, housed in steel, aluminum, and/or plastic;

b. Modules: multiple cells make up a module, typically housed in steel, aluminum, and/or plastic; and c. Battery pack: multiple modules make up a battery pack, typically housed in steel, aluminum, and/or plastic.

An estimated weighted-average composition of mixed format lithium-ion battery packs (i.e. weighted-average mixture of small and large format lithium-ion batteries, incorporating contributions of specific lithium-ion battery cathode chemistries based on possible current and near-term manufacturing) by weight percentage (i.e. kg material/kg lithium-ion battery pack) comprises approximately: 4% Ni, 5% Mn, 7% Co, 7% $Li_2CO_3$ (expressed as lithium carbonate equivalent), 10% Cu, 15% Al, 16% graphite, and 33% other materials. By way of further example, an estimated possible summary of small and large format lithium-ion battery components forecasted in 2025 and 2030 is provided in Table 1.

Of these components, it is estimated that approximately seven comprise 90% of the residual value in a spent lithium-ion battery: cobalt, lithium, copper, graphite, nickel, aluminum, and manganese. For example, an estimated weighted-average composition of mixed format lithium-ion battery packs based on residual values of contained materials in a spent lithium-ion battery (USD per kg material/kg lithium-ion battery pack) comprises approximately: 9% Ni, 2% Mn, 39% Co, 16% $Li_2CO_3$ (expressed as lithium carbonate equivalent) 12% Cu, 5% Al, 10% graphite, and 7% other materials.

Recharging

As a lithium-ion battery cell charges and discharges, lithium ions move in and out of the anode and cathode. During this electrochemical reaction, a lithiated anode (e.g. graphite with lithium inside) and a transition metal oxide missing lithium are formed. Both the lithiated anode and transition metal oxide are reactive. These transition materials can experience 'parasitic reactions' with the typically organic-based electrolyte solution (which as noted above contains alkyl carbonates).

The anode particularly experiences such parasitic reactions, which results in a solid product that deposits on the anode surface. This solid product is called a solid electrolyte interphase (SEI). Over time, this forms a passivating film that slows down and limits further electrochemical reactions.

For example, scanning electron microscope images of aged/cycled cathode and anode materials have shown that, with respect to cathodes of lithium-ion cells utilizing a mixed organic based electrolyte solution, the cathodes exhibit limited surface deposition of solid electrolyte interphase. By contrast, an aged/cycled anode consisting of graphite exhibits solid electrolyte interphase. The presence of a solid electrolyte interphase across a layered graphite anode reduces the electrochemical reaction efficiency that powers lithium-ion cells by limiting sites for lithium to intercalate. Over time, this reduces the lithium-ion battery cell's ability to deliver energy and eventually causes the battery cell to become 'spent'.

Process 1

In one embodiment of Process 1, there is provided a process for recovering materials from rechargeable lithium-ion batteries comprising:

a) processing lithium-ion batteries to form a size-reduced feed stream;

b) separating the size-reduced feed stream into a magnetic product stream and a first non-magnetic feed stream;

c) optionally isolating a ferrous product from the magnetic product stream;
d) separating the first non-magnetic feed stream into an aluminum product stream and a second non-magnetic feed stream;
e) optionally isolating an aluminum product from the aluminum product stream;
f) leaching the second non-magnetic feed stream with acid to form a leached slurry;
g) separating the leached slurry into a first product stream and a second product stream;
h) optionally isolating a first copper product from the first product stream;
i) separating the second product stream into a graphite product stream and a third product stream;
j) optionally isolating a graphite product from the graphite product stream;
k) optionally filtering the third product stream to isolate organics and solids to form a fourth product stream;
l) depositing a second copper product from the third or fourth product stream to form a fifth product stream;
m) isolating a Co, Ni, and/or Mn product from the fifth product stream to form a sixth product stream; and
n) isolating a lithium product from the sixth product stream.

For example, see FIG. 1A, which depicts a block flow diagram of an embodiment of Process 1.

In another embodiment of Process 1, processing step a) comprises: optionally discharging lithium-ion batteries to approximately between 1-2V; or, alternatively, to approximately 0V; optionally storing discharged energy in a power bank; crushing, shredding, or milling the lithium-ion batteries under aqueous immersion; optionally separating the crushed, shredded, or milled lithium-ion batteries into a first reduced-sized feed stream having feed material of a first size, and a second reduced-sized feed stream having feed material of a second size; and optionally crushed, shredded, or milled the second reduced-sized feed stream to have feed material of the first size. In another embodiment, aqueous immersion comprises water or brine immersion. In yet another embodiment, the first size is approximately ≤10 mm. In still yet another embodiment, processing step a) has an operating temperature of approximately ≥2° C.-<100° C.; or alternatively, approximately ≥2° C.-69° C.; or, alternatively, approximately 60° C. In still yet another embodiment separating step b) comprises: separating the size-reduced feed stream into the magnetic product stream and the first non-magnetic feed stream via wet magnetic separation. In another embodiment, separation step d) comprises: separating the aluminum product stream and the second non-magnetic feed stream from the first non-magnetic feed stream via eddy current separation, densimetric separation, air-sorting separation, or a combination thereof. In still yet another embodiment, the acid of leaching step f) comprises sulfuric acid, a mixture of sulfuric acid and hydrogen peroxide, nitric acid, a mixture of nitric acid and hydrogen peroxide, or hydrochloric acid. In still yet another embodiment, separating step g) comprises: separating the leached slurry into the first product stream and the second product stream via countercurrent decantation. In another embodiment, separating step i) comprises separating the second product stream into a graphite product stream and a third product stream via: agglomeration optionally using a flocculant; and flotation. In another embodiment, flotation involves a first flotation step and a second flotation step. In yet another embodiment, filtering step k) comprises: filtering the third product stream to isolate organics and solids via dual media filtration; and optionally filtering the fourth product stream through an activated carbon filter. In another embodiment, dual media filtration involves filtering the third product stream through a dual media filter having anthracite as a first media and garnet as a second media. In yet another embodiment, depositing step l) comprises: isolating a copper product stream from the third or fourth product stream, and depositing $Cu^0$ from the copper product stream via electrowinning. In another embodiment, isolating the copper product stream from the third or fourth product stream involves copper ion exchange or copper solvent extraction. In yet another embodiment, copper solvent extraction involves using an extractant, such as an organic ketoxime extractant. In still yet another embodiment, isolating step m) comprises: adding a source of hydroxide to the fifth product stream to precipitate a Co, Ni, and/or Mn hydroxide product; adding a source of carbonate to the fifth product stream to precipitate a Co, Ni, and/or Mn carbonate product; evaporative crystallizing the fifth product stream in the presence of a sulfate source to form a Co, Ni, and/or Mn sulfate product; or adding a source of hydroxide to the fifth product stream to precipitate a Co, Ni, and/or Mn hydroxide product, followed by thermal dehydration to produce a Co, Ni, and/or Mn oxide product. In another embodiment, isolating step n) comprises: adding a carbonate to either the sixth product stream to precipitate lithium carbonate; or adding a hydroxide to either the sixth product stream to form a lithium hydroxide solution, and evaporative crystallizing the lithium hydroxide solution to form lithium hydroxide monohydrate. In another embodiment, the process further comprises purifying the lithium carbonate via: converting the lithium carbonate into lithium bicarbonate; and steam-treating the lithium bicarbonate to re-form lithium carbonate. In another embodiment, the process further comprises purifying the lithium hydroxide monohydrate via: dissolving the lithium hydroxide monohydrate in water; and recrystallizing the lithium hydroxide monohydrate using a mechanical vapor recompression crystallizer. In yet another embodiment, when the acid of leaching step f) comprises sulfuric acid, or a mixture of sulfuric acid and hydrogen peroxide, the process further comprises: step (o) of isolating a sulfate product stream from either the fifth or sixth product stream. In another embodiment, isolating step o) comprises: evaporative crystallizing the sulfate product stream to form a sulfate product; or crystallizing the sulfate product stream using draft tube baffle crystallizers to form a sulfate product.

Thus, in an embodiment of Process 1 of the present application, there is provided a process for recovering materials from rechargeable lithium-ion batteries comprising three main phases: (i) feed size reduction (e.g., see FIG. 1A, step a); (ii) leaching, countercurrent decantation, and intermediate product preparation (e.g., see FIG. 1A, steps b-f); and (iii) final product preparation (e.g., see FIG. 1A, steps g-n).

Referring to FIG. 1A, step a) provides a size-reduced feed stream that results from feed size reduction.

In an embodiment of feed size reduction, there is provided a process comprising optionally discharging small format lithium-ion batteries (e.g., from phones, laptops, etc.) and/or large format lithium-ion batteries (e.g. from electric vehicles) to approximately between 1-2V; or, alternatively to approximately 0V. In another embodiment, there is provided a process comprising optionally storing discharged energy in a central power bank (e.g. to provide peak-load reduction for plant facility-wide power consumption).

In another embodiment of feed size reduction, there is provided a process comprising crushing, shredding, or milling the optionally discharged lithium-ion batteries to form a reduced-sized battery feed stream. In embodiments, the batteries are crushed/shredded to a size of mm. In further embodiments, the batteries are crushed/shredded under water/aqueous solution immersion; or, more particularly, under water or brine immersion (to absorb heat from sparking, etc.). In yet other embodiments, the batteries are crushed/shredded at a temperature between approximately ≥2° C.-<100° C.; or alternatively, approximately ≥2° C.-69° C.; or, alternatively, approximately 60° C.

In another embodiment of feed size reduction, there is provided a process comprising a two stage-crushing of the batteries to form a reduced-sized battery feed stream. In embodiments, the two-stage crushing occurs under water/aqueous solution immersion; or, more particularly, under water or brine immersion to: (i) restrict accumulation of oxygen; (ii) minimize risk of combustion during crushing by suppressing any sparking caused by crushing and absorbing it as heat; and, (iii) entrain the batteries' electrolyte solution. In some embodiments, the brine solution comprises an aqueous sodium chloride solution. In other embodiments, the brine solution comprises a dilute aqueous solution of calcium hydroxide (also known as slaked or hydrated lime) to assist with neutralizing potential halides from electrolyte salts and thereby minimizing hydrolysis (e.g. formation of aqueous hydrofluoric acid/HF) that may result in increased materials/equipment corrosion; and/or, to minimize potential to form sodium fluoride salts. In embodiments, the two-stage crushing comprises a first crusher that accepts large format lithium-ion batteries and reduces their size to 400 mm; and, a second crusher that accepts small format lithium-ion batteries and reduced-size large format lithium-ion batteries, and reduces that combined battery feed stream to a size of ≤100 mm. In embodiments, the two-stage crushing occurs at a temperature between approximately ≥2° C.-<100° C.; or alternatively, approximately ≥2° C.-69° C.; or, alternatively, approximately 60° C.

In another embodiment of feed size reduction, there is provided a process comprising screening of the reduced-sized battery feed stream. In embodiments, the reduced-sized battery feed stream is separated into an undersized fraction of mm and an oversized fraction of ≥0 mm to ≤100 mm. In embodiments, the undersized fraction undergoes solid-liquid separation to form a filter cake comprising particles that are mm. In some embodiments, the solid-liquid separation occurs via a belt filter. In embodiments, the oversized fraction is shredded to ≤10 mm. In some embodiments, the oversized fraction is shredded using shredders similar to industrial scale shredders found in waste electronic recycling and food processing facilities. In embodiments, the undersized fraction of ≤10 mm and oversized fraction is shredded to ≤10 mm is combined to form a size-reduced feed stream, as per FIG. 1A, step a.

In another embodiment of feed size reduction, there is provided a process comprising magnetic separation (for example, see FIG. 1A, step b)) of the size-reduced battery feed to separate magnetic/ferrous materials (e.g. steel sheet; ferrous product(s); magnetic product stream, FIG. 1A) from non-magnetic/non-ferrous and inert materials (e.g., $1^{st}$ non-magnetic feed stream, FIG. 1A). In embodiments, the magnetic separation is wet magnetic separation. In some embodiments, the wet magnetic separation comprises 'rougher' and 'cleaner' magnetic separation steps. In some embodiments, the wet magnetic separation uses low intensity magnetic separation equipment.

In another embodiment of feed size reduction, there is provided a process comprising eddy current separation of the non-magnetic/non-ferrous size-reduced battery feed to separate any residual magnetic/ferrous materials (e.g. steel sheet; ferrous product(s)) from the non-magnetic/non-ferrous and inert material. In embodiments, the eddy current separation provides for separation of an aluminum product stream (for example, see FIG. 1A, step d) and aluminum product stream). In other embodiments, eddy current separation, densimetric separation, air-sorting separation, or a combination thereof provide for separation of the aluminum product stream. In embodiments, the eddy current separation provides for isolation of any residual magnetic/ferrous materials (e.g. steel sheet; ferrous product(s)) to recycle back to the wet magnetic separation.

In an embodiment of leaching, countercurrent decantation, and intermediate product preparation, there is provided a process comprising acid leaching of the non-magnetic/non-ferrous and inert materials from eddy current separation (excluding separated aluminum product stream; for example, the $2^{nd}$ non-magnetic feed stream, FIG. 1A) to form a leached slurry (for example, see FIG. 1A, step f)). In embodiments, the acid used is sulfuric acid, hydrochloric acid, or nitric acid. In some embodiments, hydrogen peroxide is used to facilitate leaching of nobler metals. In some embodiments, leaching occurs at an operating temperature between approximately 60-95° C. In some embodiments, leaching occurs in a conical-bottom tank under high shear agitation.

In an embodiment of leaching, countercurrent decantation, and intermediate product preparation, there is provided a process comprising screening the leached slurry into an undersized fraction of ≤5 mm and an oversized fraction of ≥5 mm. In embodiments, the oversized fraction is recycled back to the wet magnetic separation for further separation.

In an embodiment of leaching, countercurrent decantation, and intermediate product preparation, there is provided a process comprising countercurrent decantation (CCD) of the leached slurry (for example, see FIG. 1A, step g)). In embodiments, CCD separates slimes/residue or 'copper concentrate', consisting predominantly of copper, some residual shredded aluminum, residual shredded steel, paper and plastic, as an underflow stream (e.g., $1^{st}$ product stream, FIG. 1A); and, separates a combined aqueous leachate phase (pregnant leach solution or PLS) and floating/low density phase (e.g., graphite, organic) as an overflow stream (e.g., $2^{nd}$ product stream, FIG. 1A). In some embodiments, the CCD uses several stages of high density thickeners.

In an embodiment of leaching, countercurrent decantation, and intermediate product preparation, there is provided a process wherein the CCD overflow stream from reports to an agglomeration tank, in which a flocculant is added to assist in agglomeration of the graphite and organic phases. In embodiments, the solution from the agglomeration tank reports to flotation cells to selectively separate a hydrophobic phase (e.g., graphite agglomerated with flocculant, and organic; graphite product stream, FIG. 1A) from a hydrophilic phase (e.g., aqueous PLS). In embodiments, the flotation cells include a 'rougher flotation cell' that completes a preliminary separation of the hydrophobic and hydrophilic phases; and, a 'cleaner flotation cell' to which the 'rougher flotation cell' froth reports to, to further separate the hydrophobic and hydrophilic phases. In embodiments, froth from the 'cleaner flotation cell' reports to solid-liquid separation to optionally isolate a solid or 'graphite concentrate' phase (for example, see FIG. 1A, step j)). In some embodiments, a centrifuge is used to achieve solid-liquid separation.

In an embodiment of leaching, countercurrent decantation, and intermediate product preparation, there is provided a process comprising combining residual PLS from the 'rougher flotation cell' and 'cleaner flotation cell' (e.g., $3^{rd}$ product stream, FIG. 1A) (optionally with liquid (e.g. centrate) from the solid-liquid filtration of froth from the 'cleaner flotation cell'; step j), FIG. 1A); and, optionally filtering the combined liquid stream through a dual media filter to separate entrained organics (for example, see FIG. 1A, step k)). In embodiments, a dual media filter similar to filters found in copper solvent extraction is used. In embodiments, the dual media filter comprises filtration media such as anthracite, garnet, and/or sand. In some embodiments, the liquid stream output from the dual media filter (e.g., $4^{th}$ product stream, FIG. 1A) optionally reports to an activated carbon filter to further separate any entrained organics.

In an embodiment, there is provided a process optionally comprising dewatering the magnetic/ferrous materials (e.g., steel sheet; ferrous product(s)) from magnetic separation; and, collecting and storing said dewatered materials (for example, see FIG. 1A, step c) and ferrous product). In embodiments, the process optionally comprises dewatering the aluminum product stream from eddy current separation; and, collecting and storing the dewatered aluminum product (for example, see FIG. 1A, step e) and aluminum product). In embodiments, a dewatering screen is used, wherein the screen is steeply inclined to facilitate water/aqueous solution drainage.

In an embodiment of final product preparation, there is provided a process optionally comprising a solid-liquid separation of slimes/residue or final underflow stream from the CCD to produce a copper concentrate. In some embodiments, a belt filter is used to achieve solid-liquid separation. For example, see FIG. 1A, step h) and $1^{st}$ copper product.

In an embodiment of final product preparation, there is provided a process optionally comprising collecting graphite concentrate from the solid-liquid separation of froth from the 'cleaner flotation cell'. In some embodiments, the graphite concentrate is collected as the solid product from centrifugation of froth from the 'cleaner flotation cell'. For example, see FIG. 1A, step j) and graphite product.

In an embodiment of final product preparation, there is provided a process comprising a copper-ion exchange of the liquid stream output from dual media filtration. In embodiments, a copper selective resin is used; for example, LEWATIT® M+ TP 207. In some embodiments, the process comprises a solvent extraction of the liquid stream output from dual media filtration. In some embodiments, the solvent extraction involves mixer-settler extraction stage(s) that load copper cations into a copper selective extractant, such as an organic ketoxime extractant (e.g., LIX® 84) in a diluent (e.g. kerosene)). In other embodiments, the solvent extraction involves mixer-settler strip stage(s) where spent electrolyte from copper electrowinning (below) is used to strip copper-loaded organics and transfer copper cations into an aqueous phase prior to copper electrowinning.

In an embodiment of final product preparation, there is provided a process comprising copper electrowinning of a copper-rich liquor from copper-ion exchange to produce elemental copper (i.e., $Cu^0$). In embodiments, copper electrowinning (e.g. conventional copper electrowinning, Emew® electrowinning, etc.) is used for deposition of copper/$Cu^0$ as copper plate. For example, see FIG. 1A, step l) and $2^{nd}$ copper product.

In an embodiment of final product preparation, there is provided a process comprising producing a Co, Ni, and/or Mn product. In embodiments, the Co, Ni, and/or Mn product is a hydroxide product. In embodiments, a copper-stripped liquor from copper-ion exchange (e.g., $5^{th}$ product stream, FIG. 1A) is reacted with a source of hydroxide (e.g., alkali metal hydroxides such as sodium hydroxide/NaOH, alkali earth metal hydroxides, etc.) to precipitate a Co, Ni, and/or Mn hydroxide product (for example, see FIG. 1A, Co, Ni, and/or Mn product). In other embodiments, the Co, Ni, and/or Mn product is a carbonate product. In embodiments, the copper-stripped liquor reporting from copper-ion exchange (e.g., $5^{th}$ product stream, FIG. 1A) is reacted with a source of carbonate (e.g., alkali metal carbonates such as sodium carbonate/$Na_2CO_3$, alkali earth metal carbonates, etc.) to precipitate a Co, Ni, and/or Mn carbonate product (for example, see FIG. 1A, Co, Ni, and/or Mn product). In other embodiments, the Co, Ni, and/or Mn product is an oxide product. In embodiments, the copper-stripped liquor from copper-ion exchange (e.g., $5^{th}$ product stream, FIG. 1A) is reacted with a source of hydroxide (e.g., alkali metal hydroxides such as sodium hydroxide/NaOH, alkali earth metal hydroxides, etc.) to precipitate a Co, Ni, and/or Mn hydroxide product that reports to thermal dehydration to produce a Co Ni, and/or Mn oxide product (e.g., cobalt (II, III) oxide, $Co_3O_4$, nickel (II) oxide, NiO, manganese (IV) dioxide, $MnO_2$; for example, see FIG. 1A, Co, Ni, and/or Mn product). In embodiments, the Co, Ni, and/or Mn product reports to solid-liquid filtration to collect a solid filter cake. In some embodiments, a filter press is used to achieve solid-liquid separation. In other embodiments, wherein sulfuric acid or a mixture of sulfuric acid and hydrogen peroxide is used for acid leaching, the copper-stripped liquor from copper ion exchange reports to an evaporative crystallizer to produce a cobalt sulfate heptahydrate/$CoSO_4.7H_2O$, nickel sulfate hexahydrate/$NiSO_4.6H_2O$, and/or manganese sulfate monohydrate/$MnSO_4.H_2O$ product. In embodiments, the resulting crystallized product(s) reports to solid-liquid separation; and, separated solid product(s) reports to a drier to drive off excess water and produce a hydrated cobalt, nickel, and/or manganese sulfate (for example, see FIG. 1A, Co, Ni, and/or Mn product). In some embodiments, a centrifuge is used to achieve solid-liquid separation.

In an embodiment of final product preparation, there is provided a process comprising precipitating a lithium product. In embodiments, a liquid stream output from the Co, Ni, and/or Mn product production (e.g., $6^{th}$ product stream, FIG. 1A) is reacted with a carbonate, such as sodium carbonate to precipitate crude lithium carbonate. In embodiments, the crude lithium carbonate product undergoes solid-liquid separation, for example using a centrifuge, and a solid cake is collected (for example, see FIG. 1A, step n) and lithium product). In embodiments, the crude lithium carbonate cake reports to a bicarbonation circuit for further purification, wherein carbon dioxide is bubbled into a tank to convert the lithium carbonate into more soluble lithium bicarbonate (i.e. lithium carbonate 'digestion'). In some embodiments, the liquid stream containing soluble lithium bicarbonate reports to an ion exchange unit to selectively remove trace impurities such as calcium and magnesium. In embodiments, the solution containing soluble lithium bicarbonate reports to a tank where steam is bubbled through to crystallize higher purity lithium carbonate as a solid. In other embodiments, crystallizing the higher purity lithium carbonate comprises electrolysis, direct immersion electric heating, element electric heating, or indirect electric heating. In some embodiments, output from the lithium carbonate crystallization undergoes solid-liquid separation, for example using a centrifuge, to isolate the solid lithium carbonate product. In other embodiments, the liquid filtrate (e.g. centrate) is recycled to the lithium carbonate 'digestion' tank. In further embodiments, the isolated high purity solid lithium carbonate stream is dried and micronized.

In an embodiment of final product preparation, wherein sulfuric acid or a mixture of sulfuric acid and hydrogen peroxide is used for acid leaching, there is provided a process comprising crystallizing sodium sulfate. In embodiments, filtrate (e.g. centrate) from the crude lithium carbonate solid-liquid separation (e.g. centrifugation) reports to an evaporative crystallizer to produce sodium sulfate decahydrate/$Na_2SO_4 \cdot 10H_2O$. In some embodiments, sulfuric acid is added during crystallization to convert residual carbonate (e.g. $Na_2CO_{3(aq)}$) into a sulfate form. In some embodiments, the resulting crystallized slurry reports to solid-liquid separation; and, separated solid product reports to a drier, wherein the drier drives off water and produces anhydrous sodium sulfate/$Na_2SO_4$. In some embodiments, solid-liquid separation achieved using a centrifuge.

In an embodiment of final product preparation, wherein hydrochloric acid is used for acid leaching, there is provided a process wherein a sodium chloride solution is produced as a by-product. In embodiments, the sodium chloride solution is: (i) recycled to the feed size reduction step(s) for use as a brine solution, a portion of which is optionally bled to a water treatment plant followed by reuse in the facility; or (ii) crystallized to from a solid sodium chloride product, optionally followed by solid-liquid separation and drying.

In an embodiment of final product preparation, wherein nitric acid or a mixture of nitric acid and hydrogen peroxide is used for acid leaching, there is provided a process wherein a sodium nitrate solution is produced as a by-product. In embodiments, the sodium nitrate solution is: (i) crystallized to from a solid sodium nitrate product, optionally followed by solid-liquid separation and drying.

Process 2

As noted above, rechargeable lithium-ion batteries comprise a number of different materials, including organics such as alkyl carbonates (e.g. CC alkyl carbonates), iron, aluminum, copper, plastics, graphite, cobalt, nickel, manganese, and of course lithium. In an embodiment of Process 2, there is provided a process for recovering materials from rechargeable lithium-ion batteries comprising:

i) processing lithium-ion batteries to form a size-reduced feed stream;

ii) separating the size-reduced feed stream into a magnetic product stream and a non-magnetic feed stream;

iii) optionally isolating a ferrous product from the magnetic product stream;

iv) stripping the non-magnetic feed stream with a stripping solvent to form a stripped slurry stream;

v) separating the stripped slurry stream into an oversize solids portion and an undersize stripped slurry stream;

vi) optionally separating the oversize solids portion of the stripped slurry stream into a preliminary aluminum product stream, a preliminary copper product stream, and a plastic product stream;

vii) subjecting the undersize stripped slurry stream to a solid-liquid separation to form a black mass solid stream and recovered stripping solvent;

viii) leaching the black mass solid stream with an acid to form a pregnant leach solution and residual solids;

ix) separating the pregnant leach solution from the residual solids to form a first product stream comprising the residual solids and a second product stream comprising the pregnant leach solution;

x) optionally isolating a graphite product from the first product stream;

xi) isolating a copper product from the second product stream to form a third product stream;

xii) isolating an aluminum (Al) and/or iron (Fe) product from the third product stream to form a fourth product stream;

xiii) isolating a cobalt (Co), nickel (Ni), and/or manganese (Mn) product from the fourth product stream to form a fifth product stream;

xiv) isolating a salt by-product from the fifth product stream to form a sixth product stream; and xv) isolating a lithium product from the sixth product stream.

Figure 1B:
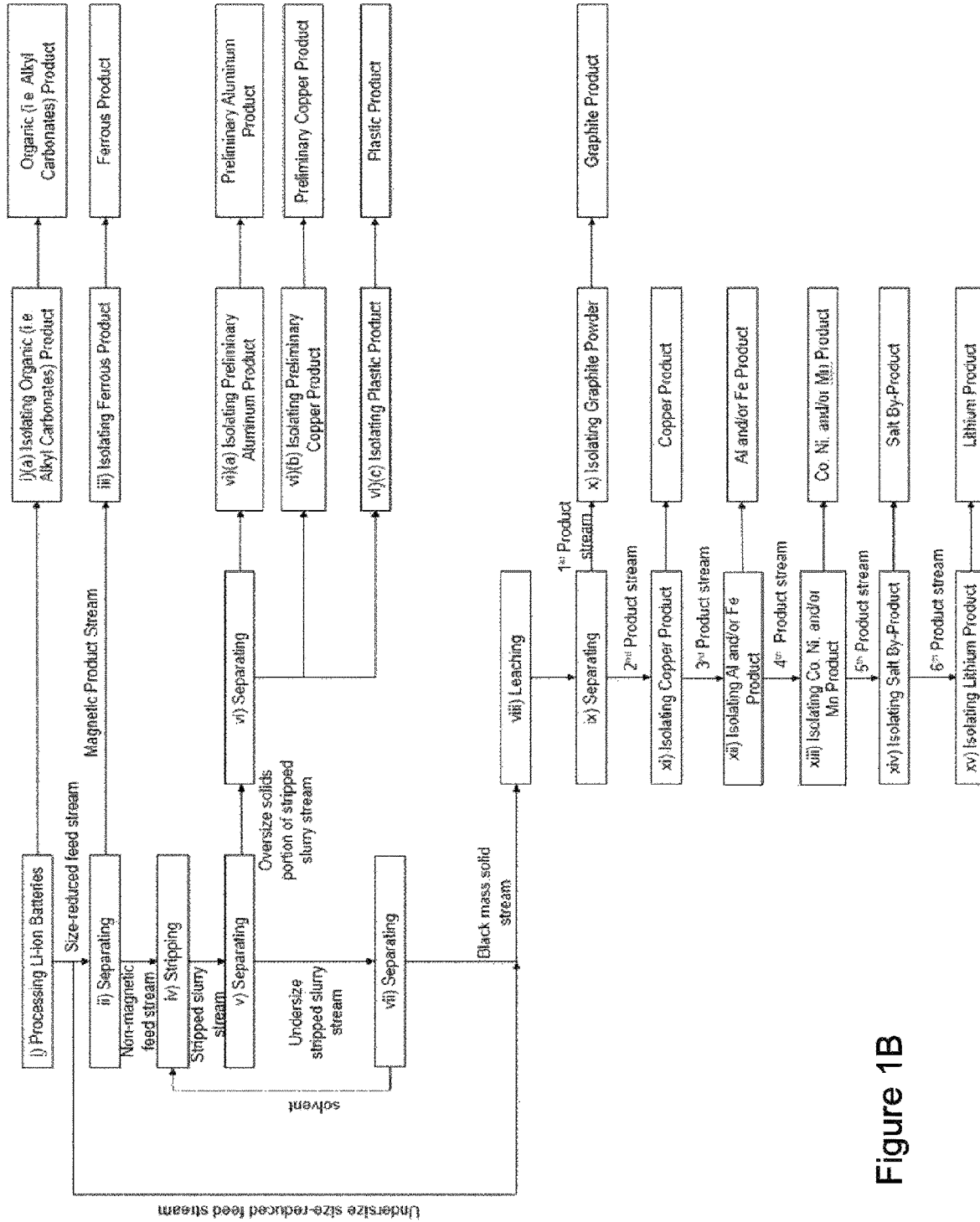
FIG. 1B depicts a block flow diagram of an embodiment of a second process as described herein ("Process 2").

See, for example, FIG. 1B, which depicts a block flow diagram of an embodiment of Process 2.

Thus, in an embodiment of Process 2 of the present application, there is provided a process for recovering materials from rechargeable lithium-ion batteries comprising three main phases: (i) feed size reduction (e.g., see FIG. 1B, steps (i) and (i)(a)); (ii) leaching, and intermediate product preparation (e.g., see FIG. 1B, steps (ii)-(x)); and (iii) final product preparation (e.g., see FIG. 1B, steps (xi)-(xv)).

Referring to FIG. 1B, step i) provides a size-reduced feed stream that results from feed size reduction. In an embodiment of Process 2, processing step i) comprises: optionally discharging lithium-ion batteries to approximately between 1-2V; or, alternatively, to approximately 0V; optionally storing discharged energy in a power bank; crushing, shredding, or milling the lithium-ion batteries under aqueous immersion; optionally separating the crushed, shredded, or milled lithium-ion batteries into a first reduced-sized feed stream having feed material of a first selected size, and a second reduced-sized feed stream having feed material of a second size; and optionally crushing, shredding, or milling the second reduced-sized feed stream to have feed material of the first selected size.

In another embodiment of Process 2, aqueous immersion comprises immersion in water, or immersion in an aqueous solution comprising (i) a salt and/or (ii) calcium hydroxide. In another embodiment, the salt is selected from an alkali metal chloride (e.g. sodium chloride (NaCl)), an alkaline earth metal chloride (e.g. calcium chloride ($CaCl_2$)), or mixtures thereof. In yet another embodiment, the first selected size is approximately ≤40 mm, preferably ≤10 mm. In still yet another embodiment, processing step i) has an operating temperature of approximately ≥2° C. to <100° C.; or alternatively, approximately ≥2° C. to ≤69° C.; or, alternatively, approximately 60° C.

Thus, in an embodiment of feed size reduction, there is provided a process comprising optionally discharging small format lithium-ion batteries (e.g., from phones, laptops, etc.) and/or large format lithium-ion batteries (e.g. from electric vehicles) to approximately between 1-2V; or, alternatively to approximately 0V. In another embodiment, there is provided a process comprising optionally storing discharged energy in a central power bank (e.g. to provide peak-load reduction for plant facility-wide power consumption).

In another embodiment of feed size reduction, there is provided a process comprising crushing, shredding, or milling the optionally discharged lithium-ion batteries to form a reduced-sized battery feed stream. In embodiments, the batteries are crushed/shredded to a size of ≤40 mm, preferably ≤10 mm. In further embodiments, the batteries are crushed/shredded underwater/aqueous solution immersion; or, more particularly, underwater or brine immersion (to absorb heat from sparking, etc.). In yet other embodiments, the batteries are crushed/shredded at a temperature between approximately ≥2° C. to <100° C.; or alternatively, approximately ≥2° C. to <69° C.; or, alternatively, approximately 60° C. In embodiments, aqueous immersion comprises immersion in water, or immersion in an aqueous solution comprising (i) a salt and/or (ii) calcium hydroxide as noted above.

In another embodiment of feed size reduction, there is provided a process comprising a two stage-crushing/shredding of the batteries to form a reduced-sized battery feed stream. In embodiments, the two-stage crushing/shredding occurs under water/aqueous solution immersion; or, more particularly, under water or brine immersion to: (i) restrict accumulation of oxygen; (ii) minimize risk of combustion during crushing by suppressing any sparking caused by crushing and absorbing it as heat; and, (iii) entrain the batteries' electrolyte solution. In some embodiments, the brine solution comprises an aqueous sodium chloride solution. In other embodiments, the brine solution comprises a dilute aqueous solution of calcium hydroxide (also known as slaked or hydrated lime) to assist with neutralizing potential halides from electrolyte salts and thereby minimizing hydrolysis (e.g. formation of aqueous hydrofluoric acid/HF) that may result in increased materials/equipment corrosion; and/or, to minimize potential to form sodium fluoride salts. In embodiments, the two-stage crushing/shredding comprises a first crusher/shredder that accepts large format lithium-ion batteries and reduces their size to ≤400 mm; and, a second crusher/shredder that accepts small format lithium-ion batteries and reduced-size large format lithium-ion batteries, and reduces that combined battery feed stream to a size of ≤100 mm. In embodiments, the two-stage crushing/shredding occurs at a temperature between approximately ≥2° C. to <100° C.; or alternatively, approximately ≥2° C. to ≤69° C.; or, alternatively, approximately 60° C.

In another embodiment of feed size reduction, there is provided a process comprising screening of the reduced-sized battery feed stream (following the above-noted two-stage crushing/shredding as well as any additional comminuting steps following same). In embodiments, the reduced-sized battery feed stream is separated into an undersized fraction of ≤10 mm and an oversized fraction of ≥10 mm to ≤100 mm. In embodiments, the undersized fraction undergoes solid-liquid separation to form a filter cake comprising particles that are 510 mm and a liquid filtrate stream. In some embodiments, the solid-liquid separation occurs via a belt filter. In embodiments, the oversized fraction is shredded to ≤10 mm. In some embodiments, the oversized fraction is shredded using shredders similar to industrial scale shredders found in waste electronic recycling and food processing facilities. In embodiments, the undersized fraction of ≤10 mm and oversized fraction shredded to ≤10 mm is combined to form a size-reduced feed stream, as per FIG. 1B, step (i).

In certain embodiments, undersize materials having a particle size of, for example, less than about 5 mm, or less than about 1-2 mm, can be collected during the feed size reduction and diverted to downstream process steps. For example, per FIG. 1B, undersize materials having a particle size of, for example, less than about 5 mm, or less than about 1-2 mm, can be collected from step (i) (wherein the lithium-ion batteries are processed to produce a size-reduced feed stream) and separated from the remainder of the size-reduced feed stream. For example, such undersize materials could be collected by having the output of a crusher/shredder contact a metal mesh having openings sized to permit particles having a size of less than about 5 mm or less than about 1-2 mm to pass through and be collected. The undersize materials form an undersize size-reduced feed stream which can be combined with, for example, a black mass solid stream (see step (vii) of FIG. 1B; described in further detail below) and these combined materials can then be subjected to leaching step (viii) (described in further detail below).

In another embodiment of feed size reduction, there is provided an optional process of crushing, shredding, or milling the lithium-ion batteries under aqueous immersion in an aqueous solution to produce the size-reduced feed stream and a liquid, wherein the liquid comprises the aqueous solution and organics (such as one or more alkyl carbonates), wherein the process further comprises: carrying out a solid-liquid separation to separate at least a portion of the liquid from the size reduced feed stream, and subjecting the separated liquid to a separating step to separate the organics from the aqueous solution (for example, see FIG. 1B, step (i)(a)). In embodiments, organics (such as one or more alkyl carbonates) are separated from the aqueous components through dual media filtration or vacuum distillation. In some embodiments, the filtered organics are separated into organic rich streams. In some embodiments, the separated aqueous components are recycled to the two-stage crushing/shredding process.

In another embodiment, separating step ii) noted above comprises: separating the size-reduced feed stream into the magnetic product stream and the non-magnetic feed stream via wet or dry magnetic separation. Thus, in one embodiment, there is provided a process comprising magnetic separation (for example, see FIG. 1B, step (ii)) of the size-reduced battery feed to separate magnetic/ferrous materials (e.g. steel sheet; ferrous product(s); magnetic product stream, FIG. 1B) from non-magnetic/non-ferrous and inert materials (e.g., non-magnetic feed stream, FIG. 1B). In embodiments, the magnetic separation is wet/dry magnetic separation. In some embodiments, the wet/dry magnetic separation comprises 'rougher' and 'cleaner' magnetic separation steps. In some embodiments, the wet/dry magnetic separation uses low intensity magnetic separation equipment.

In another embodiment, the process comprises mixing the non-magnetic feed stream with a stripping solvent (see step (iv) of FIG. 1B) to form a stripped slurry stream. It has been found that incorporation of the stripping step can enhance recovery of materials and can facilitate downstream processing. The stripping step can be conducted at temperatures ranging from room temperature (about 20° C.) to about 120° C., preferably from about 80° C. to about 100° C. The resulting stripped slurry stream (i.e. black mass/electrode powder stream), undergoes solid-liquid separation (see step (v) in FIG. 1B) by reporting to, for example, a wire mesh screen with, for example, openings ranging from about 500 μm to about 5 mm, preferably from about 500 μm to about 2 mm, producing an oversize solids portion of the stripped slurry stream (i.e. larger solids portion of the separation)—comprising aluminum, copper, and plastics—and an undersized stripped slurry stream (i.e. liquid portion of the separation containing smaller solids having the size range noted above, including black mass, in admixture with same). Suitable stripping solvents can include n-methyl-2-pyrrolidone (NMP), dimethylformamide (DMF), ethyl acetate (EtOAc), isopropanol (IPA), acetone, dimethyl sulfoxide (DMSO), or diethylformamide (DEF).

The undersized stripped slurry stream reports to a filter press for solid-liquid separation (see step (vii) in FIG. 1B) to yield a liquid containing the stripping solvent (i.e. recovered stripping solvent) and a black mass solid stream. The separated solvent is optionally collected into a tank, and is optionally recycled back to the stripping tanks for use as make-up solvent.

The oversize solids portion of the stripped slurry stream is optionally dried by reporting to, for example, a dewatering conveyor. In another embodiment, the process optionally further comprises separating the oversize solids portion of the stripped slurry stream (see step (vi) of FIG. 1B), such as by densimetric separation of the oversize solids portion of the stripped slurry stream. Thus, in one embodiment, separation step vi) comprises separating the oversize stripped slurry stream into the preliminary aluminum product stream, the preliminary copper product stream, and the plastic product stream via densimetric separation. A densimetric separator unit can separate the oversize solids portion of the stripped slurry stream into three separate streams, including a preliminary aluminum product stream, a preliminary copper product stream, and a plastic product stream. For example, the plastic can be separated using a liquid with a specific gravity (SG) of about 2.5, and thereafter aluminum can be separated from the copper using a liquid with an SG of about 2.85. The isolated streams are optionally washed and report to a dewatering screen to collect separate and washed preliminary aluminum product, preliminary copper product, and plastic product streams.

The black mass solid stream comprises at least one of electrode (e.g. metal oxide and/or metal phosphate cathode powders, graphite anode), plastic, and some residual non-ferrous (e.g. shredded copper and/or aluminum) components. This stream reports to a leach tank for leaching, together with the undersize size-reduced feed stream from step (i) as referenced above.

In embodiments, the leaching step comprises acid leaching of the black mass solid stream (see step (viii) of FIG. 1B). In certain embodiments, the acid used in the leaching step is sulfuric acid, hydrochloric acid, or nitric acid, preferably sulfuric acid. In some embodiments, hydrogen peroxide is used to facilitate leaching of nobler metals. In some embodiments, leaching occurs at an operating temperature between approximately 60-95° C. In embodiments, leaching occurs in a series of 3 tanks. In some embodiments, leaching occurs in conical-bottom tanks under high shear agitation. In some embodiments, oxygen gas is sparged to further oxidize the leached solution.

In another embodiment of leaching, and intermediate product preparation, there is provided a process wherein the leached slurry is filtered (for example, by filter press or belt filter; see step (ix) of FIG. 1B) to separate the residual solids as a $1^{st}$ product stream, which report to a mixing tank, from the aqueous solution (e.g., aqueous PLS), which forms a $2^{nd}$ product stream. Water is added to the mixing tank along with the residual solids, and the pH can be adjusted to between 4-8. In embodiments, step x) of isolating a graphite product from the first product stream comprises isolating the graphite product via flotation, wherein flotation optionally comprises a first flotation step and a second flotation step. Thus, in embodiments, the solution from the mixing tank reports to flotation cells to selectively separate a hydrophobic phase (e.g., graphite, and organic; graphite product stream, FIG. 1B) from a hydrophilic phase (e.g., mixing tank water). In embodiments, the flotation cells include a 'rougher flotation cell' that completes a preliminary separation of the hydrophobic and hydrophilic phases; and, a 'cleaner flotation cell' to which the 'rougher flotation cell' froth reports to, to further separate the hydrophobic and hydrophilic phases. In embodiments, froth from the 'cleaner flotation cell' reports to solid-liquid separation to optionally isolate a solid or 'graphite concentrate' phase (for example, see FIG. 1B, step (x)). In some embodiments, a centrifuge is used to achieve solid-liquid separation.

In another embodiment of leaching, and intermediate product preparation, there is optionally provided a process comprising filtering the PLS ($2^{nd}$ product stream) through a dual media filter and/or belt filter to separate entrained organics (i.e. residual alkyl carbonates) and remaining solids (not shown in FIG. 1B). In embodiments, a dual media filter similar to filters found in copper solvent extraction is used. In some embodiments, a dual media filter comprises filtration media such as anthracite, garnet, and/or sand. In some embodiments, the liquid stream output from the dual media filter optionally reports to an activated carbon filter to separate out entrained organics (i.e. residual alkyl carbonates).

In an embodiment, there is provided a process of optionally comprising dewatering the magnetic/ferrous materials (e.g., steel sheet; ferrous product(s)) from magnetic separation; and, collecting and storing said dewatered materials (for example, see FIG. 1B, step iii) and ferrous product).

In embodiments, the process optionally comprises dewatering the preliminary aluminum product stream from densimetric separation, and, collecting and storing the dewatered aluminum product (for example, see FIG. 1B, step (vi)(a)) and aluminum product). In embodiments, the process optionally comprises dewatering the preliminary copper product stream from densimetric separation, and collecting the dewatered preliminary copper product (for example, see FIG. 1B, step (vi)(b)). In embodiments, the process optionally comprises dewatering the plastic product stream from densimetric separation, and collecting the dewatered plastic product (for example, see FIG. 1B, step (vi)(c)). In embodiments, a dewatering screen is used, wherein the screen is steeply inclined to facilitate water/aqueous solution drainage.

In another embodiment of final product preparation, there is provided a process optionally comprising collecting graphite concentrate from the solid-liquid separation of froth from the 'cleaner flotation cell'. In some embodiments, the graphite concentrate is collected as the solid product from centrifugation of froth from the 'cleaner flotation cell'. For example, see FIG. 1B, step x) and graphite product.

In one embodiment, step xi) noted above comprises: i. isolating a copper product stream from the second product stream, and ii. depositing $Cu^0$ from the copper product stream via electrowinning. In embodiments, isolating the copper product stream from the second product stream involves copper ion exchange or copper solvent extraction. Thus, in another embodiment of final product preparation, there is provided a process comprising a copper-ion exchange of the $2^{nd}$ product stream (following the optional dual media filtration, if used) to yield a copper-stripped liquor as the $3^{rd}$ product stream. In embodiments, a copper selective resin is used; for example, LEWATIT® M+TP 207 or DOWEX™ M4195. In some embodiments, the process comprises a solvent extraction of the $2^{nd}$ product stream (again, following the optional dual media filtration, if used) to yield a copper-stripped liquor as the $3^{rd}$ product stream. In some embodiments, the solvent extraction involves mixer-settler extraction stage(s) that load copper cations into a copper selective extractant, such as an organic ketoxime extractant (e.g., LIX®984N) in a diluent (e.g. kerosene)). In other embodiments, the solvent extraction involves mixer-settler strip stage(s) where spent electrolyte from copper electrowinning (below) is used to strip copper-loaded organics and transfer copper cations into an aqueous phase prior to copper electrowinning.

In another embodiment of final product preparation, there is provided a process comprising copper electrowinning of a copper-rich liquor from copper-ion exchange to produce elemental copper (i.e., $Cu^0$). In some embodiments, there is provided a process optionally comprising copper electrowinning of a copper-rich liquor from solvent extraction. In embodiments, copper electrowinning (e.g. conventional copper electrowinning, Emew® electrowinning, etc.) is used for deposition of copper/$Cu^0$ as copper plate. For example, see FIG. 1B, step XI) and copper product.

In one embodiment, step xii) as noted above comprises isolating the aluminum (Al) and/or iron (Fe) product from the third product stream by adding a source of hydroxide to the third product stream to precipitate a Al and/or Fe hydroxide product. Thus, in another embodiment of final product preparation, there is provided a process comprising producing an Al and/or Fe product from the $3^{rd}$ product stream (for example, FIG. 1B, step (xii)) wherein, the Al and/or Fe product is a hydroxide product. In embodiments, a copper-stripped liquor from copper ion exchange or solvent extraction (e.g. the $3^{rd}$ product stream, FIG. 1B) is optionally sparged with oxygen gas and reacted with a source of hydroxide (e.g., alkali metal hydroxides such as sodium hydroxide/NaOH, alkali earth metal hydroxides, etc.; NaOH being a preferred source of hydroxide) at a pH of about 3 to about 5 to precipitate an Al and/or Fe product (for example, see FIG. 1B, Al and/or Fe product), leaving an Al and/or Fe-depleted solution (Al and/or Fe product preparation filtrate) as the $4^{th}$ process stream. In some embodiments, a filter press or centrifuge is used to achieve solid-liquid separation.

In another embodiment, isolating step xiii) noted above comprises: i. adding a source of hydroxide to the fourth product stream to precipitate a Co, Ni, and/or Mn hydroxide product; ii. adding a source of carbonate to the fourth product stream to precipitate a Co, Ni, and/or Mn carbonate product; iii. evaporative crystallizing the fourth product stream in the presence of a sulfate source to form a Co, Ni, and/or Mn sulfate product; or iv. adding a source of hydroxide to the fourth product stream to precipitate a Co, Ni, and/or Mn hydroxide product, followed by thermal dehydration to produce a Co, Ni, and/or Mn oxide product.

Thus, in another embodiment of final product preparation, there is provided a process comprising producing a Co, Ni, and/or Mn product from the 4th process stream. In embodiments, the Co, Ni, and/or Mn product is a hydroxide product. In embodiments, Al and/or Fe product preparation filtrate (e.g., the $4^{th}$ product stream, FIG. 1B) is reacted with a source of hydroxide (e.g., alkali metal hydroxides such as sodium hydroxide/NaOH, alkali earth metal hydroxides, etc.; NaOH being a preferred source of hydroxide) to precipitate a Co, Ni, and/or Mn hydroxide product (for example, see FIG. 1B, Co, Ni, and/or Mn product). In other embodiments, the Co, Ni, and/or Mn product is a carbonate product. In embodiments, the Al and/or Fe product preparation filtrate (e.g., the $4^{th}$ product stream, FIG. 1B) is reacted with a source of carbonate (e.g., alkali metal carbonates such as sodium carbonate/$Na_2CO_3$, alkali earth metal carbonates, etc.; $Na_2CO_3$, being a preferred source of carbonate) to precipitate a Co, Ni, and/or Mn carbonate product (for example, see FIG. 1B, Co, Ni, and/or Mn product). In other embodiments, the Co, Ni, and/or Mn product is an oxide product. In embodiments, the Al and/or Fe product preparation filtrate (e.g., the $4^{th}$ product stream, FIG. 1B) is reacted with a source of hydroxide (e.g., alkali metal hydroxides such as sodium hydroxide/NaOH, alkali earth metal hydroxides, etc.) at a pH of about 8 to about 10 to precipitate a Co, Ni, and/or Mn hydroxide product that reports to thermal dehydration to produce a Co Ni, and/or Mn oxide product (e.g., cobalt (II, III) oxide, $Co_3O_4$, nickel (II) oxide, NiO, manganese (IV) dioxide, $MnO_2$; for example, see FIG. 1B, Co, Ni, and/or Mn product). In embodiments, the Co, Ni, and/or Mn product reports to solid-liquid filtration to collect a solid filter cake. In some embodiments, a filter press is used to achieve solid-liquid separation. The Co, Ni, and/or Mn-depleted liquid forms the $5^{th}$ product stream.

In other embodiments, sulfuric acid or a mixture of sulfuric acid and hydrogen peroxide is used for acid leaching of the solid Co, Ni, and/or Mn product, following which the leachate reports to an evaporative crystallizer or draft tube baffle crystallizer to produce a cobalt sulfate heptahydrate/$CoSO_4.7H_2O$, nickel sulfate hexahydrate/$NiSO_4.6H_2O$, and/or manganese sulfate monohydrate/$MnSO_4.H_2O$ product. In embodiments, the resulting crystallized product(s) reports to solid-liquid separation; and, separated solid product(s) reports to a drier to drive off excess water and produce a hydrated cobalt, nickel, and/or manganese sulfate (for example, see FIG. 1B, Co, Ni, and/or Mn product). In some embodiments, a centrifuge or filter press is used to achieve solid-liquid separation.

As noted above, step (xiv) comprises isolating a salt by-product from the fifth product stream to form a sixth product stream. In one embodiment, isolating step xiv) comprises: i. evaporative crystallization to isolate the salt by-product; or ii. crystallization using draft tube baffle crystallizers to isolate the salt by-product. Those of skill in the art will recognize that salt by-products produced by way of the earlier process steps will depend at least in part on the choice of acid for leaching step (viii) and the choice of source of hydroxide, carbonate, etc. in steps (xii) and (xiii). Thus, when the acid of leaching step viii) comprises sulfuric acid, the salt by-product of step xiv) will comprise a sulfate salt. When the acid of leaching step viii) comprises hydrochloric acid or nitric acid, the salt by-product of step xiv) will comprise a chloride salt or nitrate salt respectively.

When the acid of leaching step viii) comprises sulfuric acid; and, when step xii) comprises isolating the aluminum (Al) and/or iron (Fe) product from the third product stream by adding sodium hydroxide to the third product stream to precipitate a Al and/or Fe hydroxide product, and/or step xiii) comprises adding sodium hydroxide to the fourth product stream to precipitate a Co, Ni, and/or Mn hydroxide product or adding sodium carbonate to the fourth product stream to precipitate a Co, Ni, and/or Mn carbonate product, the salt by-product of step xiv) comprises sodium sulfate. Thus, in an embodiment of final product preparation, there is provided a process comprising crystallizing sodium sulfate from the $5^{th}$ product stream to form a sodium sulfate solid product, and a sodium-depleted liquid that forms the $6^{th}$ product stream. In embodiments, filtrate from the Co, Ni, and/or Mn product preparation reports to an evaporative crystallizer to produce sodium sulfate decahydrate/$Na_2SO_4.10H_2O$. In some embodiments, the resulting crystallized slurry reports to solid-liquid separation; and, separated solid product reports to a drier, wherein the drier drives off water and produces anhydrous sodium sulfate/$Na_2SO_4$. In some embodiments, solid-liquid separation achieved using a centrifuge.

In one embodiment, isolating step xv) as noted above, relating to isolating a lithium product from the sixth product stream, comprises: i. adding a carbonate to the sixth product stream to precipitate lithium carbonate; or ii. adding a hydroxide to the sixth product stream to form a lithium hydroxide solution, and evaporative crystallizing the lithium hydroxide solution to form lithium hydroxide monohydrate. In one embodiment, the process further comprises purifying the lithium carbonate via: i. converting the lithium carbonate into lithium bicarbonate; and ii. steam-treating the lithium bicarbonate to re-form lithium carbonate. In another embodiment, the process further comprises purifying the lithium hydroxide monohydrate via: i. dissolving the lithium hydroxide monohydrate in water; and ii. recrystallizing the lithium hydroxide monohydrate using a mechanical vapor recompression crystallizer.

Thus, in an embodiment of final product preparation, there is provided a process comprising precipitating a lithium product from the $6^{th}$ product stream. In embodiments, a liquid stream output from the sodium sulfate product production (e.g., $6^{th}$ product stream, FIG. 1B) is reacted with a carbonate, such as sodium carbonate to precipitate crude lithium carbonate. In embodiments, the crude lithium carbonate product undergoes solid-liquid separation, for example using a centrifuge, and a solid cake is collected (for example, see FIG. 1B, step (xv) and lithium product). In embodiments, the crude lithium carbonate cake reports to a bicarbonation circuit for further purification, wherein carbon dioxide is bubbled into a tank to convert the lithium carbonate into more soluble lithium bicarbonate (i.e. lithium carbonate 'digestion'). In some embodiments, the liquid stream containing soluble lithium bicarbonate reports to an ion exchange unit to selectively remove trace impurities such as calcium and magnesium. In embodiments, the solution containing soluble lithium bicarbonate reports to a tank where steam is bubbled through to crystallize higher purity lithium carbonate as a solid. In other embodiments, crystallizing the higher purity lithium carbonate comprises electrolysis, direct immersion electric heating, element electric heating, or indirect electric heating. In some embodiments, output from the lithium carbonate crystallization undergoes solid-liquid separation, for example using a centrifuge, to isolate the solid lithium carbonate product. In other embodiments, the liquid filtrate (e.g. centrate) is recycled to the lithium carbonate 'digestion' tank. In further embodiments, the isolated high purity solid lithium carbonate stream is dried and micronized.

In an embodiment of final product preparation, wherein sulfuric acid or a mixture of sulfuric acid and hydrogen peroxide/oxygen is used for acid leaching, there is provided a process comprising crystallizing sodium sulfate. In embodiments, filtrate (e.g. centrate) from the crude lithium carbonate solid-liquid separation (e.g. centrifugation) reports to an evaporative crystallizer to produce sodium sulfate decahydrate/$Na_2SO_4 \cdot 10H_2O$. In some embodiments, sulfuric acid is added during crystallization to convert residual carbonate (e.g. $Na_2CO_{3(aq)}$) into a sulfate form. In some embodiments, the resulting crystallized slurry reports to solid-liquid separation; and, separated solid product reports to a drier, wherein the drier drives off water and produces anhydrous sodium sulfate/$Na_2SO_4$. In some embodiments, solid-liquid separation achieved using a centrifuge.

In another embodiment of final product preparation, wherein hydrochloric acid is used for acid leaching, there is provided a process wherein a sodium chloride solution is produced as a by-product. In embodiments, the sodium chloride solution is: (i) recycled to the feed size reduction step(s) for use as a brine solution, a portion of which is optionally bled to a watertreatment plant followed by reuse in the facility; or (ii) crystallized to from a solid sodium chloride product, optionally followed by solid-liquid separation and drying.

In another embodiment of final product preparation, wherein nitric acid or a mixture of nitric acid and hydrogen peroxide is used for acid leaching, there is provided a process wherein a sodium nitrate solution is produced as a by-product. In embodiments, the sodium nitrate solution is: (i) crystallized to from a solid sodium nitrate product, optionally followed by solid-liquid separation and drying.

Apparatus and System

In one aspect, there is provided an apparatus for carrying out size reduction of battery materials under immersion conditions. In one embodiment, the apparatus comprises: a housing configured to hold an immersion liquid; a first feed chute (e.g. hopper) defining an opening therein for receiving battery materials of a first type into the housing; a first submergible comminuting device disposed within the housing to receive the battery materials of the first type from the first feed chute, wherein said first submergible comminuting device is configured to cause a size reduction of the battery materials of the first type to form a first reduced-size battery material; and a second submergible comminuting device disposed within the housing to receive the first reduced-size battery material from the first submergible comminuting device, wherein the second submergible comminuting device is configured to cause a further size reduction in the first reduced-size battery material to form a second reduced-size battery material.

In these embodiments, a housing can be formed as a single piece or can be a multi-part component, so long as the housing forms a unitary structure that houses the submergible components of the apparatus and system as herein described to contain an immersion liquid in which the submergible components are immersed and to prevent unintended leakage of the immersion liquid to an external environment. The housing is formed from a material that is compatible with the immersion liquid (described in further detail below), as well as with components of the battery materials, such as components of lithium-ion batteries as described above (e.g. metals, metal oxides, electrolytes, and organics (i.e. alkyl carbonates) typically found in lithium-ion batteries). In one embodiment, the housing is formed from a metal (such as iron), a metal alloy (such as steel (e.g. carbon steel, stainless steel)), fiberglass (such as polyester resin), or plastic (such as polyethylene or polypropylene). In one embodiment, the housing is formed from stainless steel, such as austenitic stainless steel (e.g. 304 stainless steel).

Those of skill in the art will appreciate that a submergible comminuting device refers to a device wherein at least the comminuting portion of the device is capable of being completely submerged in a liquid, such as an immersion liquid as described herein, whereas the remainder of the comminuting device is rendered water-tight/sealed to prevent entry of the liquid into the portion of the comminuting device housing the electronics, etc. The provision of appropriate water-tight seals around the drive shaft and/or other elements of the comminuting device can render the comminuting device submergible.

The apparatus can optionally comprise means for delivering the battery materials of the first type from the first feed chute to the first submergible comminuting device. Alternatively, the first feed chute can deliver the battery materials of the first type directly to the first submergible comminuting device and no intervening delivery means is required. In an embodiment where the delivery means is present, the apparatus can comprise a delivery chute extending from the first feed chute to the first submergible comminuting device, wherein gravity feed is used to deliver battery materials of the first type from the first feed chute to the first submergible comminuting device via the delivery chute. In another embodiment where the delivery means is present, the apparatus can comprise a submergible conveyor for delivering the battery materials of the first type from the first feed chute to the first submergible comminuting device—the battery materials of the first type can be fed directly onto the submergible conveyor, or a delivery chute could be disposed between the first feed chute and the submergible conveyor to deliver the battery materials of the first type to the submergible conveyor.

The apparatus also comprises means for delivering the first reduced-size battery material from the first submergible comminuting device to the second submergible comminuting device. In one embodiment, the apparatus comprises a delivery chute extending from the output of the first submergible comminuting device to the second submergible comminuting device, wherein gravity feed is used to deliver the first reduced-size battery material from the first submergible comminuting device to the second submergible comminuting device. In another embodiment, the apparatus further comprises a submergible conveyor for delivering the first reduced-size battery material from the first submergible comminuting device to the second submergible comminuting device, wherein the submergible conveyor receives the first reduced-size battery material from the output of the first submergible comminuting device and delivers the first reduced-size battery material to the second submergible comminuting device for further comminution.

In another embodiment, the submergible conveyor(s) is/are selected from a chain conveyor, a screw conveyer, or a belt conveyor. In yet another embodiment, the submergible conveyor(s) is/are a chain conveyor(s).

As is known to the skilled worker, a chain conveyor may be comprised of a flat mesh formed by links which is looped around two powered rollers. The mesh can be selected to comprise links forming openings of any desired size and can be formed of any standard material used to make chain conveyors, for example, a metal mesh. Use of chain conveyors provides particular advantages over use of other types of conveyors, including providing increased durability and/or ability to transport large loads of materials (volume- and weight-wise) compared to other conveyors known in the art, such as belt or screw conveyors.

In other embodiments, the submergible conveyor(s) can be self-cleaning. A self-cleaning conveyor as referenced herein refers to a conveyor that enables an operator to remove accumulated material without interrupting the function of the conveyor, which can be advantageously used in the system and apparatus described herein.

In embodiments comprising a self-cleaning conveyor, undersized materials can pass through, for example, a chain conveyor into a collection element which can be separate from or integral with other components of the disclosed apparatus. As with the housing, the collection element can be constructed from any material that is compatible with the immersion liquid (described in further detail below), as well as with components of the battery materials, such as components of lithium-ion batteries as described above (e.g. metals, metal oxides, electrolytes, and organics (i.e. alkyl carbonates) typically found in lithium-ion batteries). In one embodiment, the collection element is formed from stainless steel, such as austenitic stainless steel (e.g. 304 stainless steel). A collection element can comprise any suitable form dimensioned for collecting undersized materials, for example, into a substantially tubular, rectangular or triangular prism shape or can be a collection tank. Collected undersized materials can fall, be drained or transported into a collection element configured to enable an operator to remove collected undersized materials by any suitable means known in the art, for example, via suction means such as vacuuming or alternatively via applying a pressure to divert the undersized materials to downstream apparatuses/systems/processes. In one embodiment, the collection element has a smooth surface over which collected undersized materials can freely flow for facilitation of removal. In another embodiment, a pipe can be used wherein the long axis of the pipe runs substantially parallel to the long axis of the submergible conveyor (or at a slightly off-set angle—e.g. 5-10 degrees), and the pipe defines an open side or slot opposite from the underside of the submergible conveyor, thus allowing undersized materials to fall through the opening/slot and collect in the pipe. Frequency of removal of undersized materials from a collection element depends upon frequency of operation of the disclosed apparatus, but is ideally carried out at regular time intervals when the apparatus is operated frequently. Regular time intervals may include, for example, at a frequency of once per day when the disclosed apparatus and/or system is operated daily.

In embodiments comprising a self-cleaning conveyor, a delivery means can further be disposed between a self-cleaning conveyor and a collection element to deliver undersized materials to a collection element. Such delivery means can be, for example, a bypass line configured to deliver undersized materials to a collection tank and/or to other downstream apparatuses and/or systems. In one embodiment, the collection element can be directly or indirectly connected to other downstream apparatuses and/or systems to enable undersized materials to be processed separately or integrated with other materials for further processing. In another embodiment, the collection element can divert undersized materials so that they combine with second reduced-size battery material from a second submergible comminuting device.

In one embodiment, the submergible conveyor is a self-cleaning chain conveyor. In an embodiment, the self-cleaning chain conveyor is formed from a metal mesh having openings through which particles having a size of less than about 5 mm, or less than about 1-2 mm, for example, can pass. Use of self-cleaning chain conveyors provide particular advantages over use of other types of self-cleaning conveyors, including providing flexibility in allowing a user to select a desired mesh size.

In embodiments comprising a self-cleaning screw conveyor, the bottom of the housing for the screw conveyor can comprise a filtering element (e.g. grate or screen) that undersize materials can pass through to the collection element (e.g. pipe having an open side/slot, running along the length of the pipe).

In another embodiment, the first submergible comminuting device of an apparatus can be selected from a multi-shaft shredder, a hammer mill, a jaw crusher, a cone crusher, or a roll crusher and/or a second submergible comminuting device is selected from a multi-shaft shredder or a granulator. In another embodiment, both the first submergible comminuting device and the second submergible comminuting device is a multi-shaft shredder. In another embodiment, the first submergible comminuting device is a quadruple-shaft shredder (for example, UNTHA's RS100 could be modified to render it submergible via addition of appropriate water-tight seals, etc.). In yet another embodiment, the second submergible comminuting device is a dual-shaft shredder or a quadruple-shaft shredder. For instance, the second submergible comminuting device could be a quadruple-shaft shredder such as UNTHA's RS50

In embodiments comprising multi-shaft shredders, battery materials are top fed through sets of semi-sharp blades configured to cause a size reduction in the battery materials. Multi-shaft shredders may have one set of semi-sharp blades, such as in dual-shaft shredders (also known as dual shaft or twin-shaft shredders), or may have two sets of semi-sharp blades, such as in typical quadruple-shaft shredders.

As will be known to those of skill in the art, dual-shaft shredders are top fed with two sets of semi-sharp blades disposed on shafts rotating toward each other to pull material through the center. As material travels through the center it is sheared apart by the blades. The main advantages of dual-shaft shredders over quadruple-shaft shredders are that they require less energy and space. Embodiments having dual-shaft shredders provide additional advantages including requiring less electrical power to operate compared to embodiments having quadruple-shaft shredders.

As will also be known to those of skill in the art, quadruple-shaft shredders are top fed with four sets of semi-sharp blades disposed on shafts rotating toward the center. The outer two shafts help push material toward the inner shafts. The inner two shafts pull material through the center. As material travels through the center it is sheared apart by the blades. There are also screens available for these shedders; any oversized material can be swept up by the blades and re-shred. The main advantages of quadruple-shaft shredders over dual-shaft shaft shredders are that they tend to produce a more uniform particle size and the outer shafts help clean the inner shafts.

In another embodiment, the battery materials of the first type are rechargeable lithium-ion batteries. Rechargeable lithium-ion batteries can be large format lithium-ion batteries or small format lithium-ion batteries. Large format lithium-ion batteries can be, for example, lithium-ion batteries measuring from about 370 mm×about 130 mm×about 100 mm to about 5000 mm×about 2000 mm×about 1450 mm in size (or volume equivalents; expressed as a rectangular prism for simplification of geometry), and can include electric car batteries or batteries used in stationary energy storage systems. Small format lithium-ion batteries can be, for example, batteries measuring up to about 370 mm×about 130 mm×about 100 mm in size (or volume equivalents; expressed as a rectangular prism for simplification of geometry), and can include portable lithium-ion batteries such as those from cell phones, laptops, power tools or electric bicycles. Large format batteries are generally known in the art to be larger than small format batteries. In another embodiment, the battery materials can comprise battery parts as opposed to whole batteries; however, the apparatus, system, and process described herein are particularly suited to processing whole batteries. In one embodiment, the battery materials of the first type are large format rechargeable lithium-ion batteries.

In another embodiment, the apparatus comprises a second feed chute (e.g. hopper) defining an opening therein for receiving battery materials of a second type into the housing wherein the apparatus further comprises means for delivering the battery materials of the second type from the second feed chute directly to the second submergible comminuting device, and wherein the second submergible comminuting device is configured to cause a size reduction in the battery materials of the second type. Battery materials of the second type can be rechargeable lithium-ion batteries selected from large format lithium-ion batteries or small format lithium-ion batteries as described above. In another embodiment, the battery materials of the first type and the battery materials of the second type are rechargeable lithium-ion batteries. Battery materials of the first type and of the second type can be rechargeable lithium-ion batteries and can be independently selected from large format lithium-ion batteries or small format lithium-ion batteries as described above. In another embodiment, battery materials of the second type are of a reduced size relative to the battery materials of the first type. For example, battery materials of the second type can be small format lithium-ion batteries and batteries of the first type can be large format lithium-ion batteries as described above.

The apparatus further comprises an outlet for discharging comminuted material produced by the second submergible comminuting device, wherein the discharged comminuted material can report to one or more further optionally submergible comminuting devices, and/or to further downstream systems and processes.

In another aspect, there is provided a system for carrying out size reduction of battery materials under immersion conditions, comprising a first submergible comminuting device to receive battery materials of a first type, wherein the first submergible comminuting device causes a size reduction in the battery materials of the first type to form a first reduced-size battery material; a second submergible comminuting device to receive the first reduced-size battery material, wherein the second submergible comminuting device causes a further size reduction in the first reduced-size battery material to form a second reduced-size battery material; and an immersion liquid in which each of the first submergible comminuting device, the second submergible comminuting device, the first reduced-size battery material, and the second reduced-size battery material are submerged. The submergible comminuting devices are as described above in respect of the apparatus.

The system comprises means for delivering the first reduced-size battery material from the first submergible comminuting device to the second submergible comminuting device. The delivery means can be, for example, a delivery chute extending from the output of the first submergible comminuting device to the second submergible comminuting device, wherein gravity feed is used to deliver the first reduced-size battery material from the first submergible comminuting device to the second submergible comminuting device.

In another embodiment, the system further comprises a submergible conveyor as described above for delivering the first reduced-size battery material from the first submergible comminuting device to the second submergible comminuting device, wherein the submergible conveyor receives the first reduced-size battery material from the output of the first submergible comminuting device and delivers the first reduced-size battery material to the second submergible comminuting device for further comminution, and wherein the submergible conveyor is submerged in the immersion liquid. In embodiments comprising a submergible conveyor, the submergible conveyor can be a chain conveyor as described above, a screw conveyer as described above, or a belt conveyor. In embodiments comprising a chain conveyor or a screw conveyor, said chain conveyor and/or screw conveyor can be a self-cleaning chain conveyor or a self-cleaning screw conveyor as described above.

In an embodiment, the system further comprises a first delivery system for delivering the battery materials of the first type to the first submergible comminuting device. A first delivery system can comprise a first feed chute optionally in combination with a delivery chute and/or a submerged conveyor or a submerged self-cleaning conveyor as described above. Alternatively, the first feed chute can deliver the battery materials of the first type directly to the first submergible comminuting device (no intervening delivery chute or submergible conveyor is required).

In an embodiment, the system further comprises a first submergible comminuting device and a second submergible comminuting device wherein each causes size reduction by compression or shearing.

In an embodiment, the first submergible comminuting device is selected from a multi-shaft shredder as described above, a hammer mill, a jaw crusher, a cone crusher, or a roll crusher and/or the second submergible comminuting device is selected from a multi-shaft shredder as described above or a granulator.

In an embodiment, each of the first submergible comminuting device and the second submergible comminuting device is a multi-shaft shredder as described above.

In an embodiment, the first submergible comminuting device is a quadruple-shaft shredder as described above.

In an embodiment, the second submergible comminuting device is a dual-shaft shredder as described above or a quadruple-shaft shredder as described above.

In an embodiment, the battery materials of the first type are rechargeable lithium-ion batteries as described above.

In an embodiment, the system further comprises a second delivery system for delivering battery materials of a second type to the second submergible comminuting device, wherein the second submergible comminuting device causes a size reduction in the battery materials of the second type to form a comminuted material that is submerged in the immersion liquid and combines with the second reduced-size battery material. A second delivery system can comprise a second feed chute optionally in combination with a delivery chute and/or a submerged conveyor or a submerged self-cleaning conveyor as described above.

In an embodiment, the battery materials of the first type and the battery materials of the second type are rechargeable lithium-ion batteries as described above.

In an embodiment, the battery materials of the second type are of a reduced size relative to the battery materials of the first type. In these embodiments, battery materials of a second type can be small format lithium-ion batteries as described above, and battery materials of a first type can be large format lithium-ion batteries as described above.

In an embodiment, the immersion liquid is an aqueous solution.

Advantages gained by use of an immersion liquid include providing a means for absorbing heat released during battery material comminution to provide an inherently safe system during operation by a user. Additional advantages are provided in embodiments comprising an aqueous solution immersion liquid comprising of calcium hydroxide ($Ca(OH)_2$) when used with lithium-ion battery materials due to hydrolysis of lithium-ion battery electrolyte salts, such as $LiPF_6$, upon exposure to water or aqueous solutions to produce, for example, aqueous hydrogen fluoride at rates of reaction above 70° C. (S. F. Lux, I. T. Lucas, E. Pollak, S. Passerini, M. Winter and R. Kostecki, "The mechanism of HF formation in $LiPF_6$ based organic carbonate electrolytes," Electrochemistry Communications, vol. 14, pp. 47-50, 2012). Addition of dilute levels of hydrated lime or calcium hydroxide ($Ca(OH)_2$) to the aqueous immersion liquid can result in a reduction in the corrosiveness of aqueous hydrogen fluoride as aqueous fluorine may advantageously be captured as insoluble calcium fluoride (H. G. McCann, "The solubility of fluorapatite and its relationship to that of calcium fluoride," Archives of Oral Biology, vol. 13, no. 8, pp. 987-1001, 1968).

In an embodiment, the aqueous solution immersion liquid alternatively or additionally comprises a salt, such as an alkali metal chloride, alkaline earth metal chloride, or mixtures thereof (e.g. sodium chloride, calcium chloride, or mixtures thereof). Addition of a salt, such as sodium chloride (NaCl), to the aqueous solution immersion liquid provides additional advantages when the system is used with lithium-ion battery materials, wherein a salt can act as a conductive medium through which residual charge from lithium-ion batteries can dissipate and heat released during battery material comminution can be absorbed to provide an inherently safe system during operation by a user.

In an embodiment, the system further comprises a third comminuting device to receive comminuted battery materials from the second submergible comminuting device, wherein the third comminuting device is optionally submergible in the immersion liquid and causes a size reduction of the comminuted battery materials received from the second submergible comminuting device. A third comminuting device may be integrated with systems for further processing of further comminuted battery materials. In these embodiments, a third comminuting device can be selected from a multi-shaft shredder as described above, a single-shaft shredder, or a granulator. In some embodiments, a third comminuting device is a submergible dual-shaft shredder or single-shaft shredder. Additional benefits may be provided in embodiments comprising a third comminuting device wherein further size reduction of comminuted battery materials is desired. For example, a user may desire such further size reduction wherein a first submergible and/or second submergible comminuting device as herein disclosed fails to produce a comminuted material having a particle size smaller than 100 mm. For instance, comminuted materials exiting the third comminuting device can have a particle size of from about 40 mm to about 100 mm.

In further embodiments, the system further comprises a fourth comminuting device to receive comminuted battery materials from the third optionally submergible comminuting device, wherein the fourth comminuting device is optionally submergible in the immersion liquid and causes a size reduction of the comminuted battery materials received from the third submergible comminuting device. A fourth comminuting device may be integrated with systems for further processing of further comminuted battery materials. In one embodiment, the fourth comminuting device can be selected from a multi-shaft shredder as described above, or a granulator. In some embodiments, a fourth comminuting device is a granulator that is not submerged in the immersion liquid. In one embodiment, comminuted materials exiting the fourth comminuting device can have a particle size of less than about 40 mm.

In another embodiment, the third and/or fourth comminuting device could be a dual shaft shredder such as the Franklin Miller TM2300.

For example, comminuted battery materials exiting the second submergible comminuting device can be optionally screened, where undersized solids that are at or below a first (i.e. selected) size (e.g. 510 mm) pass through a screen; and, oversized solids that are a second size (i.e. oversize; larger than first (i.e. selected) size; e.g. ≤100 mm to ≥10 mm) report to the third and/or fourth optionally submergible comminuting device for further size reduction. The solids that are at or below a first (i.e. selected) size (e.g. ≤10 mm) undergo solid-liquid separation and further processing according to the Process described above. Further comminution via the third and/or fourth optionally submergible comminuting device reduces the oversized (i.e. second size) solids to at or below the first (selected) size (e.g. ≤10 mm) to facilitate further processing. In another embodiment, the first (selected) size can be set at ≤40 mm.

As noted above, the submergible components of the apparatus and system as herein described can be contained within a housing configured to hold an immersion liquid. The housing can be formed as a single piece or can be a multi-part component, so long as the housing forms a unitary structure that houses the submergible components of the apparatus and system as herein described, contains the immersion liquid in which the submergible components are immersed and prevents unintended leakage of the immersion liquid to an external environment.

In embodiments of the system, the immersion liquid may be in fluid communication with additional systems (open loop system), or it may be comprised in a closed loop system fluidly isolated from other systems (closed loop system). For example, discharged immersion liquid from the comminuting devices can be re-cycled back to the housing for use in the size-reduction of battery materials under immersion conditions. Alternatively or additionally, discharged immersion liquid from the comminuting devices can be used in downstream processes such as in the wet magnetic separation process as described above.

The disclosed apparatus and system described herein provides advantages over apparatuses and systems known in the art, wherein energy released during size reduction of battery materials submerged in an immersion liquid as described above is absorbed as heat by the immersion liquid which results in minimized risk of combustion and enhanced safety when operating the disclosed apparatus and/or system. Prior art spraying systems may mitigate some of the risk of combustion; however, it is believed that the system and apparatus as described herein which provides for size reduction of battery materials under immersion conditions offers enhanced safety in battery reduction operations. Further, as the skilled worker will appreciate, submersion of battery materials, submergible comminuting devices and, in particular embodiments, submergible conveyors in an immersion liquid provide additional advantages of enabling a user to capture valuable battery components, such as organics (i.e. alkyl carbonates), due to release of such battery components into the immersion liquid during size reduction by the submergible comminuting devices. The apparatus and system as herein disclosed provides further advantages from minimizing hazardous dust release into air surrounding components of an apparatus and/or system as herein disclosed during size reduction of battery materials. For instance, use of the apparatus and system as described herein can mitigate the need for special ventilation systems and baghouses or filters to deal with dust and off-gases, etc.

As will be further appreciated by the skilled worker, the embodiments of the apparatus and system described herein that can receive and process battery materials of a first and second type are particularly advantageous, in that they allow the user to process battery materials of different types and sizes using a single apparatus/system.

EXAMPLES

To gain a better understanding of the application as described herein, the following examples are set forth. It should be understood that these examples are for illustrative purposes only. Therefore, they should not limit the scope of this application in any way.

Example 1—Exemplary Embodiment of Process 1

The following example describes phases, steps, design criteria, and IDEAS process simulation parameters (IDEAS Bronze, Mineral Processing package, v6.0.0.995) of said process for recovering materials from rechargeable lithium-ion batteries.

Phase 1: Feed Size Reduction

Incoming large format lithium-ion batteries (e.g. automotive, energy storage system battery packs) and small format lithium-ion batteries (e.g. from laptops, mobile phones, tablets, etc.) are optionally discharged to approximately between 1.0 to 2.0 V, or to approximately 0 V prior to any mechanical treatment. Discharged energy optionally reports to a central electrical storage bank, which provides peak load reduction for, for example, plant facility-wide power consumption. Discharging lithium-ion batteries facilitates controlling energy released during possible short circuiting events wherein the batteries' anode(s) and cathode(s) come into contact during a battery dismantling, or multi-stage crushing/shredding step.

Multi-stage crushing/shredding is achieved via use of, for example, crushers under water/aqueous solution immersion, such as water or brine immersion. Water/aqueous solution immersion helps ensure that sparking caused by crushing/shredding is suppressed and absorbed as heat by the water/aqueous solution. Further, the presence of water/aqueous solution can restrict accumulation of oxygen, thereby minimizing combustion risk during crushing.

Moreover, water/aqueous solution promotes entrainment of batteries' electrolyte (e.g., $LiPF_6$ in organic solvent(s)) as it is released after lithium-ion battery crushing, facilitating an increase in overall lithium recovery. Battery electrolytes, such as $LiPF_6$ salt, have a potential for hydrolysis when exposed to water or aqueous solutions; however, with respect to the $LiPF_6$ salt for example, this typically occurs above 70° C. As such, a target water/aqueous solution temperature for the dismantling/crushing step is, for example, approximately 60° C. to facilitate prevention of any appreciable reaction chemistry.

The crushing/shredding step helps mechanically separate the batteries, and may reduce downstream energy consumption and facilitate optimizing equipment sizing. Moreover, multi-stage size reduction facilitates reduction of variability in particle size distribution, which facilitates leaching of target metals/materials.

When multi-stage crushing/shredding is used to dismantle/crush the batteries, the multi-stage crushing comprises first crushing large format lithium-ion batteries to reduce their size (i.e., feed size) to approximately ≤400 mm; and, second, crushing small format lithium-ion batteries (when present) and the size-reduced large format lithium-ion batteries, and reducing that feed to an approximate size of ≤100 mm to form a crushed/shredded slurry. Example operational parameters for crushers suitable for said multi-stage crushing/shredding are provided in Table 2.

The crushed/shredded slurry is optionally screened, where undersized solids that are ≤10 mm pass through a screen; and, oversized solids that are ≤100 mm to ≥10 mm report to shredding for further size reduction. The ≤10 mm solids undergo solid-liquid separation, such as via a belt filter. Following said separation, the isolated solids optionally report to an intermediate hopper for storage prior to magnetic separation; the solid-liquid separation filtrate is optionally recycled back to the crushers; and, a portion of the recycle stream is optionally bled to a downstream leach tank to facilitate an increase in overall materials recovery and for background impurity level control. Shredding reduces the oversized solids to ≤10 mm to facilitate magnetic separation. The shredded stream then optionally reports to a self-cleaning conveyor, which optionally conveys to a hopper for storage prior to magnetic separation. As used herein, the term "self-cleaning-conveyor" refers to a conveyor having a collection pipe underneath the conveyor with a slot or other opening to collect fine particles that accumulate in the conveyor. Periodically, the collection pipe is sucked clean using a vacuum or similar mechanism, or fine particles collected in the collection pipe can be diverted to downstream processes.

Generally, the combined size-reduced solids are approximately distributed as follows: a coarse solid fraction (≥3 mm) including, but not limited to shredded steel and/or aluminum casing, any electrical components, plastic, copper cable, aluminum cathode foil, copper anode foil and possibly paper; and, a fine solid fraction (which can be as small as ≤0.5 mm) including anode powder and cathode powder.

Table 2 delineates example design and IDEAS process simulation parameters for the Phase 1 feed size reduction steps.

Phase 2: Leaching and Intermediate Product Preparation

The optionally screened dismantled/crushed slurry from Phase 1 is magnetically separated by reporting to, for example, a magnetic separator; example operational parameters of which are provided in Table 3. Magnetic/ferrous materials (e.g. steel sheet; ferrous product(s)) are separated from non-magnetic/non-ferrous materials via wet magnetic separation. Magnetic separation consists of a rougher step and an optional cleaner step, depending on incoming feed and separation efficiency. The magnetic ('mag') stream separated from the magnetic separator undergoes solid-liquid separation by reporting to, for example, a dewatering screen; and produces a shredded steel or ferrous product. The separated water/aqueous solution is optionally recycled back to the magnetic separator for use as make-up water/aqueous solution, and a portion of the recycled stream is optionally bled to a downstream leach tank. Bleeding/sending a portion of the recycled stream to the leach tank may facilitate impurity control in the magnetic separator and dewatering screen circuit: if a portion of the recycle stream is not bled, there could be build-up of fine particles and/or species formed from side reaction chemistry (e.g. trace levels of precipitates) in a circuit's piping, potentially leading to plugging, down-time and production loss.

A non-magnetic/non-ferrous ('non-mag') stream from magnetic separation undergoes further separation via eddy current separation by reporting to, for example, an eddy current separator to separate any residual magnetic/ferrous material, and isolate an aluminum product stream prior to a leaching step. Generally, aluminum product(s) is separated prior to leaching to reduce unnecessary reagent consumption, etc. During eddy current separation, separated residual magnetic/ferrous material optionally reports to a dewatered solid hopper that collects material from the upstream solid-liquid separation (e.g. belt filter).

Generally, the separated non-magnetic/non-ferrous stream comprises aluminum and some copper. Depending on compositions of the non-magnetic/non-ferrous stream from eddy current separation, an optional densimetric table or analogous unit operation may be used to further separate the aluminum and copper streams. Optionally, separated copper is subjected to acid leaching; or, depending on product quantity and quality, the copper optionally reports to a dewatering screen for collection and storage as a final product.

The aluminum product stream from eddy current separation optionally reports to a dewatering screen to isolate an aluminum product (e.g., shredded aluminum). For example, the dewatering screen is a linear vibrating screen (e.g., a screen having counter rotating motors that create a linear motion to move solids downhill while water/aqueous solution drains through screen media). The separated water/aqueous solution is optionally recycled back to the magnetic separator for use as make-up water/aqueous solution, and a portion of the recycled stream is optionally bled to the leach tank.

The remaining eddy current-separated, non-magnetic/non-ferrous stream comprises at least one of electrode (e.g. metal oxide cathode powders, graphite anode), paper, plastic, and some residual non-ferrous (e.g. shredded copper and/or aluminum) components. This stream reports to a leach tank for leaching.

Table 3 delineates example design and IDEAS process simulation parameters for Phase 2 magnetic separation and eddy current separation.

Leaching is optionally conducted in a series of tanks, for example conical-bottom tanks under high shear agitation; or, a sloped or flat bottom tank. A conical, sloped, or flat bottom tank promotes settling of higher-density, coarse solid fractions. Agitation helps ensure that high value fine fractions are suspended and promotes leaching kinetics. Multiple tanks optimize leaching reaction kinetics and provide operational redundancy. Sulfuric acid is optionally used to leach target metals/materials in the influent slurries. Hydrogen peroxide and oxygen gas are optionally added to reduce and oxidize nobler metals to increase extraction rates; further, for example, hydrogen peroxide addition may increase extraction of copper, cobalt, etc. but decrease nickel extraction. Alternatively, hydrochloric acid is used; or, nitric acid with or without hydrogen peroxide.

Several influent streams optionally report to leaching: non-magnetic/non-ferrous stream from eddy current separation (excluding the majority of aluminum product(s)); leaching reagents, such as acid, hydrogen peroxide, etc.; and, bleed and recycle streams from upstream/downstream steps.

The leached slurry is optionally screened to remove a majority of a coarse size fraction, before reporting to countercurrent decantation. The screening is completed using, for example, a wet screen. Said screens are used to screen out fine and undersized particles; in some instances, the wet screens include make-up water/aqueous solution sprays to facilitate screening. Undersized solids that are approximately ≤5 mm in size pass through the screen and report to countercurrent decantation (CCD). Oversized solids that are approximately ≥5 mm are optionally recycled to magnetic separation for further processing. Screening facilitates separating coarse particles prior to CCD, thereby minimizing equipment wear.

Countercurrent Decantation (CCD) is a solid-liquid separation process that is achieved via settling, optionally with make-up process water/aqueous solution added as a wash medium. The purpose of CCD is to separate slimes/residues (e.g., wet solid material that is residual after processing) from the leaching step from a liquid phase consisting of aqueous leachate, organics (i.e. residual alkyl carbonates) and floating graphite.

Optionally, CCD consists of several thickeners in sequence, with countercurrent flows for underflow and overflow streams. Thickeners function on a principle of gravity sedimentation: an inlet feed is fed to the center of a tank via a feed well, where a suspended series of blades function to rake any settled solids towards a central outlet, i.e. the underflow. The blades also assist the compaction of settled particles and produce a thicker underflow than would be achieved by simple gravity settling. Solids in the thickener move downwards and then inwards towards the central underflow outlet. Liquid moves upwards and radially outwards to a launder/collection area where they exit as the overflow. Examples of thickeners potentially suitable for use in CCD include: (1) high-rate type, (2) rakeless ultra high-rate type, (3) traction type, (4) high-density type, and (5) deep cone type.

A countercurrent arrangement helps ensure that the most concentrated portion of either the underflow or overflow streams is in contact with the least concentrated portion of the other stream, potentially reducing losses of soluble metals. The final overflow of CCD optionally reports to an agglomeration tank for subsequent separation of a graphite product (e.g., graphite concentrate). The final underflow of CCD reports to solid-liquid separation; for example, a belt filter for solid-liquid separation of the slimes and production of a copper product (e.g., copper concentrate).

Table 4 delineates example design and IDEAS process simulation parameters for Phase 2 leaching and CCD steps. Table 5 delineates key reaction chemistry for the Phase 2 leaching step per the IDEAS process simulation parameters.

The anode/graphite powder, electrical components, organic component of the electrolyte, plastic, and any residual steel casing are potentially relatively unreactive during the leaching step. Generally, these influent components partition between the overflow and underflow from CCD as follows: most of the shredded copper, electrical components, any residual steel and aluminum, and some of the graphite, plastic, paper, and organic materials (i.e. residual alkyl carbonates) from the feed lithium-ion batteries' electrolyte may report to the CCD underflow; and, an aqueous pregnant leach solution (PLS), containing soluble metals per Table 1, most of the graphite (e.g., ≥90% of graphite), plastic, paper, and organic materials from the feed lithium-ion batteries' electrolyte (e.g., ≥70% of paper, plastics; and ≥95% of organics) may exit with the final CCD overflow.

The final CCD overflow reports to an agglomeration tank. Graphite agglomerates, optionally via added flocculant (e.g., semi-hydrophobic or hydrophobic polymeric flocculants; for example, a polyethylene oxide-based flocculant), to assist in graphite isolation. The agglomeration tank solution report to a flotation cell(s) to selectively separate hydrophobic components (e.g., graphite agglomerated with flocculant, organics (i.e. residual alkyl carbonates)) from hydrophilic components (e.g., pregnant leach solution). The flotation cell(s) uses air, or other gases (e.g., noble gases, $N_2$, etc.) to produce bubbles; hydrophobic particles attach to the bubbles and rise to the surface, forming a froth. Other options for graphite isolation include spiral separator(s), or jig concentrator(s).

Flotation optionally takes place over two stages to maximize separation and recovery: a rougher flotation and a cleaner flotation. Rougher flotation separates a maximum amount of hydrophobic components from the pregnant leach solution (PLS). The rougher froth reports to a cleaning stage for further flotation. The rougher flotation residue/PLS optionally reports to a holding tank to be mixed with the cleaner flotation residue/PLS for downstream processing. Cleaner flotation further separates the rougher froth to isolate hydrophobic components from the hydrophilic pregnant leach solution (PLS). The isolated froth undergoes solid-liquid separation by reporting to, for example, downstream centrifugation to isolate the graphite product (e.g., graphite concentrate). Filtrate from the solid-liquid separation optionally reports to a holding tank before optionally reporting to a dual media filter or belt filter for entrained organic (i.e. alkyl carbonates) and fine and coarse suspended solids removal. The cleaner flotation residue/PLS optionally reports to a holding tank, and is then mixed with the rougher flotation residue/PLS to optionally report to a dual media filter or belt filter for entrained organic (i.e. alkyl carbonates) and fine and coarse suspended solids removal.

The PLS from the flotation step(s) and the filtrate from the solid-liquid separation optionally report to a dual media filter; a filter similar to that generally found in solvent extraction applications. A first media layer (for example, sand, anthracite) removes entrained organics (e.g. alkyl carbonates such as ethylene carbonate/EC and/or ethyl methyl carbonate/EMC) from the PLS, while a second media filter (for example, garnet, sand, anthracite) removes fine suspended solids. The filtered PLS then optionally reports to a holding tank before being processed through copper-ion exchange or solvent extraction (see, for example, Table 7). Recovered organics (i.e. alkyl carbonates) from dual media filtration can optionally be collected, etc. A media backwash outlet stream (e.g., process water/aqueous solution and any residual fine particulates, such as residual graphite, fine plastics entrained by the second media layer, and minimal entrained organics) is optionally recycled to water/aqueous solution treatment facilities and reused as make-up water/aqueous solution for the herein described process. Optionally, the liquid stream from the dual media filter reports to an activated carbon filter for polishing removal of entrained organics, as needed. Alternatively, a belt filter can be used to remove any remaining oversize solids from upstream and downstream processes. The filtrate optionally reports to a holding tank before reporting to copper ion exchange, or solvent extraction.

Table 6 delineates example design and IDEAS process simulation parameters for the Phase 2 intermediate product preparation steps.

Phase 3: Final Product Preparation

A graphite product (e.g., graphite concentrate) is isolated via solid-liquid separation; for example, via centrifugation of the cleaner froth of Phase 2 flotation. The graphite product is potentially mixed with some plastic and paper, and may be further purified via: (i) low temperature chemical treatment involving multi-stage acid washing (e.g. using sulfuric or hydrochloric acid) to remove impurities/soluble metals (e.g. residual soluble metals such as lithium, nickel, cobalt, copper, and/or manganese) to produce a higher purity graphite concentrate; and/or (ii) thermal purification, e.g., raising the temperature of the concentrate via pyrometallurgical methods (e.g. using a furnace to raise the graphite temperature to ~1000 to 2000° C.) to volatilize specific constituents (e.g., residual organic and plastics) to produce a higher purity graphite product.

The final underflow of CCD/slimes are solid-liquid separated to form a copper product (e.g., a copper/$Cu^0$ concentrate that may be mixed with residual plastic, paper, graphite, minimal aluminum and steel content). The optionally dual media filtered PLS reports to a copper-ion exchange for selective separation of copper from the inlet stream (see, for example, Table 7). The eluate/copper-rich liquor reports to copper electrowinning (e.g., conventional electrowinning, Emew® electrowinning, etc.) for deposition of copper/$Cu^0$ as a copper plate. Spent electrolyte from the electrowinning is optionally recycled to the copper-ion exchange for use as a regenerant, as applicable, with a portion of the recycle stream being optionally bled to the upstream leach tank.

Alternatively, copper/$Cu^0$ is deposited via a copper solvent extraction and copper electrowinning when the PLS copper concentration is, for example, approximately 5 g/L. The copper solvent extraction optionally consists of extraction stage(s) consisting of mixer-settler(s) (e.g., each mixer settler consisting of 1-2 mixer stage(s) and 1 settler stage), potential wash stage(s) consisting of mixer-settler(s) (e.g., each mixer-settler consisting of 1-2 mixer stage(s) and 1 settler stage), and stripping stage(s) consisting of mixer-settler(s) (e.g., each mixer-settler consisting of 1-2 mixer stage(s) and 1 settler stage). As needed, make-up acid is added to the influent PLS to appropriately adjust pH for optimal copper extraction. The extraction mixer-settler stage(s) utilize an organic extractant (such as ketoxime [e.g. LIX®84], salicylaldoxime, or a mixture of ketoxime-salicylaldoxime organic extractants) in a diluent (e.g. in kerosene) to selectively extract copper into the organic phase:

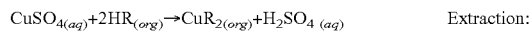
Extraction: $CuSO_{4(aq)} + 2HR_{(org)} \rightarrow CuR_{2(org)} + H_2SO_{4\ (aq)}$ The copper-loaded organic phase then reports to the stripping stage(s) where the extracted copper ions are stripped back into the aqueous phase; for example, using spent electrolyte from copper electrowinning containing acid (e.g., sulfuric acid/$H_2SO_4$):

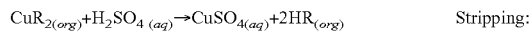
Stripping: $CuR_{2(org)} + H_2SO_{4\ (aq)} \rightarrow CuSO_{4(aq)} + 2HR_{(org)}$ If hydrochloric acid is utilized for pH adjustment, instead of sulfuric acid, optional wash stage(s) are included to minimize levels of entrained aqueous phase containing chloride in the organic phase. The pregnant strip liquor (e.g. at a concentration of approximately 50 g/L soluble copper) then reports to copper electrowinning to deposit copper/$Cu^0$ as a copper plate on a cathode sheet. Once the plate reaches a desired copper thickness, it is removed and optionally replaced with an empty cathode sheet. Spent electrolyte from copper electrowinning is optionally recycled back to the stripping stage(s) of copper solvent extraction; and, the organic phase is optionally recycled back to the extraction stage(s) for reuse, with polishing as needed.

The copper-stripped liquor reporting from copper electrowinning is then: reacted with a hydroxide (e.g., sodium hydroxide, hydrated lime/calcium hydroxide, etc.) to precipitate a Co, Ni, and/or Mn hydroxide product; reacted with a carbonate (e.g., sodium carbonate) to precipitate a Co, Ni, and/or Mn carbonate product; evaporative crystallized to form a Co, Ni, and/or Mn sulfate product; or, reacted with a hydroxide (e.g., sodium hydroxide, hydrated lime/calcium hydroxide, etc.) to precipitate a Co, Ni, and/or Mn hydroxide product, followed by thermal dehydration to produce a Co, Ni, and/or Mn oxide product (e.g., cobalt (II, III) oxide, $Co_3O_4$, nickel (II) oxide, NiO, manganese (IV) dioxide, $MnO_2$). The Co, Ni, and/or Mn product then reports to solid-liquid separation, and a solid filter cake is collected. With respect to the Co, Ni, and/or Mn sulfate product, once the copper-stripped liquor from copper electrowinning reports to an evaporative crystallizer, the resulting product consists of a mixture of cobalt sulfate heptahydrate/$CoSO_4 \cdot 7H_2O$, nickel sulfate hexahydrate/$NiSO_4 \cdot 6H_2O$, and manganese sulfate monohydrate/$MnSO_4 \cdot H_2O$. The crystallized slurry then reports to, for example, solid-liquid separation (e.g., centrifuge or filter press), followed by a drier to drive off excess water.

The Co, Ni, and/or Mn solid-liquid separation filtrate is then reacted with a carbonate (e.g., sodium carbonate, etc.) to precipitate lithium carbonate/$Li_2CO_3$. This lithium carbonate product optionally undergoes solid-liquid separation (e.g., centrifugation) and a solid cake is collected. To optionally further purify the lithium carbonate, it reports to an ion exchange column to remove trace impurities such as calcium and magnesium (see, for example, Table 7); and then, to a bicarbonation circuit where carbon dioxide is bubbled into, for example, a dissolution/digestion tank to convert the lithium carbonate into more soluble lithium bicarbonate before being recrystallized into a higher purity lithium carbonate slurry. The slurry is then solid-liquid separated to give high purity lithium carbonate/$Li_2CO_3$ and is optionally dried.

Alternatively, the Co, Ni, and/or Mn solid-liquid separation filtrate is reacted with a hydroxide (e.g., sodium hydroxide, hydrated lime/calcium hydroxide, etc.) to form a lithium hydroxide and sodium sulfate solution. The lithium hydroxide and sodium sulfate solution reports to crystallization (e.g. using a draft tube baffle crystallizer) to cool the solution and produce a slurry including sodium sulfate decahydrate crystals and soluble lithium hydroxide. The slurry from crystallization reports to solid-liquid separation (e.g. using centrifugation) to separate a solid sodium sulfate decahydrate product and a filtrate comprising lithium hydroxide in solution. The lithium hydroxide solution from solid-liquid separation is evaporative crystallized: the lithium hydroxide monohydrate is crystallized using, for example, a triple effect crystallizer; then, solid-liquid separated via, for example, centrifugation. The product is optionally further purified by dissolving the lithium hydroxide monohydrate crystals in pure water (e.g., distilled or deionized water) and recrystallizing them (e.g. using a mechanical vapour recompression (MVR) crystallizer), followed by optional solid-liquid separation (e.g. using a centrifuge) to collect the purified lithium hydroxide monohydrate product. The lithium hydroxide monohydrate crystals are optionally dried.

Sodium sulfate is optionally isolated as a product. The sodium sulfate solution formed from reacting the Co, Ni, and/or Mn solid-liquid separation filtrate with a base (e.g., a hydroxide) is isolated and optionally crystallized to give sodium sulfate decahydrate. This crystallization is achieved by cooling the sodium sulfate solution in a crystallizer, such as draft tube baffle crystallizers, following which the crystals are optionally dried and cooled. Alternatively, or additionally, the centrate from the $Li_2CO_3$ solid/liquid separation (e.g., centrifugation) reports to an evaporative crystallizer to produce sodium sulfate decahydrate/$Na_2SO_4 \cdot 10H_2O$. Sulfuric acid is optionally added during said crystallization to convert any residual carbonate (e.g. $Na_2CO_{3(aq)}$) into a sulfate form. The resulting crystallized slurry is solid-liquid separated (e.g., centrifuged), and the separated solid product reports to a drier (e.g., a flash drier). The drier drives off water and produces anhydrous sodium sulfate/$Na_2SO_4$.

Table 7 delineates example design parameters; and Table 8 delineates key reaction chemistry for the Phase 3 final product preparation steps, per the IDEAS process simulation mode results.

Example 2—Exemplary Embodiment of Process 2

In particular, the following example describes phases, steps, design criteria, and IDEAS process simulation parameters (IDEAS Bronze, Mineral Processing package, v6.0.0.995) of said process for recovering materials from rechargeable lithium-ion batteries.

Phase 1: Feed Size Reduction (e.g. Steps (i) and (i)(a) of FIG. 1B)

As in Process 1 above, incoming large format lithium-ion batteries (e.g. automotive, energy storage system battery packs) and small format lithium-ion batteries (e.g. from laptops, mobile phones, tablets, etc.) are optionally discharged to approximately between 1.0 to 2.0 V, or to approximately 0 V prior to any mechanical treatment. Discharged energy optionally reports to a central electrical storage bank, which provides peak load reduction for, for example, plant facility-wide power consumption. Discharging lithium-ion batteries facilitates controlling energy released during possible short-circuiting events wherein the batteries' anode(s) and cathode(s) come into contact during a battery dismantling, or multi-stage crushing/shredding step.

Multi-stage crushing/shredding is achieved via use of, for example, crushers under water/aqueous solution immersion, such as water or brine immersion. Water/aqueous solution immersion helps ensure that sparking caused by crushing/shredding is suppressed and absorbed as heat by the water/aqueous solution. Further, the presence of water/aqueous solution can restrict accumulation of oxygen, thereby minimizing combustion risk during crushing.

Moreover, water/aqueous solution promotes entrainment of batteries' electrolyte (e.g., $LiPF_6$ in organic solvent(s)) as it is released after lithium-ion battery crushing, facilitating an increase in overall lithium recovery. Battery electrolytes, such as $LiPF_6$ salt, have a potential for hydrolysis when exposed to water or aqueous solutions; however, with respect to the $LiPF_6$ salt for example, this typically occurs above 70° C. As such, a target water/aqueous solution temperature for the dismantling/crushing step is, for example, approximately 60° C. to facilitate prevention of any appreciable reaction chemistry.

The shredding/crushing step helps mechanically separate the batteries, and may reduce downstream energy consumption and facilitate optimizing equipment sizing. Moreover, multi-stage size reduction facilitates reduction of variability in particle size distribution, which facilitates leaching of target metals/materials.

When multi-stage crushing/shredding is used to dismantle/crush the batteries, the multi-stage crushing comprises first crushing large format lithium-ion batteries to reduce their size (i.e., feed size) to approximately ≤400 mm; and, second, crushing small format lithium-ion batteries (when present) and the size-reduced large format lithium-ion batteries, and reducing that feed to an approximate size of ≤100 mm to form a shredded/crushed slurry. Example operational parameters for crushers suitable for said multi-stage crushing/shredding are provided in Table 2.

The crushed/shredded slurry is optionally screened, where undersized solids that are ≤10 mm pass through a screen; and, oversized solids that are ≤100 mm to ≥10 mm report to shredding for further size reduction. The ≤10 mm solids undergo solid-liquid separation, such as via a settling tank. After the settling tank, the solid slurry optionally reports to a belt filter for further solid-liquid separation. Alternatively, the isolated solids may report to an intermediate hopper for storage prior to magnetic separation. The solid-liquid separation filtrate is optionally recycled back to the crushers/shredders to be reused as make-up water, or optionally sent to an organic (i.e. alkyl carbonates) removal circuit. A portion of the recycle stream (either from/to the crushers/shredders or the organic removal circuit) is optionally bled to a downstream leach tank to facilitate an increase in overall materials recovery and for background impurity level control. Shredding reduces the oversized solids to ≤10 mm to facilitate magnetic separation. The shredded stream then optionally reports to a self-cleaning conveyor, which optionally conveys to a hopper for storage prior to magnetic separation. As used herein, the term "self-cleaning-conveyor" refers to a conveyor having a collection pipe underneath the conveyor with a slot or other opening to collect fine particles that accumulate in the conveyor. Periodically, the collection pipe is sucked clean using a vacuum or similar mechanism, or fine particles collected in the collection pipe can be diverted to downstream processes.

The optional solid-liquid separation filtrate from belt filtration and the settling tank can report to an optional dual media filter or vacuum distillation circuit to remove any organics (i.e. alkyl carbonates). The dual media filter contains filtration media such as anthracite, garnet, and/or sand to remove any entrained organics (i.e. alkyl carbonates) in the filtrate. Alternatively, vacuum distillation consisting of single or multiple stage distillation can be utilized, where aqueous content is predominantly evaporated in a vacuum leaving an organic (i.e. alkyl carbonates) rich stream. The gaseous aqueous stream is then condensed to form a liquid aqueous stream. The aqueous stream is then optionally either recycled to the crushers/shredders, or bled to a downstream leach tank to facilitate an increase in overall materials recovery and for background impurity level control. Conducting the removal of organics (i.e. alkyl carbonates) upstream prevents chemical and mechanical complications from occurring downstream due to alkyl carbonate contamination, for example, in Phase 2 and Phase 3.

Generally, the combined size-reduced solids are approximately distributed as follows: a coarse solid fraction (≥3 mm) including, but not limited to shredded steel and/or aluminum casing, any electrical components, plastic, copper cable, aluminum cathode foil, copper anode foil and possibly paper; and, a fine solid fraction (which can be as small as ≤0.5 mm) including anode powder and cathode powder. As noted above, undersize materials having a particle size of, for example, less than about 5 mm, or less than about 1-2 mm, can be collected during the feed size reduction and diverted to downstream process steps. For example, such undersize materials could be collected by having the output of a crusher/shredder contact a metal mesh (such as on a self-cleaning conveyor as noted above) having openings sized to permit particles having a size of less than about 5 mm or less than about 1-2 mm to pass through and be collected. The undersize materials can be combined with, for example, a black mass solid stream and these combined materials can then be subjected to leaching (described in further detail below).

Table 2 delineates example design and IDEAS process simulation parameters for the Phase 1 feed size reduction steps.

Phase 2: Intermediate Product Preparation and Leaching (e.g. steps (ii)-(x) of FIG. 1B The optionally screened dismantled/crushed/shredded slurry from Phase 1 is magnetically separated (see step (ii) in FIG. 1B) by reporting to, for example, a magnetic separator; example operational parameters of which are provided in Table 9. Magnetic/ferrous materials (e.g. steel sheet; ferrous product(s)) are separated from non-magnetic/non-ferrous materials via wet/dry magnetic separation. Magnetic separation consists of a rougher step and an optional cleaner step, depending on incoming feed and separation efficiency. The magnetic ('mag') stream separated from the magnetic separator optionally undergoes solid-liquid separation (if wet magnetic separation is utilized) by reporting to, for example, a dewatering screen; and produces a shredded steel or ferrous product (step (iii) in FIG. 1B). The separated water/aqueous solution is optionally recycled back to the magnetic separator for use as make-up water/aqueous solution, and a portion of the recycled stream is optionally bled to a downstream leach tank. Bleeding/sending a portion of the recycled stream to the leach tank may facilitate impurity control in the magnetic separator and dewatering screen circuit: if a portion of the recycle stream is not bled, there could be build-up of fine particles and/or species formed from side reaction chemistry (e.g. trace levels of precipitates) in a circuit's piping, potentially leading to plugging, down-time and production loss.

The non-magnetic/non-ferrous stream from magnetic separation reports to a series of mixing tanks (represented by stripping step (iv) in FIG. 1B), where a stripping solvent is added to strip the bonded black mass/electrode powder material from the first non-magnetic stream. The addition of stripping solvent, for example N-Methyl-2-pyrrolidone (other options are provided in Table 9 below), dissolves the binder material, for example polyvinylidene fluoride (PVDF), and allows the electrode powder material to coagulate into a black mass. The stripped slurry stream (i.e. black mass/electrode powder stream), undergoes solid-liquid separation (see step (v) in FIG. 1B) by reporting to, for example, a wire mesh screen with 500 μm openings, producing an oversize solids portion of the stripped slurry stream (i.e. larger solids portion of the separation)—comprising aluminum, copper, and plastics—and an undersized stripped slurry stream (i.e. liquid portion of the separation containing smaller suspended solids including black mass). The oversize solids portion of the stripped slurry stream is optionally dried by reporting to, for example, a dewatering conveyor. The undersized stripped slurry stream reports to a filter press for solid-liquid separation (see step (vii) in FIG. 1B) to yield a liquid containing the solvent and a black mass solid stream. The separated solvent is optionally collected into a tank, and is optionally recycled back to the stripping tanks for use as make-up solvent.

The oversize solids portion of the stripped slurry stream then can optionally undergo further separation (per step (vi) in FIG. 1B) by reporting to, for example, a densimetric separator unit. The densimetric separator unit optionally separates the oversize solids portion of the stripped slurry stream into three separate streams, including a preliminary aluminum product stream, a preliminary copper product stream, and a plastic product stream. The isolated streams are optionally washed and report to a dewatering screen to collect separate and washed preliminary aluminum product, preliminary copper product, and plastic product streams.

The black mass solid stream comprises at least one of electrode (e.g. metal oxide and/or metal phosphate cathode powders, graphite anode), plastic, and some residual non-ferrous (e.g. shredded copper and/or aluminum) components. This stream reports to a leach tank for leaching, together with undersize materials having a particle size of, for example, less than about 5 mm, or less than about 1-2 mm, from the feed size reduction phase as described above.

Table 9 delineates example design and IDEAS process simulation parameters for Phase 2 magnetic separation, stripping, and optional densimetric separation.

Leaching (see step (viii) of FIG. 1B) is optionally conducted in a series of tanks, for example conical-bottom tanks under high shear agitation; or, a sloped or flat bottom tank. A conical, sloped, or flat bottom tank promotes settling of higher-density, coarse solid fractions. Agitation helps ensure that high value fine fractions are suspended and promotes leaching kinetics. Multiple tanks optimize leaching reaction kinetics and provide operational redundancy. Sulfuric acid is optionally used to leach target metals/materials in the influent slurries. Hydrogen peroxide and oxygen gas are optionally added to reduce and oxidize nobler metals to increase extraction rates; further, for example, hydrogen peroxide addition may increase extraction of copper, cobalt, etc. but decrease nickel extraction. Alternatively, hydrochloric acid is used; or, nitric acid with or without hydrogen peroxide.

Several influent streams report to leaching: black mass solid stream from the stripping step and subsequent separation step; leaching reagents, such as acid, hydrogen peroxide, etc.; and, bleed and recycle streams from upstream/downstream steps.

The leached slurry produced by the leaching step is subjected to a solid-liquid separation (see step (ix) in FIG. 1B), such as filtration, to produce a first product stream containing residual solids following the leaching step and a second product stream comprising the leachate (i.e. pregnant leach solution (PLS)).

Table 10 delineates example design and IDEAS process simulation parameters for Phase 2 leaching. Table 5 delineates key reaction chemistry for the Phase 2 leaching step per the IDEAS process simulation parameters.

The $1^{st}$ product stream containing residual solids following the leaching step is mixed with water, and the pH is adjusted to a pH ranging between 4 and 8. The mixing tank solution reports to a flotation cell(s) to selectively separate hydrophobic components (e.g., graphite, organics (i.e. alkyl carbonates), and residual plastics) from hydrophilic components (e.g., process mixing water). The flotation cell(s) uses air, or other gases (e.g., noble gases, $N_2$, etc.) to produce bubbles; hydrophobic particles attach to the bubbles and rise to the surface, forming a froth. Other options for graphite isolation include spiral separator(s), or jig concentrator(s).

Flotation optionally takes place over two stages to maximize separation and recovery: a rougher flotation and a cleaner flotation. Rougher flotation separates a maximum amount of hydrophobic components from the process mixing water. The rougher froth reports to a cleaning stage for further flotation. The rougher flotation residue/process mixing water optionally reports to a holding tank to be mixed with the cleaner flotation residue/process mixing water for downstream processing. Cleaner flotation further separates the rougher froth to isolate hydrophobic components from the hydrophilic process mixing water. The isolated froth undergoes solid-liquid separation by reporting to, for example, downstream centrifugation to isolate the graphite product (e.g., graphite concentrate). Filtrate from the solid-liquid separation optionally reports to a holding tank before being recycled back to the mixing tank.

The PLS from the solid-liquid separation optionally reports to a dual media filter; a filter similar to that generally found in solvent extraction applications. A first media layer (for example, sand, anthracite) removes entrained organics (i.e. alkyl carbonate(s)) (e.g. ethylene carbonate/EC and/or ethyl methyl carbonate/EMC) from the PLS, while a second media filter (for example, garnet, sand, anthracite) removes fine suspended solids. The filtered PLS then optionally reports to a holding tank before being processed through copper-ion exchange or solvent extraction (see, for example, Table 12). Recovered organics (i.e. alkyl carbonate(s)) from dual media filtration can optionally be collected, etc. A media backwash outlet stream (e.g., process water/aqueous solution and any residual fine particulates, such as residual graphite, fine plastics entrained by the second media layer, and minimal entrained organics (i.e. alkyl carbonates(s)) is optionally recycled to water/aqueous solution treatment facilities and reused as make-up water/aqueous solution for the herein described process. Optionally, the liquid stream from the dual media filter reports to an activated carbon filter for polishing removal of entrained organics (i.e. alkyl carbonates), as needed. Alternatively, a belt filter may be used to remove any remaining oversize solids from upstream and downstream processes. The filtrate optionally reports to a holding tank before reporting to copper ion exchange or solvent extraction.

Table 11 delineates example design and IDEAS process simulation parameters for the Phase 2 intermediate product preparation steps.

Phase 3: Final Product Preparation (e.g. Steps (xi)-(xv) of FIG. 1B

A graphite product (e.g., graphite concentrate) is isolated via solid-liquid separation; for example, via centrifugation of the cleaner froth of Phase 2 flotation. The graphite product is potentially mixed with some plastic and paper, and may be further purified via: (i) low temperature chemical treatment involving multi-stage acid washing (e.g. using sulfuric or hydrochloric acid) to remove impurities/soluble metals (e.g. residual soluble metals such as lithium, nickel, cobalt, copper, and/or manganese) to produce a higher purity graphite concentrate; and/or (ii) thermal purification, e.g., raising the temperature of the concentrate via pyrometallurgical methods (e.g. using a furnace to raise the graphite temperature to ~1000 to 2000° C.) to volatilize specific constituents (e.g., residual organic/(i.e. alkyl carbonates) and plastics) to produce a higher purity graphite product.

The optionally dual media or belt filtered PLS reports to a copper-ion exchange for selective separation of copper from the inlet stream (see, for example, Table 12). The eluate/copper-rich liquor reports to copper electrowinning (e.g., conventional electrowinning, Emew® electrowinning, etc.) for deposition of copper/$Cu^0$ as a copper plate. Spent electrolyte from the electrowinning is optionally recycled to the copper-ion exchange for use as a regenerant, as applicable, with a portion of the recycle stream being optionally bled to the upstream leach tank.

Alternatively, copper/$Cu^0$ is deposited via a copper solvent extraction and copper electrowinning when the PLS copper concentration is, for example, approximately 5 g/L. The copper solvent extraction optionally consists of extraction stage(s) consisting of mixer-settler(s) (e.g., each mixer settler consisting of 1-2 mixer stage(s) and 1 settler stage), potential wash stage(s) consisting of mixer-settler(s) (e.g., each mixer-settler consisting of 1-2 mixer stage(s) and 1 settler stage), and stripping stage(s) consisting of mixer-settler(s) (e.g., each mixer-settler consisting of 1-2 mixer stage(s) and 1 settler stage). As needed, make-up acid or base (e.g. sodium hydroxide) is added to the influent PLS to appropriately adjust pH for optimal copper extraction. The extraction mixer-settler stage(s) utilize an organic extractant (such as ketoxime [e.g. LIX®984N], salicylaldoxime, or a mixture of ketoxime-salicylaldoxime organic extractants) in a diluent (e.g. in kerosene) to selectively extract copper into the organic phase:

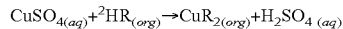
$CuSO_{4(aq)} + 2HR_{(org)} \rightarrow CuR_{2(org)} + H_2SO_{4\ (aq)}$   Extraction:

The copper-loaded organic phase then reports to the stripping stage(s) where the extracted copper ions are stripped back into the aqueous phase; for example, using spent electrolyte from copper electrowinning containing acid (e.g., sulfuric acid/$H_2SO_4$):

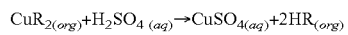
$CuR_{2(org)} + H_2SO_{4\ (aq)} \rightarrow CuSO_{4(aq)} + 2HR_{(org)}$   Stripping:

If hydrochloric acid is utilized for pH adjustment, instead of sulfuric acid, optional wash stage(s) are included to minimize levels of entrained aqueous phase containing chloride in the organic phase. The pregnant strip liquor (e.g. at a concentration of approximately 50 g/L soluble copper) then reports to copper electrowinning to deposit copper/$Cu^0$ as a copper plate on a cathode sheet. Once the plate reaches a desired copper thickness, it is removed and optionally replaced with an empty cathode sheet. Spent electrolyte from copper electrowinning is optionally recycled back to the stripping stage(s) of copper solvent extraction; and, the organic phase is optionally recycled back to the extraction stage(s) for reuse, with polishing as needed.

The copper isolation raffinate (i.e. copper-stripped liquor) can then optionally be sparged with oxygen to gas to oxidize any ferrous ($Fe^{2+}$) content to insoluble ferric ($Fe^{3+}$) and subsequently optionally reacted with a hydroxide (e.g., sodium hydroxide, hydrated lime/calcium hydroxide, etc.) to precipitate an Al and/or Fe hydroxide product. The Al/and or Fe product could then report to solid-liquid separation and a solid filter cake would be collected.

The Al and/or Fe-depleted solution (Al and/or Fe product preparation filtrate) is then reacted with a hydroxide (e.g., sodium hydroxide, hydrated lime/calcium hydroxide, etc.) to precipitate a Co, Ni, and/or Mn hydroxide product; reacted with a carbonate (e.g., sodium carbonate) to precipitate a Co, Ni, and/or Mn carbonate product; evaporative crystallized to form a Co, Ni, and/or Mn sulfate product; or, reacted with a hydroxide (e.g., sodium hydroxide, hydrated lime/calcium hydroxide, etc.) to precipitate a Co, Ni, and/or Mn hydroxide product, followed by thermal dehydration to produce a Co, Ni, and/or Mn oxide product (e.g., cobalt (II, III) oxide, $Co_3O_4$, nickel (II) oxide, NiO, manganese (IV) dioxide, $MnO_2$). The Co, Ni, and/or Mn product then reports to solid-liquid separation, and a solid filter cake is collected. If the Co, Ni, and/or Mn-containing filter cake is leached with sulfuric acid, the leachate can then report to an evaporative crystallizer, and the resulting product will consist of a mixture of cobalt sulfate heptahydrate/$CoSO_4.7H_2O$, nickel sulfate hexahydrate/$NiSO_4.6H_2O$, and manganese sulfate monohydrate/$MnSO_4.H_2O$. The crystallized slurry then reports to, for example, solid-liquid separation (e.g., centrifuge or filter press), followed by a drier to drive off excess water.

Alternatively, Al and/or Fe-depleted solution (Al and/or Fe product preparation filtrate) is reacted with an oxidant (e.g. hydrogen peroxide) and a base may be added to maintain the pH between 5 and 7 to produce a manganese dioxide precipitate which is removed using solid-liquid separation (e.g. a filter press). Cobalt is then optionally selectively extracted from the filtrate into a cobalt rich stream, which is then stripped washed and crystalized to form a cobalt sulfate heptahydrate product. The filtrate is then reacted with additional hydroxide (e.g., sodium hydroxide, hydrated lime/calcium hydroxide, etc.) to precipitate nickel/nickel-cobalt hydroxide. The precipitate is removed via solid liquid filtration.

According to parameters as outlined in the appended Tables below relating to exemplary Process 2 conditions, sodium sulfate is isolated as a salt by-product prior to lithium recovery, utilizing the Co, Ni, and/or Mn solid-liquid separation filtrate. The filtrate is crystallized to produce sodium sulfate decahydrate. This crystallization is achieved by cooling the sodium sulfate solution in a crystallizer, such as draft tube baffle crystallizers, following which the crystals undergo solid-liquid separation (e.g. via a centrifuge or filter press), and the isolated solid crystals are optionally dried and cooled. Subsequently, the filtrate from the solid-liquid separation of the isolated crystals report to lithium recovery.

The sodium sulfate solid-liquid separation filtrate is then reacted with a carbonate (e.g., sodium carbonate, etc.) to precipitate lithium carbonate/$Li_2CO_3$. This lithium carbonate product optionally undergoes solid-liquid separation (e.g., centrifugation) and a solid cake is collected. To optionally further purify the lithium carbonate, it reports to an ion exchange column to remove trace impurities such as calcium and magnesium (see, for example, Table 12); and then, to a bicarbonation circuit where carbon dioxide is bubbled into, for example, a dissolution/digestion tank to convert the lithium carbonate into more soluble lithium bicarbonate before being recrystallized into a higher purity lithium carbonate slurry. The slurry is then solid-liquid separated to give high purity lithium carbonate/$Li_2CO_3$ and is optionally dried.

Alternatively, the sodium sulfate solid-liquid separation filtrate is reacted with a hydroxide (e.g., sodium hydroxide, hydrated lime/calcium hydroxide, etc.) to form a lithium hydroxide and sodium sulfate solution. The lithium hydroxide and sodium sulfate solution reports to crystallization (e.g. using a draft tube baffle crystallizer) to cool the solution and produce a slurry including sodium sulfate decahydrate crystals and soluble lithium hydroxide. The slurry from crystallization reports to solid-liquid separation (e.g. using centrifugation) to separate a solid sodium sulfate decahydrate product and a filtrate comprising lithium hydroxide in solution. The lithium hydroxide solution from solid-liquid separation is evaporative crystallized: the lithium hydroxide monohydrate is crystallized using, for example, a triple effect crystallizer; then, solid-liquid separated via, for example, centrifugation. The product is optionally further purified by dissolving the lithium hydroxide monohydrate crystals in pure water (e.g., distilled or deionized water) and recrystallizing them (e.g. using a mechanical vapour recompression (MVR) crystallizer), followed by optional solid-liquid separation (e.g. using a centrifuge) to collect the purified lithium hydroxide monohydrate product. The lithium hydroxide monohydrate crystals are optionally dried.

Sodium sulfate is optionally isolated as a product. In one embodiment, the centrate from the $Li_2CO_3$ solid/liquid separation (e.g., centrifugation) optionally reports to an evaporative crystallizer to produce sodium sulfate decahydrate/$Na_2SO_4 \cdot 10H_2O$. Sulfuric acid is optionally added during said crystallization to convert any residual carbonate (e.g. $Na_2CO_{3(aq)}$) into a sulfate form. The resulting crystallized slurry is solid-liquid separated (e.g., centrifuged), and the separated solid product reports to a drier (e.g., a flash drier). The drier drives off water and produces anhydrous sodium sulfate/$Na_2SO_4$.

Table 12 delineates example design parameters; and Table 13 delineates key reaction chemistry for the Phase 3 final product preparation steps, per the IDEAS process simulation mode results.

Example 3—Validation of Process 2

Size reduction of lithium-ion batteries was conducted as outlined in Example 5 below, dry magnetic separation was conducted to separate the scrap steel (magnetic product stream) from the rest of the material (non-magnetic feed stream). The non-magnetic feed stream was then stripped by mixing at 10 wt % with N-Methyl-2-pyrrolidone (NMP) as a stripping solvent at 80° C. for 6 hours to release the cathode and anode from their substrates which are made of aluminum (Al) and copper (Cu) foils. The stripped slurry stream was passed through a 500 µm screen to separate the undersize stripped slurry stream containing fine cathode and anode material and the liquid organic solvent (i.e. stripping solvent) from the oversize solids portion containing Al, Cu, and plastic pieces of the substrate. The oversize solids portion was subjected to density (densimetric) separation to separate the Al, Cu, and plastic from each other. The plastic was separated using a liquid with a specific gravity (SG) of 2.5 which was followed by the separation of aluminum from the copper using a liquid with an SG of 2.85. The undersize stripped slurry stream containing the fine cathode and anode material was separated from the liquid organic (stripping) solvent using a Buchner funnel with a Whatman® grade 541 filter paper attached to a vacuum flask.

Leaching of the fine cathode and anode material (i.e. black mass solid stream) was conducted with a pulp density of 10% in 0.5M sulfuric acid ($H_2SO_4$) for 6 hours at 80° C. The leach solution was maintained at a pH of 2.5 via addition of $H_2SO_4$ over the course of the reaction time. Hydrogen peroxide ($H_2O_2$) was added throughout the leach to promote cobalt (Co) leaching. The leaching resulted in the recovery of 95% of all of the metals processed in the product streams—i.e. 95% of the Cu, Al, Fe, Co, Ni, Mn, and Li were found to be leached from the black mass into the pregnant leach solution. The pregnant leach solution (PLS) was separated from the residual solids using a Buchner funnel with a Whatman® grade 3 filter paper attached to a vacuum flask. The residual solids (corresponding to the $1^{st}$ product stream in FIG. 1B) were mixed with water and the slurry adjusted to pH 5 and then processed in a 2-stage flotation circuit to produce a graphite product. The first stage was a rougher flotation from which the overflow was processed in a cleaner flotation.

The PLS (corresponding to the $2^{nd}$ product stream in FIG. 1B) was then adjusted to pH 2 using 50 wt % sodium hydroxide (NaOH) in preparation for copper (Cu) removal. The Cu was removed using solvent extraction; an organic extractant, LIX 984N, at 30 vol % diluted in kerosene was mixed with the PLS. The Cu was loaded onto the organic phase while the aqueous phase, the raffinate (corresponding to the $3^{rd}$ product stream in FIG. 1B), continued to the next process step. The Cu was stripped from the organic phase using 1M $H_2SO_4$ where it was sent to electrowinning for the production of copper plating.

Following the Cu removal, the raffinate was adjusted to pH 4.5 at 50° C. by the addition of 50 wt % NaOH which resulted in the precipitation of iron (Fe) and Al as hydroxides, $Fe(OH)_3$ and $Al(OH)_3$. The solution was separated from the precipitate using a Buchner funnel with a Whatman® grade 3 filter paper attached to a vacuum flask. The filtered solids were then washed in warm (50° C.) water and filtered a second time using the same procedure as previously stated. The solids were dried in an oven at 80° C. The precipitation had a recovery of >99% and produced a mixed hydroxide product with a purity of 85%.

The filtrate (corresponding to the $4^{th}$ product stream in FIG. 1B) was adjusted to pH 9.5 at 50° C. by the addition of 50 wt % NaOH which resulted in the precipitation of cobalt (Co), nickel (Ni), and manganese (Mn) as hydroxides, $Co(OH)_2$, $Ni(OH)_2$, and $Mn(OH)_2$. The solution was separated from the precipitate using a Buchner funnel with a Whatman® grade 3 filter paper attached to a vacuum flask. The filtered solids were then washed in warm (50° C.) water and filtered a second time using the same procedure as previously stated. The solids were dried in an oven at 80° C.

The filtrate (corresponding to the 5$^{th}$ product stream in FIG. 1B) was evaporated to reduce the volume to a point when the sodium (Na) concentration reached a concentration of 70 g/L. Evaporation was conducted at 95° C. The solution was then adjusted to pH 9.5 using 50 wt % NaOH. The solution was then mixed and was cooled to 10° C. and sodium sulfate decahydrate ($Na_2SO_4$-$10H_2O$) precipitated from the solution. The solution was separated from the precipitate using a Buchner funnel with a Whatman® grade 3 filter paper attached to a vacuum flask. The filtered solids were then washed in a basic, pH 9.5, solution and filtered a second time using the same procedure as previously stated. The solids were then dried under vacuum to produce anhydrous sodium sulfate ($Na_2SO_4$).

The filtrate (corresponding to the 6$^{th}$ product stream in FIG. 1B) was evaporated to reduce the volume to a point when the lithium (Li) concentration reached a concentration of 11 g/L. A saturated sodium carbonate ($Na_2CO_3$) solution was prepared with as concentration of 430 g/L and heated to 90° C. The $Na_2CO_3$ solution was added to the filtrate such that the carbonate ($CO_3^{2-}$) was 1.25 times the stoichiometric requirement to precipitate the Li. The mixture of the filtrate and $Na_2CO_3$ was mixed at 95° C. for 6 hours. The solution was separated from the precipitate using a Buchner funnel with a Whatman® grade 3 filter paper attached to a vacuum flask. The filtered solids were then washed in hot (70° C.) water and filtered a second time using the same procedure as previously stated. The solids were dried in an oven at 80° C. The precipitation had a recovery of 90% and produced a crude $Li_2CO_3$ product with a purity of 89% to be later purified.

The $Na_2SO_4$ process was repeated to remove the remaining $Na_2SO_4$ from the filtrate.

Example 4—Exemplary System/Apparatus

Figure 2:
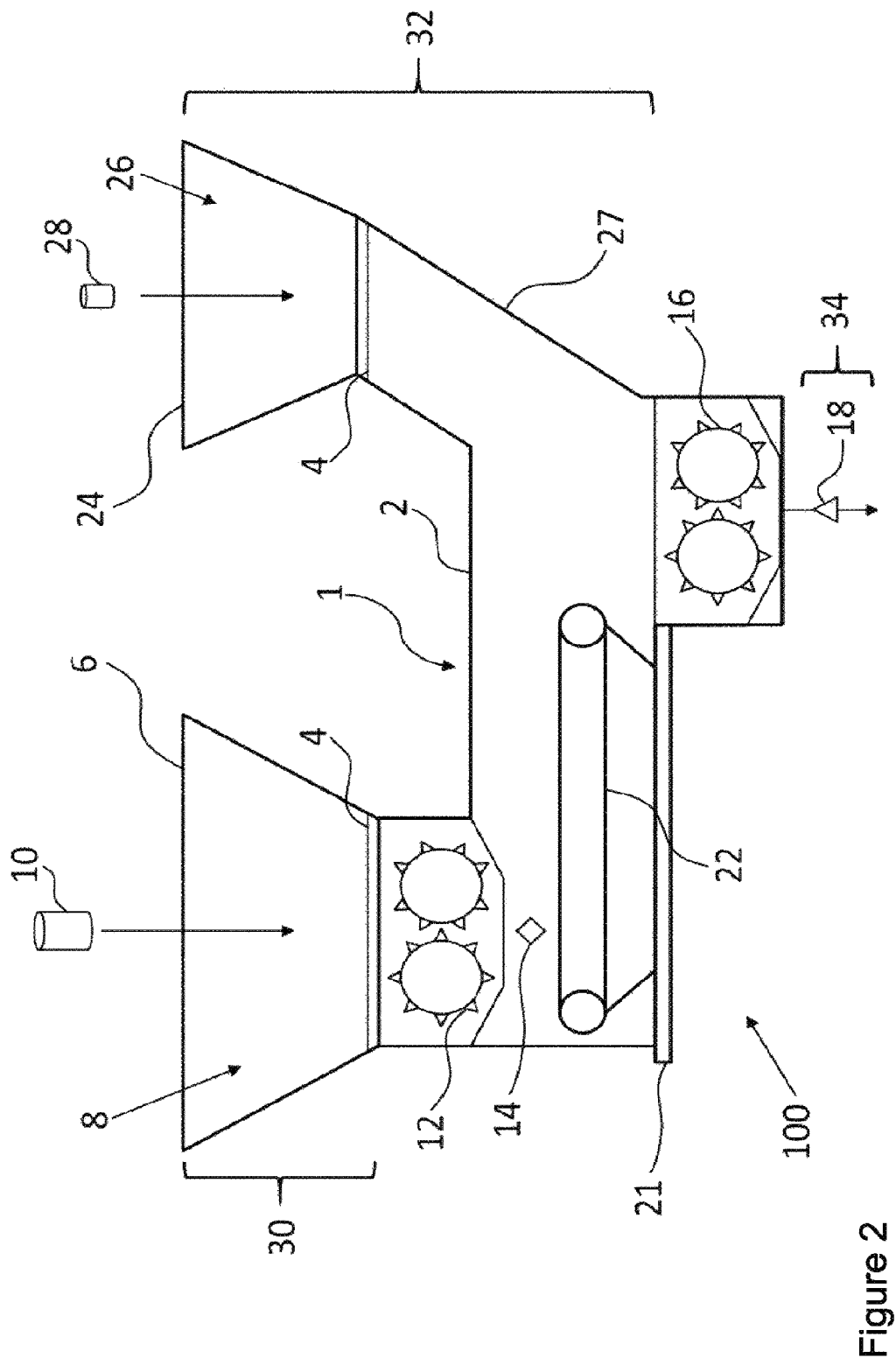
FIG. 2 depicts an exemplary apparatus and system in accordance with an embodiment of the present application.

FIG. 2 is a schematic illustration in accordance with an exemplary embodiment of the apparatus and system of the present application. FIG. 2 illustrates an apparatus 1 for carrying out size reduction of battery materials under immersion conditions comprising a housing 2 configured to hold an immersion liquid 4, a first feed chute 6 (hopper) having an opening 8 disposed therein for receiving battery materials of a first type 10 into the housing 2, a first submergible comminuting device 12 disposed within the housing 2 to receive battery materials of a first type 10 from first feed chute 6 to cause a size reduction of battery materials of a first type 10 and form a first reduced-size battery material 14, and a second submergible comminuting device 16 disposed within housing 2 to receive the first reduced-size battery material 14 from first submergible comminuting device 12 and cause a further size reduction in the first reduced-size battery material 14 to form a second reduced-size battery material 18. A second reduced-size battery material 18 can exit the apparatus as an exit stream of materials in a direction, for example, as indicated by the arrow in FIG. 2, and/or be further received and processed by additional downstream apparatuses and/or systems and/or processes. In this exemplary embodiment, battery materials of the first type 10 are large format rechargeable lithium-ion batteries as described above (e.g., lithium-ion batteries measuring approximately up to 5000 mm×2000 mm×1450 mm in size or electric car batteries). The first reduced-size battery material 14 in the exemplary embodiment shown has a particle size smaller than about 400 mm. In this exemplary embodiment, the first submergible comminuting device 12 and the second submergible comminuting device 16 are multi-shaft shredders.

Referring to FIG. 2, there is provided a first feed chute 6 to deliver battery materials of a first type 10 to a first submergible comminuting device 12 for forming a first reduced-size battery material 14. A submergible conveyor 22 is provided for receiving and delivering a first reduced-size battery material 14 to a second submergible comminuting device 16 for forming a second reduced-size battery material 18. The second reduced-size battery material 18 in the exemplary embodiment shown has an particle size smaller than about 100 mm. In the schematic shown in FIG. 2, the submergible conveyor 22 is a self-cleaning chain conveyor having a collection element 21 that is a pipe, wherein the pipe defines an open side or slot opposite from the underside of the submergible conveyor, thus allowing undersized materials to fall through the opening/slot and collect in the pipe. These undersized materials can be suctioned or pumped to downstream apparatuses/systems/processes.

Referring to FIG. 2, there is provided a second feed chute 24 (hopper) having an opening 26 disposed therein for receiving battery materials of a second type 28 into the housing 2. In the schematic shown in FIG. 2, the housing 2 comprises a delivery chute 27 for delivering the battery materials of the second type 28 from the second feed chute 24 directly to the second submergible comminuting device 16. The second submergible comminuting device 16 is configured to cause a size reduction in the first reduced-size battery material 14 as well as the battery materials of a second type 28. In this exemplary embodiment, the battery materials of a second type 28 are small format rechargeable lithium-ion batteries as described above. In this exemplary embodiment, the battery materials of a second type 28 are of a reduced size relative to battery materials of a first type 10.

The apparatus further comprises an outlet for discharging comminuted material produced by the second submergible comminuting device 16, in the vicinity of the output of the second submergible comminuting device 16, wherein the discharged comminuted material 18 can report to one or more further optionally submergible comminuting devices, and/or to further downstream systems and processes.

FIG. 2 also illustrates an exemplary system 100 for carrying out size reduction of battery materials under immersion conditions comprising components as described in respect of the apparatus 1 outlined above in combination with an immersion liquid 4. System 100 comprises a first submergible comminuting device 12 for receiving battery materials of a first type 10 and causing a reduction in size thereof to form a first reduced-size battery material 14, a second submergible comminuting device 16 for receiving a first reduced-size battery material 14 and causing a further reduction in size thereof to form a second reduced-size battery material 18, and an immersion liquid 4 for submerging therein each of the first submergible comminuting device 12, the second submergible comminuting device 16, the first reduced-size battery material 14 and the second reduced-size battery material 18. In this exemplary embodiment, battery materials of the first type 10 are large format rechargeable lithium-ion batteries as described above. The first reduced-size battery material 14 in the exemplary embodiment shown in FIG. 2 has a particle size smaller than about 400 mm.

Referring to FIG. 2, exemplary system 100 comprises a submergible conveyor 22 for delivering a first reduced-size battery material 14 from a first submergible comminuting device 12 to a second submergible comminuting device 16, wherein each of the first submergible comminuting device 12, the second submergible comminuting device 16, the first reduced-size battery material 14 and the second reduced-size battery material 18 and the submergible conveyor 22 are submerged in an immersion liquid 4. In this exemplary embodiment, the submergible conveyor 22 is a self-cleaning chain conveyor as described above and the second reduced-size battery material 18 has a particle size smaller than about 100 mm.

In the schematic shown in FIG. 2 of exemplary system 100, a first submergible comminuting device 12 causes a size reduction in a battery material of a first type 10 via shearing to form a first reduced-size battery material 14, and a second submergible comminuting device 16 causes a further size reduction in the first reduced-size battery material 14 via shearing to form a second reduced-size battery material 18 that is submerged in the immersion liquid 4. In this exemplary embodiment, each of a first submergible comminuting device 12 and a second submergible comminuting device 16 is a multi-shaft shredder as described above.

Referring to FIG. 2, exemplary system 100 comprises a first delivery system 30 for delivering battery materials of a first type 10 to a first submergible comminuting device 12. A first delivery system 30 in the schematic shown in FIG. 2 comprises a first feed chute 6 (hopper) and for delivering the battery materials of the first type 10 to the first submergible comminuting device 12. Exemplary system 100 in the schematic shown in FIG. 2 further comprises a second delivery system 32 configured for delivering battery materials of a second type 28 directly to a second submergible comminuting device 16 to form a comminuted material 34 submerged in an immersion liquid 4. The comminuted material 34 combines with the second reduced-size battery material 18 and is of a similar size. The second delivery system 32 comprises a second feed chute 24 and delivery chute 27. In this exemplary embodiment, battery materials of a second type 28 are small format lithium-ion batteries which are of a reduced size relative to battery materials of a first type 10 which are large format lithium-ion batteries.

Referring to FIG. 2, exemplary system 100 can comprise a third comminuting device (not shown) to receive the comminuted battery materials (18/34) from the second submergible comminuting device 16, wherein the third comminuting device is optionally submergible in immersion liquid 4 and causes a size reduction of the comminuted battery materials (18/34) received from the second submergible comminuting device 16. The comminuted material exiting the second submergible comminuting device 16 thus may be further processed via additional downstream systems and/or processes. For example, a third comminuting device may be integrated with other systems for further processing of further comminuted battery materials. The system can further comprise a fourth comminuting device to receive comminuted battery materials from the third optionally submergible comminuting device, as described above in respect of the apparatus.

Table 14 provides the mechanical design criteria for an embodiment of an apparatus/system for carrying out size reduction of battery materials under immersion conditions.

Example 5—Physical Validation of System/Apparatus

Figure 3A:
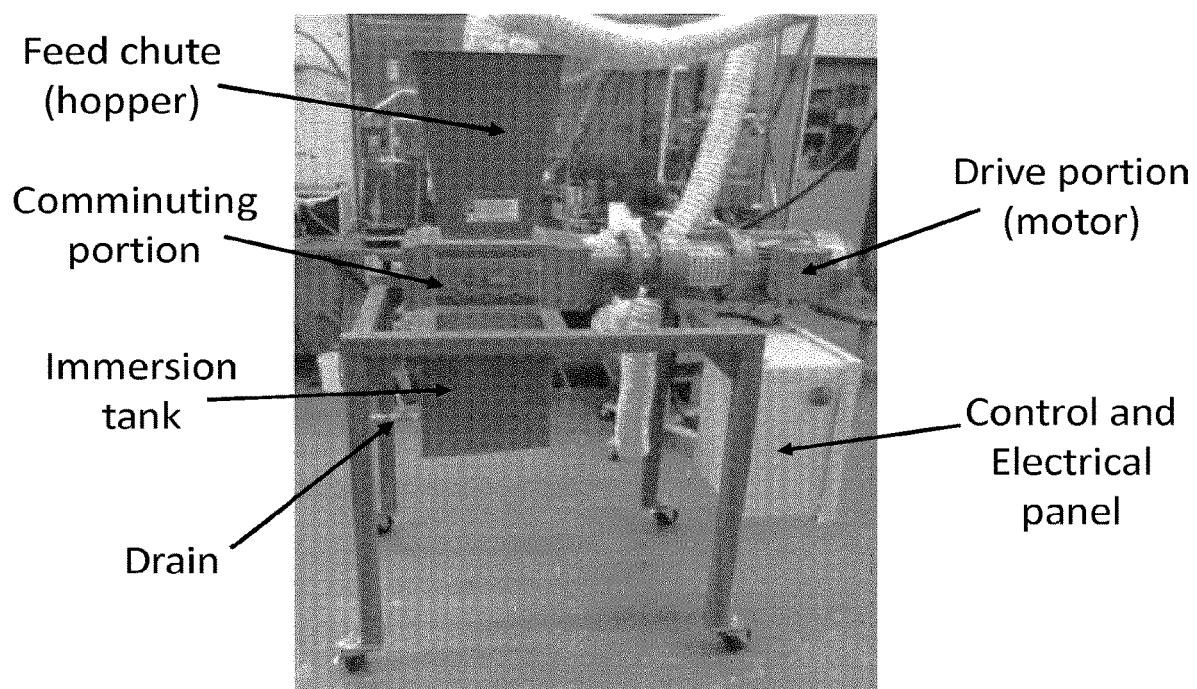
FIG. 3(a) is a picture of the modified Franklin-Miller Taskmaster TM8500 Shredder™ which is a dual-shaft shredder that has been modified to operate under immersion conditions.
Figure 3B:
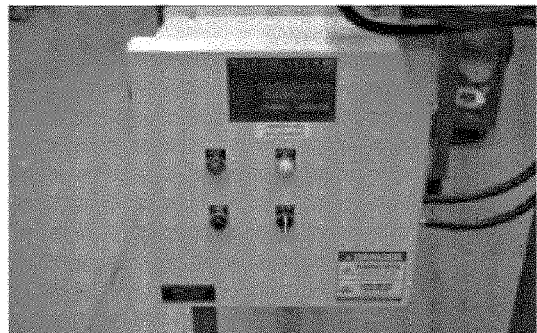
FIG. 3(b) is a picture of the control and electrical panel for the modified Franklin-Miller Taskmaster TM8500 Shredder™ shown in FIG. 3(a).
Figure 3C:
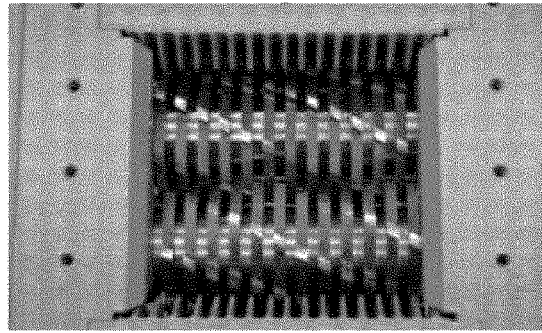
FIG. 3(c) is a picture of the comminuting portion of the modified Franklin-Miller Taskmaster TM8500 Shredder™ shown in FIG. 3(a).

A pilot test for battery material size reduction was carried out using a modified Franklin-Miller Taskmaster TM8500 Shredder™ shown in FIGS. 3(a), 3(b), and 3(c) to size-reduce cylindrical lithium-ion batteries via shredding/shearing.

Figure 3D:
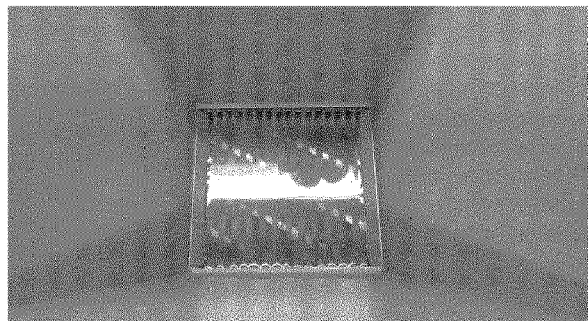
FIG. 3(d) is a picture of the comminuting portion of the modified Franklin-Miller Taskmaster TM8500 Shredder™ shown in FIG. 3(a) showing the comminuting portion immersed in the immersion liquid.

FIG. 3(a) is a picture of the modified Franklin-Miller Taskmaster TM8500 Shredder™, which is a dual shaft shredder that has been modified to operate under immersion conditions. As can be seen from FIG. 3(a), the modified shredder comprises a feed chute (hopper) for feeding batteries into the system/apparatus, a drive portion (motor) operatively coupled to a comminuting portion for shredding the batteries, and an immersion tank disposed below the comminuting portion which together with the comminuting portion of the shredder forms a housing for containing an immersion liquid. The feed chute/hopper has been modified from the original factory specifications to make it somewhat shorter. In addition, water-tight seals have been added around the drive shaft as well as the area where the feed chute/hopper is connected to the comminuting portion, to prevent leakage of immersion liquid into the drive shaft (motor) portion of the shredder, as well as to prevent leakage of immersion liquid to the exterior of the shredder. The immersion tank includes a drain for draining the immersion liquid following comminution. FIG. 3(b) is a picture of the control and electrical panel for the modified Franklin-Miller Taskmaster TM8500 Shredder™ shown in FIG. 3(a). FIG. 3(c) is a picture of the comminuting portion of the modified Franklin-Miller Taskmaster TM8500 Shredder™ shown in FIG. 3(a). FIG. 3(d) is a picture of the comminuting portion of the modified Franklin-Miller Taskmaster TM8500 Shredder™ shown in FIG. 3(a) showing the comminuting portion immersed in the immersion liquid.

For the pilot test, fully charged lithium-ion batteries were first immersed and discharged in a 10% NaC solution. The batteries tested were small format, cylindrical Nickel-Manganese-Cobalt (NMC) chemistry lithium-ion batteries and Nickel-Cobalt-Aluminum (NCA) chemistry lithium-ion batteries, having approximate dimensions of 69.6 mm×18.1 mm, and a mass of approximately 50 g. An immersion liquid was prepared by adding $Ca(OH)_2$ to a solution until the solution pH measured approximately 12. Batches of 10 lithium-ion batteries were then shredded in a 31 L volume of immersion liquid which was poured into the immersion tank and submerged the comminuting portion of the shredder. No appreciable amount of dust or gas from battery size reduction was produced during the pilot test, which confirmed that the disclosed apparatuses and systems as herein described provides particular advantages over known size reduction apparatuses and systems.

Figure 4A:
FIG. 4(a) is a picture of material after passing through 1st stage wet shredding (Physical Validation Example; Coarse Shredder mini-piloting).

The shredded product shown in FIG. 4(a) was tested for fluoride concentration using an ion probe. Results from the analysis showed an average of 1.3 to 3.4 ppm aqueous fluoride concentration depending on what type of battery was shredded (1.3 for nickel-manganese-cobalt/NMC batteries and 3.4 for nickel-cobalt-aluminum/NCA). A separate batch of 20 NCA batteries were shredded in the same solution volume as the first batch. The shredded product was also analyzed and had an aqueous fluoride concentration of 5.74 ppm. This low fluoride concentration is a good indicator that the fluoride level can be managed through $Ca(OH)_2$ addition to the neutralizing solution.

Figure 4B:
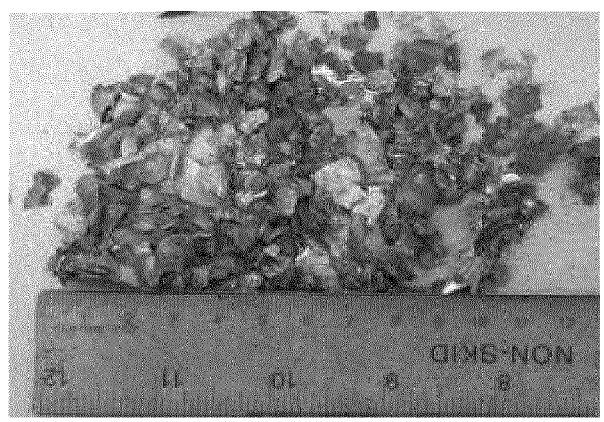
FIG. 4(b) is a picture of material after passing through 2nd stage wet shredding (Physical Validation Example; Fine Shredder mini-piloting).

As shown in FIG. 4(a), the battery material exiting the submerged shredder had an average particle size of approximately 40 mm with a single pass through the shredder, which is representative of the expected output from the second submergible comminuting device in accordance with an embodiment of the present application. A fraction of the battery material exited the shredder as a layered battery material having unliberated lithium-ion battery internals consisting of multiple layers of cathode, cathode foil, separator, anode, and anode foil attached to the steel casing exterior. The shredded battery material was separated into large, small, and fine particle size fractions, the large particle size fraction comprising the layered battery material shown in FIG. 4(a). The layered battery material as shown in FIG. 4(a) was then shredded in the shredder a second time, which liberated the layered lithium-ion battery internals to yield particles having an average size of approximately 8 mm or less as shown in FIG. 4(b).

Figure 4C:
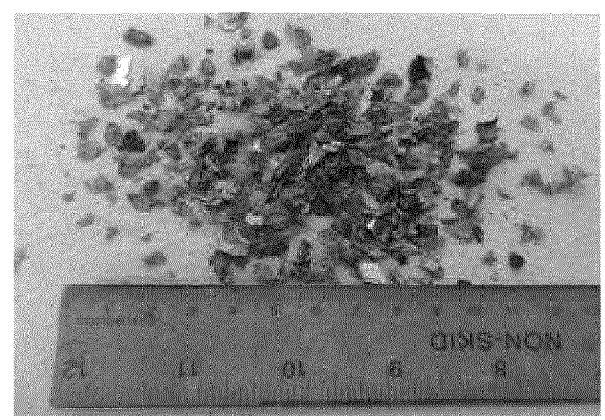
FIG. 4(c) is a picture of material after passing through granulator (Physical Validation Example; Dry Shredder mini-piloting).
Figure 4D:
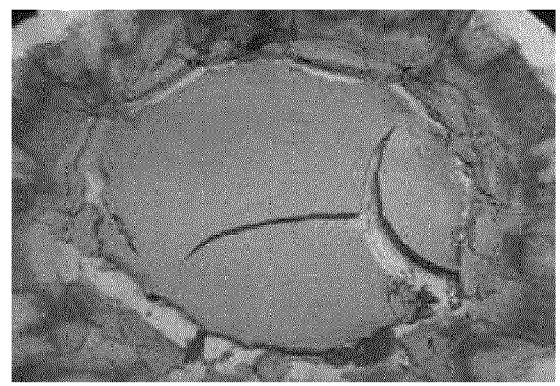
FIG. 4(d) is a picture of fine particle material isolated following $1^{st}$ stage wet shredding after passing through a wire mesh screen with 500 μm openings and subsequent filtration.

The combined small particle size fraction (from original separation and resulting from shredding of large particle size fraction) was granulated in a dry granulator (Econogrind unit), which yielded a battery material having a further reduced average particle size as shown in FIG. 4(c). The fine particle material noted above was screened from the large and small particle fractions via a wire mesh screen with 500 μm openings which was then filtered as shown in FIG. 4(d). The fine particle material was kept to be combined with the black mass material prior to leaching.

While batteries were first immersed and discharged in a 10% NaCl solution, prior to comminution of the batteries in a solution of Ca(OH)$_2$, a person skilled in the art would understand that the same immersion liquid could be used both for discharging and comminuting. Other options for immersion liquids are outlined in the sections above.

TABLE 1

Potential forecast of small and large format spent Li-ion battery components, 2025 and 2030

| Component | Small Format Li-ion Battery Packs - e.g. LCO cathode chemistry wt % of total battery pack | | Large Format Li-ion Battery Packs - e.g. NMC, LFP, LMO, NCA cathode chemistry wt % of total battery pack | |
|---|---|---|---|---|
| | 2025 | 2030 | 2025 | 2030 |
| Steel | — | — | 1.4% | 1.4% |
| Plastic - e.g. PP, PE, PET, PVDF | 23.9% | 23.9% | 6.0% | 6.0% |
| Electrical Components | 0.1% | 0.1% | 1.1% | 1.1% |
| Copper Cable | — | — | 1.1% | 1.1% |
| Cells and Enclosures | | | | |
| Aluminum - Cathode Foil, Module Casing | 3.0% | 3.0% | 19.0% | 19.0% |
| Copper - Anode Foil | 9.0% | 9.0% | 9.9% | 9.9% |
| Electrolyte | | | | |
| Lithium | 0.1% | 0.1% | 0.1% | 0.1% |
| Phosphorous | 0.3% | 0.3% | 0.4% | 0.4% |
| Fluorine | 1.0% | 1.0% | 1.3% | 1.3% |
| Organic (e.g. ethylene carbonate/ EC mixed with ethyl methyl carbonate/EMC) | 8.7% | 8.7% | 11.7% | 11.7% |
| Electrode Powder | | | | |
| Anode - Graphite | 26.0% | 26.0% | 15.0% | 15.0% |
| Cathode - blended forecast | | | | |
| Aluminum | — | — | 0.4% | 0.4% |
| Cobalt | 16.9% | 16.9% | 5.5% | 5.3% |
| Iron | — | — | 3.2% | 3.9% |
| Lithium | 2.0% | 2.0% | 1.2% | 1.2% |
| Manganese | — | — | 7.1% | 6.1% |
| Nickel | — | — | 5.5% | 5.3% |
| Oxygen | 9.2% | 9.2% | 8.3% | 8.6% |
| Phosphorous | — | — | 1.8% | 2.2% |
| TOTAL | 100% | 100% | 100% | 100% |

TABLE 2

Example design and IDEAS process simulation parameters for Phase 1 feed size reduction steps according to Processes 1 and 2

| Step | Parameter | Unit | Criteria | Source/Comment |
|---|---|---|---|---|
| Discharging of Large Format Batteries | Percent of full charge at receipt/ start of processing | % | 20% | Initial basis |
| | Discharged voltage of large format Li- ion batteries | V | 1.0-2.0 | Initial basis. To ensure safe size reduction downstream |

TABLE 2-continued

Example design and IDEAS process simulation parameters for Phase 1 feed size reduction steps according to Processes 1 and 2

| Step | Parameter | Unit | Criteria | Source/Comment |
|---|---|---|---|---|
| Crusher/ Shredder | Rotation Speed | rpm | 10-20 | |
| | Blade Type | — | Cross-cut angled blades | |
| | Immersion type | — | Make-up process water/brine | — |
| | Example maximum exit temperature of water | ° C. | 60 | Example maximum temperature for safe dismantling |
| | Water addition rate | $m^3$ water/$m^3$ feed Li-ion batteries | 2 | To fully immerse feed spent Li-ion batteries |
| Screening | Undersized fraction | mm | ≤10 | |
| | Oversized fraction | mm | ≤100 to ≥10 | |
| Filtration of undersize fraction from screening | Solids in filtrate | g/L | >2 | |
| | Filter cake discharge moisture | % w/w | 20% | |
| | Wash ratio | t/t solids | >0.5 | |
| | Wash water addition rate | t/h | Varied to achieve wash ratio | |
| | Overall wash efficiency | % | 98% | |
| Shredding | Inlet size fraction | mm | ≤100 to ≥10 | Oversize fraction from screening |
| | Rotation Speed | rpm | >50 | To ensure shredding to targeted size |
| | Exit size fraction | mm | ≤10 | |

TABLE 3

Example design and IDEAS process simulation parameters for Phase 2 magnetic separation and eddy current separation of Process 1

| Step | Parameter | Unit | Example Criteria |
|---|---|---|---|
| Rougher and optional Cleaner Magnetic Separator(s) | Type | — | Wet low intensity magnetic separator |
| | Mechanical availability | % | 98% |
| | Drum operating speed | rpm | <50 |
| | Separation type | — | Equipment supplier to recommend. Likely concurrent design, based on expected coarseness of the mag fraction |
| | Magnetic field intensity | | |
| | At drum surface | gauss | Equipment supplier to advise; likely ~1000 |
| | 50 mm from drum surface | gauss | Equipment supplier to advise; likely ~400 |
| | Drive type | — | Motor |
| Shredded Steel Dewatering Screen | Vibration type | — | Linear |
| | Vibration drive | — | Electric |
| | Shredded steel product moisture content | % | <1% |
| | Bed angle | — | ≤5 deg. to ≥5 deg. |
| Eddy Current Separation | Rotor type | — | Concentric rotor |
| | Feed size | mm | ≤10 |
| | Ferrous metal separation efficiency | % | >95% |
| | Non-ferrous metal recovery | % | >95% |
| | Inert stream recovery | % | >95% |
| Aluminum Dewatering Screen | Vibration type | — | Linear |
| | Vibration drive | — | Electric |
| | Shredded aluminum product moisture content | % | <1% |
| | Bed angle | — | ≤5 deg. to ≥5 deg. |

TABLE 4

Example design and IDEAS process simulation parameters for Phase 2 leaching, and CCD of Process 1.

| Step | Parameter | Unit | Example Criteria |
|---|---|---|---|
| Leaching | Acid (e.g., $H_2SO_4$) addition rate | $m^3$ | Stoichiometric + excess |
| | Excess acid (e.g., $H_2SO_4$) relative to stoichiometric amount | % | 10% |
| | Acid (e.g., $H_2SO_4$) reagent concentration | mol/L | 1-2 |
| | $H_2O_2$ addition rate | $m^3$ | Stoichiometric |
| | $H_2O_2$ reagent concentration | g/L | 20-30 |
| | Temperature Range | ° C. | 60-95 |
| | Pressure | kPa | Ambient |
| | Target pH | pH | Per stoichiometry, dependent on input cathode chemistry |

TABLE 4-continued

Example design and IDEAS process simulation parameters for Phase 2 leaching, and CCD of Process 1.

| Step | Parameter | Unit | Example Criteria |
|---|---|---|---|
| | Agitation type | — | High shear |
| | Residence/Leaching Time | min. | 120-180 |
| | Optional Oxygen Addition Rate | m3/hour | Stoichoimetric + excess |
| Screen | Undersize fraction | mm | ≤5 |
| | Oversize fraction | mm | ≥5 |
| Countercurrent Decantation | Wash ratio | t process water/t leached slurry | 2 |
| | Soluble losses | % | 1% |
| | Temperature | °C. | Per inlet leached product and heat transfer over CCD train |
| | Pressure | kPa | Ambient |
| | Target pH | — | Per inlet leached product, combined with wash water |
| | Final underflow suspended solids concentration | % w/w | ~30% |
| | Thickener type | — | High density thickener |

Table 5 delineates reaction chemistry for the Phase 2 leaching step per the IDEAS process simulation parameters of Process 1 and Process 2.

| Metal Source | Leaching Reaction Chemistry | Category | Possible Extent of Reaction[1] | Extent of Reaction Source |
|---|---|---|---|---|
| NMC cathode | $6LiNi_{1/3}Mn_{1/3}Co_{1/3}O_{2(s)} + 9H_2SO_{4(aq)} + H_2O_{2(aq)} \rightarrow 2MnSO_{4(aq)} + 2NiSO_{4(aq)} + 2CoSO_{4(aq)} + 3Li_2SO_{4(aq)} + 2O_{2(g)} + 10H_2O_{(l)}$ | Targeted | 95% | (Wang, Vest, & Friedrich, 2011)[3] |
| LCO cathode | $2LiCoO_{2(s)} + 3H_2SO_{4(aq)} + H_2O_{2(aq)} \rightarrow Li_2SO_{4(aq)} + 2CoSO_{4(aq)} + O_{2(g)} + 4H_2O_{(l)}$ | Targeted | 95% | (Wang, Vest, & Friedrich, 2011)[3] |
| LFP cathode[2] | $2LiFePO_{4(s)} + 4H_2SO_{4(aq)} + H_2O_{2(aq)} \rightarrow Li_2SO_{4(aq)} + Fe_2(SO_4)_{3(aq)} + 2H_3PO_{4(aq)} + 2H_2O_{(l)}$ | Targeted | 5% | (Wang, Vest, & Friedrich, 2011; Zou, 2012)[2], [3] |
| LMO cathode | $2LiMn_2O_{4(s)} + 5H_2SO_{4(aq)} + H_2O_{2(aq)} \rightarrow Li_2SO_{4(aq)} + 4MnSO_{4(aq)} + 2O_{2(g)} + 6H_2O_{(l)}$ | Targeted | 98% | (Wang, Vest, & Friedrich, 2011)[3] |
| NCA cathode | $40LiNi_{0.8}Co_{0.15}Al_{0.05}O_{2(s)} + 61H_2SO_{4(aq)} + H_2O_{2(aq)} \rightarrow 20Li_2SO_{4(aq)} + 32NiSO_{4(aq)} + 6CoSO_{4(aq)} + Al_2(SO4)_{3(aq)} + 10O_{2(g)} + 62H_2O_{(l)}$ | Targeted | 95% | (Wang, Vest, & Friedrich, 2011)[3] |
| $Cu^0$, residual copperfoil and cable | $Cu^0_{(s)} + H_2SO_{4(aq)} + H_2O_{2(aq)} \rightarrow CuSO_{4(aq)} + 2H_2O_{(l)}$ | Targeted | 50%-95% | (Wang, Vest, & Friedrich, 2011)[3] |
| $Al^0$, residual aluminum foil and casing | $2Al^0_{(s)} + 3H_2SO_{4(aq)} + 3H_2O_{2(aq)} \rightarrow Al_2(SO_4)_{3(aq)} + 6H_2O_{(l)}$ | Side | 60%-95% | (Wang, Vest, & Friedrich, 2011)[3] |
| $LiPF_6$, electrolyte salt | $2LiPF_{6(aq)} + H_2SO_{4(aq)} + H_2O_{2(aq)} \rightarrow Li_2SO_{4(aq)} + 2HPF_{6(aq)} + H_2O_{(l)} + \frac{1}{2}O_{2(g)}$ | Targeted | 95% | (Wang, Vest, & Friedrich, 2011)[3] |
| | $LiPF_{6(aq)} + H_2O_{(l)} \rightarrow HF_{(aq)} + PF_{5(aq)} + LiOH_{(aq)}$ | Side | 60% | (Xu, 2004)[4] |

Note

[1] Extents of reaction are based on IDEAS simulation model and literature extraction rates for metal oxides leached using sulfuric acid and hydrogen peroxide, per the operating parameters in Table 4.
[2] H. Zou, Development of a Recycling Process, April 2012, Page 44 and IDEAS process simulation results, it is likely that minimal LiFePO4 will be dissolved into solution due to the high bond energy between Fe and 0,
[3] H. Wang, M. Vest, B. Friedrich, Proceedings of EMC 2011, 2011, Vol. 1, Pages 1-16.
[4] Z. Xu, Procedia Environmental Sciences, 2012, Vol 16, Pages 443-450.

TABLE 6

Example design and IDEAS process simulation parameters for Phase 2 intermediate product preparation of Process 1

| Step | Parameter | Unit | Example Criteria |
|---|---|---|---|
| Agglomeration Tank | Flocculant type | — | Hydrophobic |
| Rougher Flotation | Graphite recovery in rougher froth | % w/w of influent | >80% |
| | Organic recovery in rougher froth | % w/w of influent | >80% |
| | Soluble metal losses to froth | % w/w of influent | <2% |
| | Agitator type | — | Aerating, open flow |
| | Cell type | — | Conventional flotation |
| Cleaner Flotation | Graphite recovery in rougher froth | % w/w of influent | >80% |
| | Organic recovery in rougher froth | % w/w of influent | >80% |
| | Soluble metal losses to froth | % w/w of influent | <2% |
| | Agitator type | — | Aerating, open flow |
| | Cell type | — | Conventional flotation |

TABLE 6-continued

Example design and IDEAS process simulation parameters for Phase 2 intermediate product preparation of Process 1

| Step | Parameter | Unit | Example Criteria |
|---|---|---|---|
| Solid-liquid separation, e.g. centrifugation of cleaner froth | Solids in centrate | g/L | 0 |
| | Centrifuge cake solids content | % w/w | >95% |
| | Centrifuge wash ratio | t/t cake solid | 1 |
| | Number of wash stages | — | 1 |
| | Temperature of centrifuge wash water | °C. | 20 |
| | Wash water addition rate | t/h | Varied to achieve wash ratio |
| Dual Media Filtration | First media type | — | Anthracite |
| | Second media type | — | Garnet |
| | Outlet organic content in PLS | ppm | >2 |
| | Outlet suspended solids size in PLS | μm | >10 |
| Optional - Activated Carbon Filtration | Organic adsorption efficiency | % | >95% |
| | Operating Temperature | °C. | 20 |

TABLE 7

Example design parameters for Phase 3 final product preparation of Process 1

| Step | Parameter | Unit | Example Criteria |
|---|---|---|---|
| Solid-liquid filtration of copper concentrate | Solids in filtrate | g/L | <0.5 |
| | Filter cake discharge moisture | % w/w | <10% |
| | Wash ratio | t/t solids | 0.6 |
| | Wash water addition rate | t/h | Varied to achieve wash ratio |
| | Overall wash efficiency | % | 98% |
| Copper Ion Exchange (IX) | Influent PLS copper concentration | g/L | <1 |
| | Cu Extraction Efficiency | % | >95% |
| | Operating Temperature | °C. | 20-40 |
| | Example resin type | — | LEWATIT ® M + TP 207 |
| | Resin description | — | Weakly acidic, macroporous cation |
| | Regenerant | — | 10 wt % $H_2SO_4$ |
| | Regenerant rate | $(m^3/h)/m^2$ | 5 |
| | Conditioner, as required | — | 4 wt % NaOH |
| | Conditioner rate, as required | $(m^3/h)/m^2$ | 5 |
| Copper electrowinning - e.g. emew ® | Copper IX eluate Cu content ('copper loaded liquor') | g/L | ~10 |
| | Conversion of inlet $Cu_{(aq)}$ eluate content to $Cu_{(s)}$ | % | >85% |
| | Current density | $A/m^2$ | 250 |
| | Current efficiency | % | 90% |
| | Copper plate product purity | % | 99.9% |

TABLE 7-continued

Example design parameters for Phase 3 final product preparation of Process 1

| Step | Parameter | Unit | Example Criteria |
|---|---|---|---|
| Co, Ni, and/or Mn Hydroxide Precipitation | Hydroxide (e.g., NaOH) addition rate per batch | L | Stoichiometric |
| | Hydroxide (e.g., NaOH) concentration | mol/L | 1 |
| | Temperature | ° C. | 40 |
| | Pressure | kPa | Ambient |
| | Target pH | pH | >10 |
| | Residence Time | min. | 60 |
| Co, Ni, and/or Mn Hydroxide Solid-Liquid Separation | Solids in filtrate | g/L | <0.5 |
| | Filter cake discharge moisture | % w/w | 5% |
| | Wash ratio | t/t solids | 0.6 |
| | Wash water addition rate | t/h | Varied to achieve wash ratio |
| | Overall wash efficiency | % | 98% |
| Crude Lithium Carbonate Precipitation | Lithium carbonate concentration in mother liquor | g/100 g water | 2.5 |
| | Soda ash addition rate | — | Stoichiometric + excess |
| | Soda ash purity | % w/w | >98.5% |
| | Excess soda ash | — | 10% |
| | Temperature | ° C. | 90 |
| Crude Lithium Carbonate Solid-Liquid Separation, E.g. centrifugation | Solids in centrate | g/L | 0 |
| | Centrifuge cake solids content | % w/w | 87% |
| | Centrifuge wash ratio | t/t cake solid | 1 |
| | Number of wash stages | — | 1 |
| | Wash efficiency | % | 90% |
| | Temperature of centrifuge wash water | ° C. | 90 |
| | Wash water addition rate | t/h | Varied to achieve wash ratio |
| | Centrifuge type | — | Peeler |
| Lithium Carbonate Digestion | Recycle liquor addition rate | t/h | Varied to achieve Li concentration in digestion discharge |
| | Lithium concentration in digestion discharge | g Li/L | ~6.8 |
| | Carbon dioxide makeup flow rate | t/h | Varied based on utilization and stoichiometry |
| | Carbon dioxide solubility | g/L water | 0.9 |
| | Carbon dioxide utilization (overall) | % | 95 |
| | Digestion temperature | ° C. | 35 |
| Impurity Ion Exchange (IX) | Targeted trace impurities | — | Calcium and magnesium |
| | Ca and Mg extraction efficiency | % | <90% |
| | Operating Temperature | ° C. | <80 |
| | Target pH | — | 3-4.5 |
| | Example resin type | — | Dow Amberlite ® IRC747 |
| | Resin description | — | Macroporous cation |
| | Regenerant | — | 1-2N HCl |
| | Regenerant addition rate | — | Stoichiometric |
| | Reagent for conversion to $Na^+$ form | — | 1-2N NaOH |
| | Reagent for conversion to $Na^+$ form addition rate | — | Stoichiometric |

TABLE 7-continued

Example design parameters for Phase 3 final product preparation of Process 1

| Step | Parameter | Unit | Example Criteria |
|---|---|---|---|
| Pure Lithium Carbonate Crystallization | Lithium carbonate concentration in inlet liquor | g/100 g water | 0.75 |
| | Carbon dioxide solubility | g/L water | 0.5 |
| | Steam addition rate (direct steam injection) | t/h | Varied to achieve design temperature |
| | Crystallization temperature | °C. | 95 |
| Pure Lithium Carbonate Centrifugation | Solids in centrate | g/L | 0 |
| | Centrifuge cake solids content | % w/w | 87% |
| | Centrifuge wash ratio | t/t cake solid | 1 |
| | Number of wash stages | — | 1 |
| | Wash efficiency | % | 90% |
| | Temperature of centrifuge wash water | °C. | 90 |
| | Wash water addition rate | t/h | Varied to achieve wash ratio |
| | Centrifuge type | — | Peeler |
| Lithium Carbonate Drying and Cooling | Natural Gas addition rate | t/h | Varied to achieve discharge temp. |
| | Combustion air addition rate | t/h | Varied to target combustion gas $O_2$ |
| | Oxygen content in off-gas | % v/v | 3 |
| | Dilution air addition rate | t/h | Varied to target off-gas solids |
| | Dryer discharge solids moisture | % w/w | 0 |
| | Drier type | — | Flash drier |
| | Cooled product temperature | °C. | 40 |
| | Flash dryer discharge temperature | °C. | 120 |
| Sodium Sulfate Crystallization | Sulfuric acid addition rate | t $H_2SO_4$/ t feed | Stoichiometric + excess |
| | Excess $H_2SO_4$ relative to stoichiometry | % | 10% |
| | Sodium sulfate in crude LC centrate | % w/w | ~6% |
| | Solids in crystallizer slurry discharge | % w/w | 25% |
| | Operating pressure | kPa | 0.85-1 |
| | Operating temperature | °C. | 6-7 |
| | Crystallizer type | — | Draft tube with barometric leg |
| Sodium Sulfate Solid-Liquid Separation, e.g. centrifugation | Solids loss to centrate (% of feed solids) | % | 2% |
| | Centrifuge cake moisture content | % w/w | 2% |
| | Centrifuge wash ratio | t/t cake solid | 0.05 |
| | Number of wash stages | — | 1 |
| | Wash efficiency | % | 95% |
| | Wash water addition rate | t/h | Varied to achieve wash ratio |
| | Centrifuge type | — | Pusher |
| Sodium Sulfate Drying | Natural Gas addition rate | t/h | Varied to achieve discharge temp. |
| | Combustion air addition rate | t/h | Varied to target combustion gas $O_2$ |
| | Oxygen content in off-gas | % v/v | 3 |
| | Dilution air addition rate | t/h | Varied to target off-gas solids |
| | Dryer discharge solids moisture | % w/w | 0 |
| | Drier type | — | Flash drier |
| | Cooled product temperature | °C. | 40 |
| | Flash dryer discharge temperature | °C. | 120 |

TABLE 8

Reaction chemistry for Phase 3 final product preparation, per IDEAS process simulation of Process 1

| Step | Reaction Chemistry | Category | Possible Extent of Reaction[1] | Standard Electrode Potential (V) |
|---|---|---|---|---|
| Copper Ion Exchange | $2Na\text{-}R\text{-}C_4H_7NO_{4(s)} + CuSO_{4(aq)} \rightarrow Cu(Na\text{-}R\text{-}C_4H_6NO_4^-)_{2(aq)} + H_2SO_{4(aq)}$ | Targeted | >95% | — |
| | $2Na\text{-}R\text{-}C_4H_7NO_{4(s)} + CuSO_{4(aq)} \rightarrow Cu(R\text{-}C_4H_7NO_4^-)_{2(aq)} + Na_2SO_{4(aq)}$ | Side | 10% | — |
| | $Cu(R\text{-}C_4H_7NO_4^-)_{2(aq)} + 2HCl_{(aq)} \rightarrow Cu^{2+}_{(aq)} + 2Cl^-_{(aq)} + 2Na\text{-}R\text{-}C_4H_7NO_{4(s)}$ | Regeneration | 100% | — |
| | $Cu(R\text{-}C_4H_7NO_4^-)_{2(aq)} + 2NaOH_{(aq)} \rightarrow Cu^{2+}_{(aq)} + 2OH^-_{(aq)} + 2Na\text{-}R\text{-}C_4H_7NO_{4(s)}$ | Conditioning | 100% | — |
| Copper Electrowinning (e.g. emew ®) | $Cu^{2+}_{(aq)} + 2e^- \rightarrow Cu_{(s)}$ | Cathode | 100% | $E° = 0.34$ |
| | $H_2O_{(l)} \rightarrow 2H^+_{(aq)} + \frac{1}{2}O_{2(g)} + 2e^-$ | Anode | 100% | $E° = -1.23$ |
| | $Cu^{2+}_{(aq)} + H_2O \rightarrow 2H^+_{(aq)} + \frac{1}{2}O_{2(g)} + Cu_{(s)}$ | Overall | 100% | $E° = 0.89$ |
| Co, Ni, and/or Mn Product, e.g. Hydroxide Precipitation | $CoSO_{4(aq)} + 2NaOH_{(aq)} \rightarrow Co(OH)_{2(s)} + Na_2SO_{4(aq)}$ | Targeted | 100% | — |
| | $NiSO_{4(aq)} + 2NaOH_{(aq)} \rightarrow Ni(OH)_{2(s)} + Na_2SO_{4(aq)}$ | Targeted | 100% | — |
| | $MnSO_{4(aq)} + 2NaOH_{(aq)} \rightarrow Mn(OH)_{2(s)} + Na_2SO_{4(aq)}$ | Targeted | 100% | — |
| | $Li_2SO_{4(aq)} + 2NaOH_{(aq)} \rightarrow LiOH_{(aq)} + Na_2SO_{4(aq)}$ | Side | 0-5% | — |
| Lithium Carbonate Precipitation | $Li_2SO_{4(aq)} + Na_2CO_{3(s)} \rightarrow Na_2SO_{4(aq)} + Li_2CO_{3(s)}$ | Targeted | 100% | — |
| Lithium Carbonate Digestion | $Li_2CO_{3(s)} + H_2O_{(l)} + CO_{2(g)} \rightarrow 2LiHCO_{3(aq)}$ | Targeted | 100% | — |
| Impurity Ion Exchange (IX) | $R\text{-}CH_2\text{—}NH\text{—}CH_2\text{—}PO_3Na_{2(s)} + M^{2+}_{(aq)} \rightarrow R\text{-}CH_2\text{—}NH\text{—}CH_2\text{—}PO_3M_{(aq)} + 2Na^+_{(aq)}$ | Targeted | >95% | — |
| | $R\text{-}CH_2\text{—}NH\text{—}CH_2\text{—}PO_3M_{(aq)} + 2HCl_{(aq)} \rightarrow M^{2+}_{(aq)} + 2Cl^-_{(aq)} + R\text{-}CH_2\text{—}NH\text{—}CH_2\text{—}PO_3H_{2(s)}$ | Regeneration | 100% | — |
| | $R\text{-}CH_2\text{—}NH\text{—}CH_2\text{—}PO_3H_{2(s)} + 2NaOH_{(aq)} \rightarrow R\text{-}CH_2\text{—}NH\text{—}CH_2\text{—}PO_3Na_{2(s)} + 2H_2O_{(l)}$ | Conversion to Na⁺ form | 100% | — |
| Pure Lithium Carbonate Precipitation | $2LiHCO_{3(aq)} \rightarrow Li_2CO_{3(s)} + CO_{2(g)} + H_2O_{(l)}$ | Targeted | 100% | — |
| Lithium Carbonate Drying and Cooling | $H_2O_{(l)} \rightarrow H_2O_{(g)}$ | Targeted | 100% | — |
| | $Na_2SO_{4(aq)} \rightarrow Na_2SO_{4(s)}$ | Side | 100% | — |
| | $Na_2CO_{3(aq)} \rightarrow Na_2CO_{3(s)}$ | Side | 100% | — |
| Sodium Sulfate Crystallization | $Na_2SO_{4(aq)} + 10H_2O_{(l)} \rightarrow Na_2SO_4 \cdot 10H_2O_{(s)}$ | Targeted | 100% | — |
| | $Na_2CO_{3(aq)} + H_2SO_{4(aq)} \rightarrow Na_2SO_{4(aq)} + H_2O_{(l)} + CO_{2(g)}$ | Targeted | 100% | — |
| | $Li_2CO_{3(aq)} + H_2SO_{4(aq)} \rightarrow Li_2SO_{4(aq)} + H_2O_{(l)} + CO_{2(g)}$ | Targeted | 100% | — |
| | $Li_2CO_{3(s)} + H_2SO_{4(aq)} \rightarrow Li_2SO_{4(aq)} + H_2O_{(l)} + CO_{2(g)}$ | Targeted | 100% | — |
| Sodium Sulfate Drying | $Na_2SO_4 \cdot 10H_2O_{(s)} \rightarrow Na_2SO_{4(aq)} + 10H_2O_{(l)}$ | Targeted | 100% | — |
| | $Na_2SO_{4(aq)} \rightarrow Na_2SO_{4(s)}$ | Targeted | 100% | |
| | $H_2O_{(l)} \rightarrow H_2O_{(g)}$ | Targeted | 100% | — |

TABLE 9

Example design and IDEAS process simulation parameters for Phase 2 magnetic separation stripping, and optional densimetric separation of Process 2

| Step | Parameter | Unit | Example Criteria |
|---|---|---|---|
| Rougher and optional Cleaner Magnetic Separator(s) | Type | — | Wet/dry low intensity magnetic separator |
| | Mechanical availability | % | 98% |
| | Drum operating speed | rpm | <50 |
| | Separation type | — | Equipment supplier to recommend. Likely concurrent design, based on expected coarseness of the mag fraction |
| | Magnetic field intensity | — | Equipment supplier to recommend |
| | At drum surface | gauss | Equipment supplier to advise; likely ~1000 |
| | 50 mm from drum surface | gauss | Equipment supplier to advise; likely ~400 |
| | Drive type | — | Motor |
| Shredded Steel Dewatering Screen | Vibration type | — | Linear |
| | Vibration drive | — | Electric |
| | Shredded steel product moisture content | % | <1% |
| | Bed angle | — | ≤5 deg. to ≥5 deg. |
| Stripping | Solvent type | — | n-methyl-2-pyrrolidone (NMP), dimethylformamide (DMF), ethyl acetate (EtOAc), isopropanol (IPA), acetone, dimethyl sulfoxide (DMSO), or diethylformamide (DEF). |
| | Solvent addition rate | $m^3$ solvent/t influent solids | 1 |
| Densimetric Separation (Optional) | Separation Efficiency | % | >95% |
| Shredded Cu/Al/Plastics Dewatering Screen | Vibrational type | — | Linear |
| | Vibration drive | — | Electric |
| | Shredded steel product moisture content | % | <10% |
| | Bed angle | — | −5 deg. to +5 deg. |
| Distillation | Distillation type | — | Vacuum |

TABLE 10

Example design and IDEAS process simulation parameters for Phase 2 leaching of Process 2.

| Step | Parameter | Unit | Example Criteria |
|---|---|---|---|
| Leaching | Acid (e.g., $H_2SO_4$) addition rate | $m^3$ | Stoichiometric + excess |
| | Excess acid (e.g., $H_2SO_4$) relative to stoichiometric amount | % | 10% |
| | Acid (e.g., $H_2SO_4$) reagent concentration | mol/L | 0.5-2 0.5 |
| | $H_2O_2$ addition rate | $m^3$ | Stoichiometric |
| | $H_2O_2$ reagent concentration | g/100 g of feed | 20-30 |
| | Temperature Range | ° C. | 60-95 80 |
| | Pressure | kPa | Ambient |
| | Target pH | pH | Per stoichiometry, dependent on input cathode chemistry 2.5 |
| | Agitation type | — | High shear |
| | Residence/Leaching Time | min. | 120-180 360 |
| | Optional Oxygen Addition Rate | m3/hour | Stoichiometric + excess |
| | Outlet Sulphate Concentration | g/L | 100 |
| | Pulp Density | % | 10-30 10 |
| | Number of Tanks | — | 3 1 |

TABLE 11

Example design and IDEAS process simulation parameters for Phase 2 intermediate product preparation of Process 2

| Step | Parameter | Unit | Example Criteria |
|---|---|---|---|
| Rougher Flotation | Graphite recovery in rougher froth | % w/w of influent | >80% |
| | Organic recovery in rougher froth | % w/w of influent | >80% |
| | Soluble metal losses to froth | % w/w of influent | <2% |
| | Agitator type | — | Aerating, open flow |
| | Cell type | — | Conventional flotation |
| Cleaner Flotation | Graphite recovery in rougher froth | % w/w of influent | >80% |
| | Organic recovery in rougher froth | % w/w of influent | >80% |
| | Soluble metal losses to froth | % w/w of influent | <2% |
| | Agitator type | — | Aerating, open flow |
| | Cell type | — | Conventional flotation |
| Solid-liquid separation, e.g. centrifugation of cleaner froth | Solids in centrate | g/L | 0 |
| | Centrifuge cake solids content | % w/w | >95% |
| | Centrifuge wash ratio | t/t cake solid | 1 |
| | Number of wash stages | — | 1 |
| | Temperature of centrifuge wash water | °C. | 20 |
| | Wash water addition rate | t/h | Varied to achieve wash ratio |
| Dual Media Filtration | First media type | — | Anthracite |
| | Second media type | — | Garnet |
| | Outlet organic content in PLS | ppm | >2 |
| | Outlet suspended solids size in PLS | μm | >10 |
| Belt Filtration (Optional) | Solids in filtrate | g/L | >2 |
| | Filter cake discharge moisture | % w/w | 20% |
| | Wash ratio | t/t solids | >0.5 |
| | Wash water addition rate | t/h | Varied to achieve wash ratio |
| | Overall wash efficiency | % | 98% |
| Activated Carbon Filtration (Optional) | Organic adsorption efficiency | % | >95% |
| | Operating Temperature | °C. | 20 |

TABLE 12

Example design parameters for Phase 3 final product preparation of Process 2

| Step | Parameter | Unit | Example Criteria |
|---|---|---|---|
| Copper Ion Exchange (IX) | Influent PLS copper concentration | g/L | <1 0.8255 |
| | Cu Extraction Efficiency | % | >95% |
| | Operating Temperature | °C. | 20-40 |
| | Example resin type | — | DOWEX M4195 IX |
| | Resin description | — | Chelating, weak base |
| | Regenerant | — | 10 wt % $H_2SO_4$ |
| | Regenerant rate | $(m^3/h)/m^2$ | 5 |
| | Conditioner, as required | — | 4 wt % NaOH |
| | Conditioner rate, as required | $(m^3/h)/m^2$ | 5 |
| Copper Solvent Extraction (Optional) | Influent PLS copper concentration | g/L | >1 2.0925 |
| | Cu Extraction Efficiency | % | >95% |
| | Example extraction reagent | — | LIX 984N |
| | Example stripping reagent | — | $H_2SO_4$ |
| Copper electrowinning - e.g. emew ® | Copper IX eluate Cu content ('copper loaded liquor') | g/L | ~10 |
| | Conversion of inlet $CU_{(aq)}$ eluate content to $CU_{(s)}$ | % | >85% |
| | Current density | A/m² | 250 |
| | Current efficiency | % | 90% |
| | Copper plate product purity | % | 99.9% |
| Aluminum-Iron hydroxide precipitation | NaOH addition rate per batch | L | Stoichiometric |
| | NaOH concentration | mol/L | 0.25 |
| | | wt % | 50 |
| | Temperature Range | °C. | 25-40 |
| | Pressure | kPa | Ambient |
| | Target pH | pH | 3-5 4.5 |

TABLE 12-continued

Example design parameters for Phase 3 final product preparation of Process 2

| Step | Parameter | Unit | Example Criteria |
|---|---|---|---|
| Aluminum-Iron precipitate solid liquid separation | Filter cake discharge moisture | % w/w | 0.5 |
| | Wash ratio | t/t solids | 0.6 |
| | Wash water addition rate | t/h | Varied to achieve wash ratio |
| | Overall wash efficiency | % | 98 |
| Co, Ni, and/or Mn Hydroxide Precipitation | Hydroxide (e.g., NaOH) addition rate per batch | L | Stoichiometric |
| | Hydroxide (e.g., NaOH) concentration | mol/L | 1 |
| | | wt % | 50 |
| | Temperature Range | ° C. | 40-60 |
| | Pressure | kPa | Ambient |
| | Target pH | pH | 8-10 9.5 |
| | Residence Time | min. | 60 |
| Co, Ni, and/or Mn Hydroxide Solid-Liquid Separation | Solids in filtrate | g/L | <0.5 |
| | Filter cake discharge moisture | % w/w | 5% |
| | Wash ratio | t/t solids | 0.6 |
| | Wash water addition rate | t/h | Varied to achieve wash ratio |
| | Overall wash efficiency | % | 98% |
| Sodium Sulfate Crystallization | Sulfuric acid addition rate | t $H_2SO_4$/ t feed | Stoichiometric + excess |
| | Excess $H_2SO_4$ relative to stoichiometry | % | 10% |
| | Sodium sulfate concentration in PLS | g/100 g water | 40-45 43.2 |
| | Solids in crystallizer slurry discharge | % w/w | 25% |
| | Operating pressure | kPa | 0.85-1 |
| | Operating temperature | ° C. | 100 95 |
| | Crystallizer type | — | Draft tube with barometric leg |
| Sodium Sulfate Solid-Liquid Separation, e.g. centrifugation | Solids loss to centrate (% of feed solids) | % | 2% |
| | Centrifuge cake moisture content | % w/w | 2% |
| | Centrifuge wash ratio | t/t cake solid | 0.05 |
| | Number of wash stages | — | 1 |
| | Wash efficiency | % | 95% |
| | Wash water addition rate | t/h | Varied to achieve wash ratio |
| | Centrifuge type | — | Peeler |
| Sodium Sulfate Drying | Natural Gas addition rate | t/h | Varied to achieve discharge temp. |
| | Combustion air addition rate | t/h | Varied to target combustion gas 02 |
| | Oxygen content in off-gas | % v/v | 3 |
| | Dilution air addition rate | t/h | Varied to target off-gas solids |
| | Dryer discharge solids moisture | % w/w | 0 |
| | Drier type | — | Flash drier |
| | Cooled product temperature | ° C. | 40 |
| | Flash dryer discharge temperature | ° C. | 120 |
| Crude Lithium Carbonate Precipitation | Lithium sulphate concentration in PLS | g/L | 200 174 |
| | Soda ash addition rate | — | Stoichiometric + excess |
| | Soda ash purity | % w/w | ≥98.5% 98.5% |
| | Excess soda ash | — | 10% 25% |
| | Temperature | ° C. | 90 90 |

TABLE 12-continued

Example design parameters for Phase 3 final product preparation of Process 2

| Step | Parameter | Unit | Example Criteria |
|---|---|---|---|
| Crude Lithium Carbonate Solid-Liquid Separation, E.g. centrifugation | Solids in centrate | g/L | 0 |
| | Centrifuge cake solids content | % w/w | 87% |
| | Centrifuge wash ratio | t/t cake solid | 1 |
| | Number of wash stages | — | 1 |
| | Wash efficiency | % | 90% |
| | Temperature of centrifuge wash water | ° C. | 90 |
| | Wash water addition rate | t/h | Varied to achieve wash ratio |
| | Centrifuge type | — | Peeler |
| Lithium Carbonate Digestion | Recycle liquor addition rate | t/h | Varied to achieve Li concentration in digestion discharge |
| | Lithium concentration in digestion discharge | g Li/L | ~6.8 |
| | Carbon dioxide makeup flow rate | t/h | Varied based on utilization and stoichiometry |
| | Carbon dioxide solubility | g/L water | 0.9 |
| | Carbon dioxide utilization (overall) | % | 95 |
| | Digestion temperature | ° C. | 35 |
| Impurity Ion Exchange (IX) | Targeted trace impurities | — | Calcium and magnesium |
| | Ca and Mg extraction efficiency | % | <90% |
| | Operating Temperature | ° C. | <80 |
| | Target pH | — | 3-4.5 |
| | Example resin type | — | Dow Amberlite ® IRC747 |
| | Resin description | — | Macroporous cation |
| | Regenerant | — | 1-2N HCl |
| | Regenerant addition rate | — | Stoichiometric |
| | Reagent for conversion to Na+ form | — | 1-2N NaOH |
| | Reagent for conversion to Na+ form addition rate | — | Stoichiometric |
| Pure Lithium Carbonate Crystallization | Lithium carbonate concentration in inlet liquor | g/100 g water | 0.75 |
| | Carbon dioxide solubility | g/L water | 0.5 |
| | Steam addition rate (direct steam injection) | t/h | Varied to achieve design temperature |
| | Crystallization temperature | ° C. | 95 |
| Pure Lithium Carbonate Centrifugation | Solids in centrate | g/L | 0 |
| | Centrifuge cake solids content | % w/w | 87% |
| | Centrifuge wash ratio | t/t cake solid | 1 |
| | Number of wash stages | — | 1 |
| | Wash efficiency | % | 90% |
| | Temperature of centrifuge wash water | ° C. | 90 |
| | Wash water addition rate | t/h | Varied to achieve wash ratio |
| | Centrifuge type | — | Peeler |
| Lithium Carbonate Drying and Cooling | Natural Gas addition rate | t/h | Varied to achieve discharge temp. |
| | Combustion air addition rate | t/h | Varied to target combustion gas O2 |
| | Oxygen content in off-gas | % v/v | 3 |
| | Dilution air addition rate | t/h | Varied to target off-gas solids |
| | Dryer discharge solids moisture | % w/w | 0 |
| | Drier type | — | Flash drier |
| | Cooled product temperature | ° C. | 40 |
| | Flash dryer discharge temperature | ° C. | 120 |

TABLE 13

Reaction chemistry for Phase 3 final product preparation of Process 2, per IDEAS process simulation

| Step | Reaction Chemistry | Category | Possible Extent of Reaction[1] | Standard Electrode Potential (V) |
|---|---|---|---|---|
| Copper Ion Exchange | $2Na\text{-}R\text{-}C_4H_7NO_{4(s)} + CuSO_{4(aq)} \rightarrow Cu(Na\text{-}R\text{-}C_4H_6NO_4^-)_{2(aq)} + H_2SO_{4(aq)}$ | Targeted | >95% | — |
| | $2Na\text{-}R\text{-}C_4H_7NO_{4(s)} + CuSO_{4(aq)} \rightarrow Cu(R\text{-}C_4H_7NO_4^-)_{2(aq)} + Na_2SO_{4(aq)}$ | Side | 10% | — |
| | $Cu(R\text{-}C_4H_7NO_4^-)_{2(aq)} + 2HCl_{(aq)} \rightarrow Cu^{2+}_{(aq)} + 2Cl^-_{(aq)} + 2Na\text{-}R\text{-}C_4H_7NO_{4(s)}$ | Regeneration | 100% | — |
| | $Cu(R\text{-}C_4H_7NO_4^-)_{2(aq)} + 2NaOH_{(aq)} \rightarrow Cu^{2+}_{(aq)} + 2OH^-_{(aq)} + 2Na\text{-}R\text{-}C_4H_7NO_{4(s)}$ | Conditioning | 100% | — |
| Copper Solvent Extraction (Optional) | $CuSO_{4(aq)} + 2HR_{(org)} \rightarrow CuR_{2(org)} + H_2SO_{4(aq)}$ | Extraction | >95% | — |
| | $CuR_{2(org)} + H_2SO_{4(aq)} \rightarrow CuSO_{4(aq)} + 2HR_{(org)}$ | Stripping | >95% | — |
| Copper Electrowinning (e.g. emew ®) | $Cu^{2+}_{(aq)} + 2e^- \rightarrow Cu_{(s)}$ | Cathode | 100% | E° = 0.34 |
| | $H_2O_{(l)} \rightarrow 2H^+_{(aq)} + \tfrac{1}{2}O_{2(g)} + 2e^-$ | Anode | 100% | E° = −1.23 |
| | $Cu^{2+}_{(aq)} + H_2O \rightarrow 2H^+_{(aq)} + \tfrac{1}{2}O_{2(g)} + Cu_{(s)}$ | Overall | 100% | E° = 0.89 |
| Co, Ni, and/or Mn Product, e.g. Hydroxide Precipitation | $CoSO_{4(aq)} + 2NaOH_{(aq)} \rightarrow Co(OH)_{2(s)} + Na_2SO_{4(aq)}$ | Targeted | 100% | — |
| | $NiSO_{4(aq)} + 2NaOH_{(aq)} \rightarrow Ni(OH)_{2(s)} + Na_2SO_{4(aq)}$ | Targeted | 100% | — |
| | $MnSO_{4(aq)} + 2NaOH_{(aq)} \rightarrow Mn(OH)_{2(s)} + Na_2SO_{4(aq)}$ | Targeted | 100% | — |
| | $Li_2SO_{4(aq)} + 2NaOH_{(aq)} \rightarrow LiOH_{(aq)} + Na_2SO_{4(aq)}$ | Side | 0-5% | — |
| Sodium Sulfate Crystallization | $Na_2SO_{4(aq)} + 10H_2O_{(l)} \rightarrow Na_2SO_4 \cdot 10H_2O_{(s)}$ | Targeted | 100% | — |
| | $Na_2CO_{3(aq)} + H_2SO_{4(aq)} \rightarrow Na_2SO_{4(aq)} + H_2O_{(l)} + CO_{2(g)}$ | Targeted | 100% | — |
| | $Li_2CO_{3(aq)} + H_2SO_{4(aq)} \rightarrow Li_2SO_{4(aq)} + H_2O_{(l)} + CO_{2(g)}$ | Targeted | 100% | — |
| | $Li_2CO_{3(s)} + H_2SO_{4(aq)} \rightarrow Li_2SO_{4(aq)} + H_2O_{(l)} + CO_{2(g)}$ | Targeted | 100% | — |
| Sodium Sulfate Drying | $Na_2SO_4 \cdot 10H_2O_{(s)} \rightarrow Na_2SO_{4(aq)} + 10H_2O_{(l)}$ | Targeted | 100% | — |
| | $Na_2SO_{4(aq)} \rightarrow Na_2SO_{4(s)}$ | Targeted | 100% | — |
| | $H_2O_{(l)} \rightarrow H_2O_{(g)}$ | Targeted | 100% | — |
| Lithium Carbonate Precipitation | $Li_2SO_{4(aq)} + Na_2CO_{3(s)} \rightarrow Na_2SO_{4(aq)} + Li_2CO_{3(s)}$ | Targeted | 100% | — |
| Lithium Carbonate Digestion | $Li_2CO_{3(s)} + H_2O_{(l)} + CO_{2(g)} \rightarrow 2LiHCO_{3(aq)}$ | Targeted | 100% | — |
| Impurity Ion Exchange (IX) | $R\text{-}CH_2\text{---}NH\text{---}CH_2\text{---}PO_3Na_{2(s)} + M^{2+}_{(aq)} \rightarrow R\text{-}CH_2\text{---}NH\text{---}CH_2\text{---}PO_3M_{(aq)} + 2Na^+_{(aq)}$ | Targeted | >95% | — |
| | $R\text{-}CH_2\text{---}NH\text{---}CH_2\text{---}PO_3M_{(aq)} + 2HCl_{(aq)} \rightarrow M^{2+}_{(aq)} + 2Cl^-_{(aq)} + R\text{-}CH_2\text{---}NH\text{---}CH_2\text{---}PO_3H_{2(s)}$ | Regeneration | 100% | — |
| | $R\text{-}CH_2\text{---}NH\text{---}CH_2\text{---}PO_3H_{2(s)} + 2NaOH_{(aq)} \rightarrow R\text{-}CH_2\text{---}NH\text{---}CH_2\text{---}PO_3Na_{2(s)} + 2H_2O_{(l)}$ | Conversion to Na⁺ form | 100% | — |
| Pure Lithium Carbonate Precipitation | $2LiHCO_{3(aq)} \rightarrow Li_2CO_{3(s)} + CO_{2(g)} + H_2O_{(l)}$ | Targeted | 100% | — |
| Lithium Carbonate Drying and Cooling | $H_2O_{(l)} \rightarrow H_2O_{(g)}$ | Targeted | 100% | — |
| | $Na_2SO_{4(aq)} \rightarrow Na_2SO_{4(s)}$ | Side | 100% | — |
| | $Na_2CO_{3(aq)} \rightarrow Na_2CO_{3(s)}$ | Side | 100% | — |

TABLE 14

Mechanical design criteria for an embodiment of an apparatus/system for carrying out size reduction of battery materials under immersion conditions

| Step | Parameter | Unit | Criteria | Source/Comment |
|---|---|---|---|---|
| Overall parameters | Immersion Type | — | Make-up water with dilute $Ca(OH)_2$ level | Per mini-piloting program |
| | Alternative Immersion Type | — | Make-up water with dilute NaCl | Per commercial-scale design |
| | Alternative Immersion Type | — | An organic alkyl carbonate (e.g. ethylene carbonate) | Per commercial-scale design |
| | Optional aqueous hydrated lime concentration | wt. % | 0.083 | Per mini-piloting program |
| | Maximum temperature | ° C. | 100 | Maximum temperature for safe dismantling |
| | Liquid Addition Rate | $m^3$ liquid/$m^3$ feed spent li-ion batteries | ≥2 | To ensure full immersion of li-ion batteries |
| | Wetted material of construction | — | Austenitic stainless steel (e.g. 304 Stainless Steel) | Materials compatible with feed |
| Self-cleaning conveyor | Conveyor type | — | Self-cleaning chain conveyor | Per commercial-scale design |
| Large format size reduction | Shredder Type | — | Quad Shaft Shredder | Per commercial-scale design |
| | Rotation Speed | rpm | 10-20 | Low rotation speed for initial mechanical separation |
| | Size of Output Solids | mm | <400 | Per commercial-scale design |
| Self-cleaning conveyor | Conveyor type | — | Self-cleaning chain conveyor | Per commercial-scale design |
| Coarse shredder | Shredder Type | — | Twin or quadruple shaft | Per mini-piloting program |
| | Rotation Speed | rpm | 30-40 | Per mini-piloting program and commercial-scale design |
| | Size of Output Solids | mm | <100 | Per mini-piloting program |
| Optional - Fine shredder | Shredder Type | — | Twin or quadruple shaft | Per commercial-scale design |
| | Rotation Speed | rpm | 30-40 | |
| | Size of Output Solids | mm | >40 to <100 | |
| Optional - Dry shredder | Shredder Type | — | Twin or quadruple shaft | Per commercial-scale design |
| | Rotation Speed | rpm | 30-40 | |
| | Size of Output Solids | mm | <40 | |

All publications, patents and patent applications mentioned in this Specification are indicative of the level of skill of those skilled in the art to which this application pertains and are herein incorporated by reference to the same extent as if each individual publication, patent, or patent application were specifically and individually indicated to be incorporated by reference.

The present application being thus described, it will be obvious that the same may be varied in many ways. Such variations are not to be regarded as a departure from the spirit and scope of the present application, and all such modifications as would be obvious to one skilled in the art are intended to be included within the scope of the following claims.

We claim:

1. An apparatus for carrying out size reduction of battery materials under immersion conditions, the apparatus comprising:
   a) a housing;
   b) a battery inlet through which battery materials can be introduced into the housing;
   c) at least a first comminuting device disposed within the housing and configured to cause a size reduction of the battery materials to form reduced-size battery materials and to liberate electrolyte materials and a black mass material comprising anode and cathode powders from within the battery materials;
   d) an immersion liquid within the housing and submerging the first comminuting device, the immersion liquid being basic and being at least electrically conductive whereby sparking caused by the size reduction of the battery material is suppressed and heat generated by the size reduction is absorbed by the immersion liquid, and wherein the electrolyte materials, the black mass material and the reduced-size battery material are entrained within the immersion liquid to form a sized-reduced feed stream;
      a feed outlet that is downstream from the first comminuting device through which the sized-reduced feed stream comprising the reduced size battery material, the black mass material and the electrolyte materials entrained within the immersion liquid can exit the housing; and
      a first separator that is submerged by the immersion liquid and is disposed at the feed outlet to receive the sized-reduced feed stream, the first separator configured to separate the sized-reduced feed stream into at least:
      i) a black mass solid product stream comprising the black mass material and a retained portion of the immersion liquid having entrained electrolyte materials; and
      ii) a first filtrate stream comprising a second portion of the immersion liquid having entrained electrolyte materials.

2. The apparatus of claim 1, wherein the retained portion of the immersion liquid having entrained electrolyte comprises up to 20% wt of the black mass solid product stream.

3. The apparatus of claim 1, wherein the first separator comprises a liquid-solid filter and wherein the first filtrate stream passes through the liquid-solid filter and the black mass solid product stream comprises a filter cake material retained by the liquid-solid filter.

4. The apparatus of claim 3, wherein the first separator further comprises a screen in fluid communication between the feed outlet and the liquid-solid filter, the screen being configured to separate oversized solids from the sized-reduced feed stream before it reaches the liquid-solid separator while allowing the black mass material and the immersion liquid having entrained electrolyte materials to pass through the screen.

5. The apparatus of claim 4, wherein the screen is configured to retain solids having a size that is greater than 2 mm.

6. The apparatus of claim 1, further comprising a recycle circuit configured to recycle at least a first portion of the first filtrate stream into the immersion liquid within the housing.

7. The apparatus of claim 6, further comprising an organic removal circuit in the recycle circuit between the first separator and the housing, wherein the organic removal circuit is configured to separate at least some of the entrained electrolyte materials from the immersion liquid.

8. The apparatus of claim 1, wherein the immersion liquid within the housing is at an operating temperature that is less than about 70 degrees Celsius to inhibit chemical reactions between the electrolyte materials and the immersion liquid.

9. The apparatus of claim 8, wherein the operating temperature is less than 60 degrees Celsius.

10. The apparatus of claim 1, wherein the immersion liquid comprises at least one of water and an aqueous solution.

11. The apparatus of claim 1, wherein the immersion liquid has a pH that is greater than or equal to 8.

12. The apparatus of claim 1, wherein the immersion liquid comprises a salt whereby the immersion liquid is electrically conductive to dissipate a residual electrical charge within the battery materials that is released during the size reduction.

13. The apparatus of claim 12, wherein the salt comprises at least one of an alkali metal chloride, an alkaline earth metal chloride, an organic alkyl carbonate and a combination thereof.

14. The apparatus of claim 13, wherein the salt comprises at least one of sodium hydroxide and calcium hydroxide.

15. The apparatus of claim 1, wherein dust particles that are liberated from the battery materials by the first comminuting device during the size reduction are captured and entrained within the immersion liquid and are inhibited from escaping the housing into the surrounding atmosphere.

16. The apparatus of claim 1, further comprising a second comminuting device submerged within immersion liquid and being disposed being downstream from the first comminuting device to receive the reduced-size battery material exiting the first comminuting device and being configured to cause a second size reduction of the battery materials to form further reduced-size battery material and to liberate further electrolyte materials from within the battery materials that are included in the sized-reduced feed stream.

17. The apparatus of claim 16, wherein the second comminuting device is at a lower elevation than the first comminuting device, whereby the electrolyte materials and the reduced-size battery material that are entrained within the immersion liquid when exiting the first comminuting device flow into the second comminuting device.

18. An apparatus for carrying out size reduction of battery materials under immersion conditions, the apparatus comprising:
   a) a housing;
   b) a battery inlet through which battery materials can be introduced into the housing;
   c) at least a first comminuting device disposed within the housing and configured to cause a size reduction of the battery materials to form reduced-size battery materials and to liberate electrolyte materials and a black mass material comprising anode and cathode powders from within the battery materials;

d) an immersion liquid within the housing and submerging the first comminuting device, the immersion liquid being basic and being at least electrically conductive whereby sparking caused by the size reduction of the battery material is suppressed and heat generated by the size reduction is absorbed by the immersion liquid, and wherein the electrolyte materials, the black mass material and the reduced-size battery material are entrained within the immersion liquid to form a sized-reduced feed stream wherein the immersion liquid comprises at least one of sodium hydroxide and calcium hydroxide; and e) a feed outlet that is downstream from the first comminuting device through which the sized-reduced feed stream comprising the reduced size battery material, the black mass material and the electrolyte materials entrained within the immersion liquid can exit the housing.

19. The apparatus of claim 18, wherein the immersion liquid reacts with hydrogen fluoride produced via the liberation of the electrolyte materials during the size reduction, whereby the evolution of hydrogen fluoride during the size reduction is inhibited.

20. The apparatus of claim 18, wherein the immersion liquid within the housing is at an operating temperature that is less than 70 degrees Celsius to inhibit chemical reactions between the electrolyte materials and the immersion liquid.

21. The apparatus of claim 20, wherein the operating temperature is less than 60 degrees Celsius.

22. The apparatus of claim 18, wherein the immersion liquid has a pH that is greater than or equal to 8.

23. The apparatus of claim 18, wherein the immersion liquid comprises a salt whereby the immersion liquid is electrically conductive to dissipate a residual electrical charge within the battery materials that is released during the size reduction, and wherein the salt comprises at least one of an alkali metal chloride, an alkaline earth metal chloride, an organic alkyl carbonate and a combination thereof.

24. The apparatus of claim 18, wherein dust particles that are liberated from the battery materials by the first comminuting device during the size reduction are captured and entrained within the immersion liquid and are inhibited from escaping the housing into the surrounding atmosphere.

* * * * *